(12) United States Patent  
Danielsson et al.

(10) Patent No.: US 9,146,652 B1  
(45) Date of Patent: Sep. 29, 2015

(54) SYSTEM AND METHOD FOR CREATING USER INTERFACES IN A MULTIPHYSICS MODELING SYSTEM

(75) Inventors: Erik Danielsson, Vaellingby (SE); Eduardo Fontes, Vallentuna (SE); Lars Langemyr, Stockholm (SE); Victor Littmarck, Solna (SE); Svante Littmarck, Dedham, MA (US); Nils Malm, Lidingö (SE); Björn Sjödin, Lexington, MA (US); Daniel Smith, Cambridge, MA (US)

(73) Assignee: Comsol AB, Stockholm (SE)

( * ) Notice: Subject to any disclaimer, the term of this patent is extended or adjusted under 35 U.S.C. 154(b) by 241 days.

(21) Appl. No.: 13/599,619

(22) Filed: Aug. 30, 2012

Related U.S. Application Data

(60) Provisional application No. 61/529,645, filed on Aug. 31, 2011.

(51) Int. Cl.  
*G06F 3/048* (2013.01)  
*G06G 7/50* (2006.01)  
*G06G 7/40* (2006.01)

(52) U.S. Cl.  
CPC ...... *G06F 3/048* (2013.01); *G06G 7/40* (2013.01); *G06G 7/50* (2013.01)

(58) Field of Classification Search  
CPC ............ G06F 7/60; G06F 3/048; G06G 7/40; G06G 7/50  
USPC ............................................. 703/2; 715/762  
See application file for complete search history.

(56) References Cited

U.S. PATENT DOCUMENTS

| 5,699,271 | A  | * | 12/1997 | Sagawa et al. | 716/106 |
| 6,633,837 | B1 | * | 10/2003 | Dye et al. | 703/9 |
| 7,519,518 | B2 |   | 4/2009 | Langemyr et al. | |
| 7,596,474 | B2 |   | 9/2009 | Langemyr et al. | |
| 7,623,991 | B1 | * | 11/2009 | Langemyr et al. | 703/2 |
| 2004/0034514 | A1 | * | 2/2004 | Langemyr et al. | 703/2 |
| 2005/0060129 | A1 | * | 3/2005 | Mosterman et al. | 703/2 |
| 2006/0271888 | A1 | * | 11/2006 | Meuris et al. | 716/4 |
| 2006/0282243 | A1 | * | 12/2006 | Childs et al. | 703/10 |

(Continued)

OTHER PUBLICATIONS

S.E. Mohney et al., Software for Teaching Materials Processing and Diffusion, The Minerals, Metals & Materials Society, Dec. 2003, pp. 1-6.*

(Continued)

*Primary Examiner* — Jennifer To  
*Assistant Examiner* — Hugo Molina  
(74) *Attorney, Agent, or Firm* — Nixon Peabody LLP

(57) ABSTRACT

Systems and methods for generating a physics interface data structure via a graphical user interface include processing user inputs received via one or more user input devices. The inputs correspond to one or more variables, one or more physics properties, one or more physics features, one or more feature equations for physics features, one or more feature equations for physics properties, one or more solver settings, and one or more output result features. The user inputs are received via selection menus or user editable fields. A physics interface data structure comprising the user inputs is generated. A physics interface corresponding to the generated physics interface data structure is displayed in a graphical user interface. The physics interface data structure is stored on a physical memory devices.

39 Claims, 32 Drawing Sheets

(56) References Cited

U.S. PATENT DOCUMENTS

| | | | |
|---|---|---|---|
| 2007/0043546 A1 | 2/2007 | Fontes et al. | |
| 2009/0231334 A1* | 9/2009 | Chen et al. | 345/420 |
| 2010/0082142 A1* | 4/2010 | Usadi et al. | 700/104 |
| 2010/0256957 A1* | 10/2010 | Slavik | 703/2 |
| 2012/0179426 A1 | 7/2012 | Fontes et al. | |
| 2013/0211796 A1* | 8/2013 | Aquelet | 703/2 |

OTHER PUBLICATIONS

MathWorks, MATLAB Partial Differential Equation Toolbox User's Guide, Mar. 2015, Version 2.0, pp. 1-363.*

COMSOL Multiphysics®, Reference Guide, Version 4.0, dated Apr. 2010, 426 pages.

COMSOL Multiphysics®, User's Guide, Version 4.0 Beta 1, dated Oct. 2009, 492 pages.

COMSOL AB "Introduction to Comsol Multiphysics," Version 4.0, 1998-2010, Apr. 2010, 53 pages.

COMSOL AB "Introduction to Comsol Multiphysics," Version 4.0a, 1998-2010, Jun. 2010, 97 pages.

COMSOL AB "COMSOL Quick Start, " Version 4.0 Beta 2, 1998-2010, Feb. 2010, 36 pages.

COMSOL AB "COMSOL Quick Start, " Version 4.0, 1998-2009, Oct. 2009, 36 pages.

Fontes et al., U.S. Appl. No. 13/184,207, filed Jul. 15, 2011, entitled "System and Method for Accessing Settings in a Multiphysics Modeling System Using a Model Tree," 117 pages.

Fontes et al., U.S. Appl. No. 13/184,293, filed Jul. 15, 2011, entitled "System and Method for Accessing a Multiphysics Modeling System Via a Design System User Interface," 115 pages.

* cited by examiner

▲ ✏️ Result Defaults 1 *(pdef1)* ⟵ 2910

▲ ✏️ Plot Defaults 1 *(pdm1)* ⟵ 2920a

✏️ Default Scalar Plot 1 *(pds1)* ⟵ 2920b

▲ ⬜ Plot Group 3D 1 *(pg1)* ⟵ 2930a

◇ Use Condition 1 *(pcond1)* ⟵ 2940a

⬜ Temperature *(surf1)* ⟵ 2950

▲ ⬜ Plot Group 3D 2 *(pg2)* ⟵ 2930b

◇ Use Condition 1 *(pcond1)* ⟵ 2940b

⬜ Electric Potential *(surf1)* ⟵ 2960

Figure 29

SYSTEM AND METHOD FOR CREATING USER INTERFACES IN A MULTIPHYSICS MODELING SYSTEM

CROSS-REFERENCE TO RELATED APPLICATIONS

This application claims priority to and the benefits of U.S. Provisional Application No. 61/529,645, filed on Aug. 31, 2011, the disclosure of which is hereby incorporated by reference herein in its entirety.

FIELD OF THE INVENTION

The present invention relates generally to systems and methods for modeling and simulation, and more particularly, to user interfaces for a multiphysics modeling system.

BACKGROUND

Computer design systems are used to develop product designs and may include graphical user interfaces. Computer design systems can be complemented with packages analyzing a single aspect of a design, such as, structural analysis in conjunction with computer-aided design systems. It would be desirable to have design systems that can operate in more complex environments.

SUMMARY OF THE INVENTION

According to one aspect of the present disclosure, a method for generating a physics interface data structure including representations of one or more physics interfaces is described. The method is executable on one or more processing units associated with a modeling system. The method comprises the acts of creating, in one or more memory devices, a physics interface file including a plurality of data fields. A plurality of selection menus and user editable fields associated with the physics interface file are output to one or more graphical user interfaces. The one or more graphical user interfaces are displayed on a display device. At least one of physics features and properties associated with the physics interface are received via one or more user input devices. The at least one of physics features and properties are received via at least one of the selection menus and user editable fields. At least one dependent variable and at least one feature equation for the at least one of physics features and properties are defined. One or more user input classes for the at least one of physics features and properties are defined via at least one of the one or more user input devices. The user input classes are defined via at least one of the selection menus and user editable fields.

According to another aspect of the present disclosure, a method for generating a multiphysics data structure is described. The method is executable on one or more processing units associated with a multiphysics modeling system. The method includes the acts of determining, via one or more processors, a set of physics interfaces from a physics interface data structure stored on one or more memory devices. The set of physics interfaces is displayed in one or more graphical user interfaces. At least one of the physics interfaces is selectable. A selection of at least one of the physics interfaces is received via one or more user input devices. First settings for the selection of the at least one of the physics interfaces are determined and displayed in at least one of the one or more graphical user interfaces. The first settings are defined in the physics interface data structure. Edits to the first settings are received via at least one of the one or more user input devices such that at least one parameter for the first settings is changed. Features and properties defined in the physics interface data structure are determined and displayed in at least one of the one or more graphical user interfaces. The features and properties are associated with the selection of the at least one of the physics interfaces. A selection of at least one of the displayed features and properties is received via at least one of the one or more user input devices. Second settings for the selection of the at least one of the features and properties defined in the physics interface data structure are determined and displayed in at least one of the one or more graphical user interfaces. Edits to the second settings are received via at least one of the one or more user input devices such that at least one parameter for the second settings is changed.

According to another aspect of the present disclosure, an apparatus for generating a physics interface data structure for a multiphysics modeling system is described. The apparatus includes a physical computing system comprising one or more processors, one or more user input devices, a display device, and one or more memory devices. At least one of the one or more memory devices includes executable instructions for generating a physics interface data structure corresponding to a multiphysics modeling system. The executable instructions cause at least one of the one or more processors to perform, upon execution, acts comprising creating a physics interface file including a plurality of data fields. A plurality of selection menus and user editable fields associated with the physics interface file are output to one or more graphical user interfaces. The one or more graphical user interfaces are displayed on a display device. Physics features and properties associated with the physics interface are received via one or more user input devices. The physics features and properties are received via at least one of the selection menus and user editable fields. At least one dependent variable and at least one feature equation are defined for at least one of the physics features and properties. One or more user input classes for the physics feature and property are defined via at least one of the one or more user input devices. The user input classes are defined via at least one of the selection menus and user editable fields. The variable declarations, physics features and properties, dependent variable definition, feature equation, and user input classes are stored via at least one of the one or more memory devices in one or more of the plurality of data fields for the physics interface file.

According to another aspect of the present disclosure, an apparatus for editing settings in a physics interface data structure for a multiphysics modeling system is described. The apparatus includes a physical computing system comprising one or more processors, one or more user input devices, a display device, and one or more memory devices. At least one of the one or more memory devices includes executable instructions for editing a physics interface data structure corresponding to a multiphysics modeling system. The executable instructions cause at least one of the one or more processors to perform, upon execution, acts comprising determining a set of physics interfaces from a physics interface data structure stored on one or more memory devices. The set of physics interfaces are displayed in one or more graphical user interfaces. At least one of the physics interfaces is selectable. At least one of the physics interfaces is selected via one or more user input devices. First settings for the selected physics interface are determined and displayed in at least one of the one or more graphical user interfaces. The first settings are defined in the physics interface data structure. Edits to the first settings for the selected physics interface are received via at least one of the one or more user input devices such that at least one parameter for the first settings is changed. Features and properties defined in the physics interface data structure are determined and displayed in at least one of the one or more graphical user interfaces. The features and properties are associated with the selected physics interface. At least one of the displayed features and properties is selected via at least one of the one or more user input devices. Second settings for the selected features and properties defined in the physics interface data structure are determined and displayed in at least one of the one or more graphical user interfaces. Edits to the second settings for the selected features and properties are received via at least one of the one or more user input devices such that at least one parameter for the second settings is changed.

According to yet another aspect of the present disclosure, a method for generating equations and variables representing a multiphysics model in a multiphysics modeling system is described. The method is executable on one or more processing units and includes the acts of determining, via one or more processing units, a plurality of physics interfaces defined in a multiphysics data structure. Each physics interface includes physical properties and physical quantities. A physics interface data structure corresponding to the multiphysics data structure is received into one or more memory devices. Variable and equation instances are generated for each of the plurality of physics interfaces via at least one of the one or more processing units. The variable and equation instances are generated from the received physics interface data structure. At least a portion of the variable and equation instances are common to at least two of the plurality of physics interfaces. Domain splitting for variable and equation instances that are common is performed via at least one of the one or more processing units. The physical properties and the physical quantities from the at least two of the plurality of physics interfaces that have common variable and equation instances are matched via at least one of the one or more processors.

According to a further aspect of the present disclosure, a system for generating a physics interface data structure via a graphical user interface is described. The system includes one or more physical memory devices, one or more display devices, one or more user input devices, and one or more processors configured to execute instructions stored on at least one of the one or more physical memory devices. The instructions cause at least one of the one or more processors to performs steps comprising: (a) processing user inputs received via at least one of the one or more user input devices, the user inputs corresponding to one or more variables, one or more physics properties, one or more physics features, one or more feature equations for physics features, one or more feature equations for physics properties, one or more solver settings, and one or more output result features, the user inputs received via at least one of selection menus and user editable fields; (b) generating a physics interface data structure comprising the user inputs received in step (a); (c) displaying, in a graphical user interface displayed on at least one of the one or more display devices, a physics interface corresponding to the physics interface data structure generated in step (b); and (d) storing the physics interface data structure on at least one of the one or more physical memory devices.

According to further aspects of the present disclosure, one or more non-transitory computer readable media are encoded with instructions, which when executed by at least one processor associated with a design system or a modeling system, causes the at least one processors to perform the above methods.

Additional aspects of the present disclosure will be apparent to those of ordinary skill in the art in view of the detailed description of various embodiments, which is made with reference to the drawings, a brief description of which is provided below.

BRIEF DESCRIPTION OF THE DRAWINGS

Features and advantages of the present disclosure will become more apparent from the following detailed description of exemplary embodiments thereof taken in conjunction with the accompanying drawings in which:

FIG. 29 illustrates an exemplary result defaults branch for a physics interface builder tree that may be included in a method for creating a physics interface data structure, according to one aspect of the present disclosure.

Figure 1:
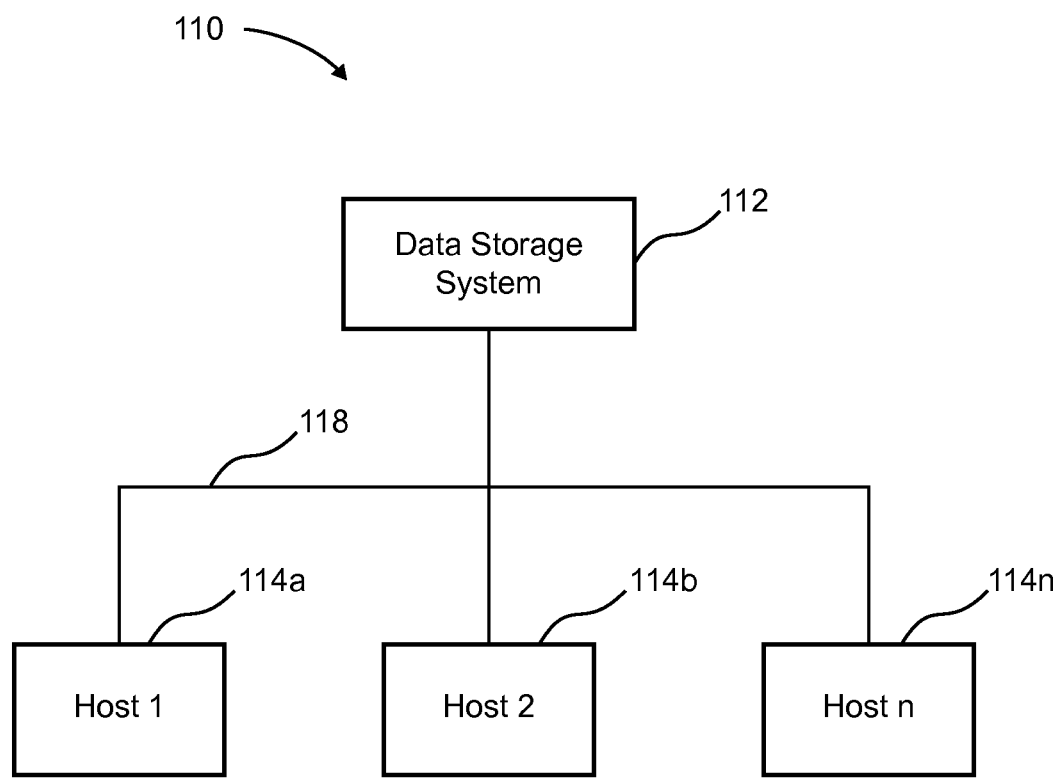
FIG. 1 illustrates an exemplary aspect of a computer system.

While the present disclosure is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While the present disclosure is susceptible of embodiment in many different forms, there is shown in the drawings and will herein be described in detail various aspects of the invention with the understanding that the present disclosure is to be considered as an exemplification of the principles of the invention and is not intended to limit the broad aspects of the invention to the aspects illustrated.

Various non-limiting exemplary aspects of systems are described herein that include methods, executed on processing unit(s), which are accessible via a graphical user interface. The methods include instructions for receiving inputs from users, in the form of variables, equations, and feature definitions, for generating physics interface data structures. The received inputs are processed to generate data structure(s) that include settings definitions for desired physics interface(s). It is contemplated that the generated physics interface data structures can be applied or associated with an engineering analysis system (e.g., multiphysics modeling system), where the generated physics interface data structure(s) may be selected by the system user. In the exemplary aspect of a multiphysics modeling system, a first interpreter module can be provided that receives inputs in the form of physical properties in term of physical quantities, and then, generates a model object. A model object may include the algorithms and data structures for the model and may be further used to represent the model. The model object can further include methods for setting up and executing sequences of operations to create geometry, meshes, and solutions for the model. The multiphysics modeling system can also include a second interpreter module that combines the selected physics interface data structure(s) and the generated model object to further generate coupled partial differential equation (PDE) formulations for a multiphysics model.

In certain aspects of the present disclosure, a system for generating a physics interface data structure is contemplated that may be based, at least in part, on PDE formulations. The physics interface data structure may be generated using inputs received via a dedicated graphical user interface. The physics interface data structure, also sometimes referred to as an application mode data structure, is contemplated to be useful for engineering analysis software operating on computer system(s) that include modules or routines for performing finite element analysis methods, finite volume methods, computational fluid dynamic methods, multiphysics methods, and the like. Computer systems embodying the engineering analysis software may be configured with one or more graphical user interfaces that allow a system user to input and execute simulations. The computer systems may include some of the non-limiting exemplary routines or methods described herein and can further include different interfaces for different types of simulations. Different user interfaces may be, for example, provided for fluid flow, heat transfer, electromagnetic, and/or structural mechanics simulations. Simulations and associated interfaces for other engineering or physics phenomena are also contemplated for computer-aided engineering analysis systems.

A system having a dedicated graphical user interface for generating or building a physics interface data structure is contemplated in certain aspects of the present disclosure. For example, a computer system may include a graphical user interface for defining the parameters, variables, physical properties, physical quantities, and/or physics interface features for a desired physics phenomena associated with a desired analysis or simulation. The graphical user interface can allow access to routines or methods that then generate the data structure representing the physics interface. The generated data structure may then be interpreted or processed by a routine or method configured to create the physics interface and to make the physics interface accessible to other graphical user interface(s) associated with, for example, an engineering analysis system such as a multiphysics modeling system. The routines or methods for these operations can be executed locally on, and/or remotely through network connection(s) to, one or more processing unit(s) executing the engineering analysis software.

One exemplary aspect of an engineering analysis method operating on a computer system that is contemplated by the present disclosure includes routines for setting up and solving multiphysics problems for simulations that may have several coupled physical phenomena. Input(s) for the analysis method(s) can be received in a form representative of physical properties that are further expressed in terms including physical quantities. The engineering analysis methods can also include routines for setting up problems using physical properties, physical quantities, and physical phenomena described using PDEs. It is contemplated that the setting up and solving of a multiphysics problem using the exemplary engineering analysis method can be accomplished via predefined physics interfaces, which may also be referred to as application modes (see, e.g., U.S. patent application Ser. No. 09/675,778, filed on Sep. 29, 2000, now issued as U.S. Pat. No. 7,623, 991). In addition, the setting up and solving of multiphysics problems may also be accomplished using PDE interfaces, which may also be referred to as PDE modes in situations where predefined physics interfaces are not available. It is contemplated that the use of the generic PDE interfaces for setting up a multiphysics problem can be accomplished by describing the physical properties, physical quantities, and physical phenomena in terms of PDEs.

The present disclosure contemplates that it may be desirable to create a user-defined physics interface, or application mode, using PDE formulations for a desired physics phenomenon, where, for example, a predefined physics interface is not available or modification of a pre-defined physics interface is preferred. The components of the user-defined physics interface may include parameters, variables, physical properties, physical quantities, boundary and initial conditions, and solvers with settings and menus. The settings and menus can be customized for specific physics phenomen(a) instead of using generic mathematical settings. The settings and menus can be developed according to various aspects of a physics interface builder modules or methods described by the present disclosure. The physics interface builder modules may include components, such as a graphical user interface, for defining parameters, variables, physical properties, physical quantities, and physics interface features that allow for the quick and efficient generation of a customized physics interface.

Non-limiting exemplary aspects of multiphysics modeling and engineering analysis systems are described in U.S. patent application Ser. No. 13/184,207, filed on Jul. 15, 2011; U.S. patent application Ser. No. 10/042,936, filed on Jan. 9, 2002, now issued as U.S. Pat. No. 7,596,474; U.S. patent application Ser. No. 09/995,222, filed on Nov. 27, 2001, now issued as U.S. Pat. No. 7,519,518; and U.S. patent application Ser. No. 09/675,778, filed on Sep. 29, 2000, now issued as U.S. Pat. No. 7,623,991, the disclosures of which are each hereby incorporated by reference herein in their entireties.

Computer systems may be used for performing the different tasks described in the present disclosure. One aspect for using a computer system includes executing one or more computer programs, including engineering analysis software and methods, stored on computer readable media (e.g., temporary or fixed memory, magnetic storage, optical storage, electronic storage, flash memory, other storage media). A computer program comprises instructions which, when executed by a processor, perform one or more tasks. In certain embodiments, a computer system executes machine instructions, as may be generated, for example, in connection with translation of source code to machine executable code, to perform modeling and simulation, and/or problem solving tasks. One technique, which may be used to model and simulate physical phenomena or physical processes, is to represent various physical properties and quantities, of the physical phenomena or physical processes being modeled and simulated, in terms of variables and equations or in other quantifiable forms that may be processed by a computer system. In turn, these equations or other quantifiable forms are solved by a computer system configured to solve for one or more variables associated with the equation, or the computer may be configured to solve a problem using other received input parameters.

It is contemplated that computer programs for modeling and simulating physical phenomena or physical processes may provide many advantages particularly as the complexity of the physical phenomena or physical processes being modeled and simulated increases. For example, in certain embodiments a user can combine one or more physical phenomena into a multiphysics model, as part of, for example, an engineering analysis. To further illustrate this example, a user may combine phenomena described by chemical kinetics and fluid mechanics, electromagnetic phenomena and structural mechanics, or other physics phenomena. Such multiphysics models may also involve multiple physical processes. For example, a process may be combined that includes an amplifier powering an actuator, where both the amplifier and the actuator are a part of one multiphysics model. Multiphysics modeling can also include solving coupled systems of partial differential equations (PDEs). Exemplary multiphysics modeling systems include the COMSOL® 4.2 or COMSOL Multiphysics® simulation software operating on a computer system, as such software is available from COMSOL, Inc. of Burlington, Mass. As discussed in part above, additional exemplary aspects of multiphysics modeling systems are described in U.S. patent application Ser. No. 13/184,293, filed Jul. 15, 2011; U.S. patent application Ser. No. 13/184, 207, filed Jul. 15, 2011; U.S. patent application Ser. No. 12/981,404, filed Dec. 29, 2011; U.S. Patent Application No. 61/377,841, filed Aug. 27, 2010; U.S. Patent Application No. 61/360,038, filed Jun. 30, 2010; U.S. Patent Application No. 61/290,839, filed Dec. 29, 2009; U.S. patent application Ser. No. 10/042,936, filed on Jan. 9, 2002, now issued as U.S. Pat. No. 7,596,474; U.S. patent application Ser. No. 09/995,222, filed on Nov. 27, 2001, now issued as U.S. Pat. No. 7,519,518; and U.S. patent application Ser. No. 09/675,778, filed on Sep. 29, 2000, now issued as U.S. Pat. No. 7,623,991, the disclosures of which are each hereby incorporated by reference herein in their entireties.

An automatic technique for combining the one or more physical phenomena is desirable such that the combination of the phenomena together may be modeled and accordingly represented in terms of coupled physical properties and quantities described by variables in systems of PDEs. It is also desirable for the automatic technique to provide for selectively solving for one or more variables associated with the system of PDEs and/or for solving the variables associated with one or more of the individual PDEs. This can allow for different techniques to be utilized for solving a system of PDEs associated with a singular or coupled physical quantit(ies) and/or physical propert(ies).

It is desirable, in certain embodiments, to model the physical quantities of coupled multiple processes using different sets of PDEs, defined for different geometries and/or in different coordinate systems, to represent the different coupled multiple processes. It is contemplated that in certain embodiments, systems of PDEs defined for multiple geometries can be desirable. PDEs can provide an efficient and flexible arrangement for defining various couplings between the PDEs within a single geometry, as well as between different geometries.

It is contemplated that computer systems on which multiphysics modeling systems operate, such as the modeling systems described herein, can include networked computers or processors. In certain embodiments, processors may be operating directly on the multiphysics modeling system user's computer, whereas, in other embodiments, a processor may be operating remotely. For example, a user may provide various input parameters via a graphical user interface at one computer or terminal located at a certain location. Those parameters may be processed locally on the one computer or they may be transferred over a communication pathway such as a local area network or a wide area network, to another processor, located elsewhere (e.g., another room, another building, another city) that is configured to process the input parameters. The second processor may be associated with a server connected to the Internet (or other network) or the second processor can be several processors connected to the Internet (or other network), each handling select function(s) for developing and solving a problem on the multiphysics modeling system. The results of the processing by the one or more processors can then be assembled at yet another server or processor. The results may be assembled back at the terminal or computer where the user is situated. The terminal or computer where the user is situated can then display the solution of the multiphysics modeling system to the user via a display (e.g., a transient display) or in hard copy form (e.g., via a printer). Alternatively, or in addition, the solution may be stored in a memory associated with the terminal or computer, or the solution may be stored on another server that the user may access to obtain the solution from the multiphysics modeling system.

For a product or process in the development or feasibility stage where it is being designed or analyzed, such product or process may need to be assessed for use in complex environment(s) involving several physical properties and quantities. The present concepts are able to solve complex multiphysics problems by systematically varying parametric and geometric features in a computer-based design system. The present concepts also provide a computer-based system for solving complex multiphysics problems in which the settings for the physical properties and boundary conditions, located in a memory and used to form multiphysics models and/or solve multiphysics problems, can be accessed directly from the design system. For example, access can occur through an interface between the design system and the multiphysics modeling system or an interface within one of the design system or the multiphysics modeling system. The interface may be virtual or may reside in a permanent memory. In at least some aspects, the interface may at least partially include physical hardware components that may or may not also include computer program components for allowing useful interactions between the design system and the multiphysics modeling system.

Referring now to FIG. 1, an exemplary aspect of a computer system is illustrated that may be used with the methods described elsewhere herein. The computer system 110 includes a data storage system 112 connected to host systems 114a-114n through communication medium 118. In this embodiment of the computer system 110, the "n" hosts 114a-114n may access the data storage system 112, for example, in performing input/output (I/O) operations. The communication medium 118 may be any one of a variety of networks or other type of communication connections as known to those skilled in the art. For example, the communication medium 118 may be the Internet, an intranet, or other network connection by which the host systems 114a-114n may access and communicate with the data storage system 112, and may also communicate with others included in the computer system 110.

Each of the host systems 114a-114n and the data storage system 112 included in the computer system 110 may be connected to the communication medium 118 by any one of a variety of connections as may be provided and supported in accordance with the type of communication medium 118. The processors included in the host computer systems 114a-114n and/or a data manager system may be any one of a variety of commercially available single or multi-processor system, such as an Intel-based processor, IBM mainframe, server, or other type of commercially available processor able to support incoming traffic in accordance with each particular embodiment and application.

It should be noted that the particulars of the hardware and software included in each of the host systems 114a-114n, as well as those components that may be included in the data storage system 112 are described herein in more detail, and may vary with each particular embodiment. Each of the host computers 114a-114n, as well as the data storage system 112, may all be located at the same physical site, or, alternatively, may also be located in different physical locations. Examples of the communication medium that may be used to provide the different types of connections between the host computer systems, the data manager system, and/or the data storage system of the computer system 110 may use a variety of different communication protocols such as SCSI, ESCON, Fiber Channel, or functional equivalents that are known to those skilled in the art. Some or all of the connections by which the hosts, data manager system, and/or data storage system 112 may be connected to the communication medium 118 may pass through other communication devices, such as a Connectrix or other switching equipment that may exist, both physical and virtual, such as a phone line, a repeater, a multiplexer or even a satellite.

Each of the host computer systems may perform different types of data operations, such as storing and retrieving data files used in connection with an application executing on one or more of the host computer systems. For example, a computer program may be executing on the host computer 114a and store and retrieve data from the data storage system 112. The data storage system 112 may include any number of a variety of different data storage devices, such as disks, tapes, solid-state devices, and the like in accordance with each implementation. Moreover, the data storage system 112 may be distributed across a plurality of different sites. As will be described in following paragraphs, software may reside in and/or execute on any one or more of the host computer systems 114a-114n. Data may be stored locally on the host system executing software, as well as remotely in the data storage system 112 or on another host computer system. Similarly, depending on the configuration of each computer system 110, software as described herein may be stored and executed on one of the host computer systems and accessed remotely by a user on another computer system using local data. A variety of different system configurations and variations are possible, as will be described in connection with the embodiment of the computer system 110 of FIG. 1, and should not be construed as a limitation of the techniques described herein.

Figure 2:
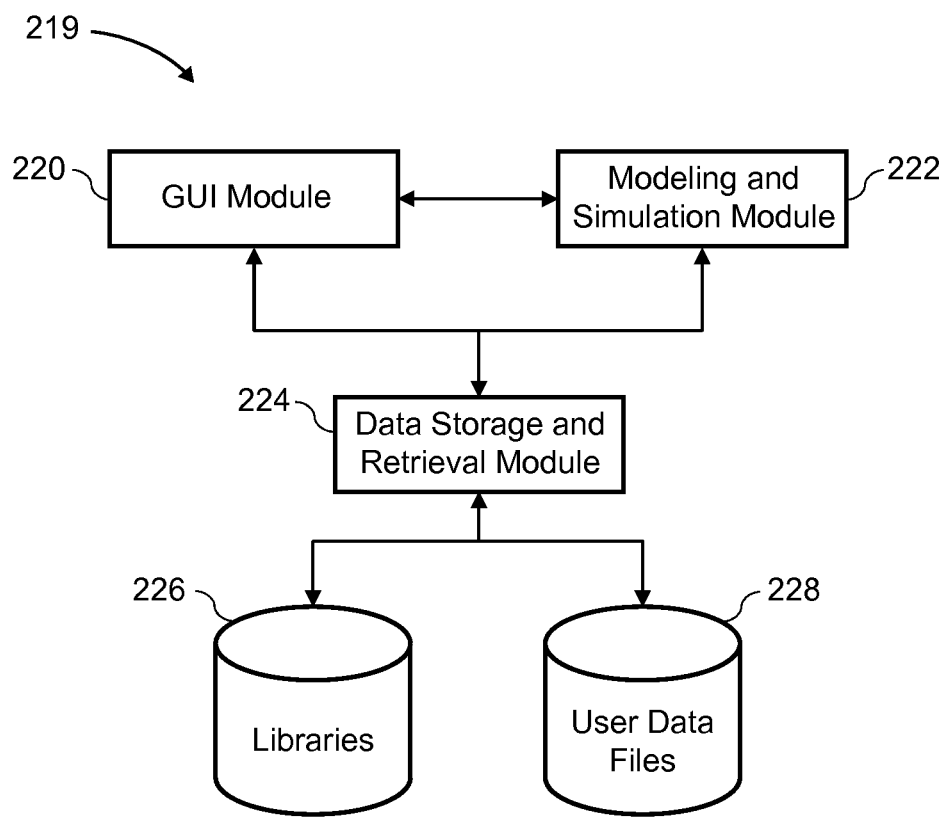
FIG. 2 illustrates an exemplary aspect of software that may reside and be executed in one of the hosts of FIG. 1.

Referring now to FIG. 2, an exemplary aspect of a modeling system 219 is illustrated that may reside, for example, in software form on a single computer or in one of a plurality of host computer systems (e.g., host computers 114a-114n). The modeling system may be divided into several software components. One exemplary aspect of the system may include a GUI module 220, a Modeling and Simulation module 222, and a Data Storage and Retrieval module 224. The GUI module 220 provides for interactions with system users. The Modeling and Simulation module 222 provides an ability to manage and perform a simulation, such as a multiphysics simulation. The Data Storage and Retrieval module 224 provides an ability to load and save the model in a file, and to load and store other types of files which may be used during the simulation or may be used as input or output to the simulation.

The GUI module 220 communicates with the Modeling and Simulation module 222 by sending and receiving commands. The act of sending and receiving commands may be performed through, for example, an application programming interface ("API") or other similar components. In one aspect of the system, the API may be object oriented and mix data and function calls within the same structure. In another aspect of the system, the API may use a data structure that is separate from function calls.

It is contemplated that, in certain aspects of the present disclosure, components of a multiphysics modeling system reside on different host computer systems. For example, in one aspect the GUI module 220 resides on a personal computer host and the Modeling and Simulation module 222 resides on a server computer host. It is further contemplated that the Data Storage and Retrieval module 224 may reside on either the personal computer host or the server computer host, or yet another separate computer host. If the computer hosts are not identical, the API can be configured to use a computer network to communicate between hosts. In one embodiment, an object oriented API is configured to send data and method calls over the computer network or in another embodiment send data and function calls between the software components over a computer network. The API may also be able to handle a Data Storage and Retrieval module 224 which may be located either on the host of the GUI module 220 or the Modeling and Simulation module 222, or on a separate host. In each of those cases, the Data Storage and Retrieval module 224 may be configured to load and store files on each of those hosts.

It is contemplated that, in certain aspects, the system 219 may include, or be configured with, software components other than what is described and represented in the modeling system 219 illustrated in FIG. 2. In the exemplary aspect illustrated in FIG. 2, Libraries 226 and the User Data Files 228 can be stored locally within the host computer system. It is further contemplated that in certain aspects, the Libraries 226 and/or User Data Files 228, as well as copies of these, may be stored in another host computer system and/or in the Data Storage System 112 of the computer system 110. However, for simplicity and explanation in paragraphs that follow, it may be assumed in a non-limiting manner that the system 219 may reside on a single host computer system such as 114a with additional backups, for example, of the User Data Files and Libraries, in the Data Storage System 112.

In certain aspects of the present disclosure, portions of the modeling system 219, such as the GUI module 220, the Modeling and Simulation module 222, the Data Storage and Retrieval module 224, and/or the Libraries 226 may be included or executed in combination with commercially available software package(s). These components may operate on one of the host systems 114a-114n, and may include one or more operating systems such as Windows XP®, Windows 7, Windows HPC Server 2008 R2, Unix®, or Linux®. It is further contemplated that the modules of the modeling system 219 may written in any one of a variety of computer programming languages such as C, C++, C#, Java®, or any combination(s) thereof, or other commercially available programming languages.

The GUI module 220 may display GUI windows in connection with obtaining data for use in performing modeling, simulation, and/or other problem solving for one or more processes and/or physics phenomena under consideration by a system user. The one or more processes and/or phenomena may be assembled and solved by the Modeling and Simulation module 222. That is, user data may be gathered or received by the system using modules, such as the GUI module 220, and subsequently used by the Modeling and Simulation module 222. Thereafter, the data may be transferred or forwarded to the Data Storage and Retrieval module 224 where the user-entered data may be stored in a separate data structure (e.g., User Data Files 228). Other data and information may also be stored and retrieved from a separate data structure, such as Libraries 226, which may be used by the Modeling and Simulation module 222 or in connection with the GUI module 220.

The various data files that may be associated with a modeling system, such as User Data Files 228 and the Libraries 226, may be stored in any one of a variety of data file formats in connection with a file system used in the host computer system or in the Data Storage System 112. In certain aspects, the modeling system 219 may use any one of a variety of database packages in connection with the storage and retrieval of data. The User Data files 228 may also be used in connection with other software simulation and modeling packages. For example, the User Data files 228 may be stored in a format that may also be used directly or indirectly as an input to any one of a variety of other modeling packages such as SolidWorks®, Autodesk Inventor®, Creo Elements/Pro, MATLAB®, or Microsoft Excel®. In certain aspects, data may be imported and/or exported between the multiphysics modeling system and another system, such as MATLAB® or Microsoft Excel®, for example. The format of the data may be varied or customized in accordance with each of the system(s) as well as in accordance with additional functionalities that each of the system(s) may include.

The systems and methods described herein may be used for combining physics interfaces that model different physical phenomena or processes. The combination of a plurality of physics interfaces can be referred to as a multiphysics model. Properties of the physics interfaces can be represented by PDEs that may be automatically combined to form PDEs describing physical quantities in a coupled system or representation. The coupled PDEs may be displayed, for example, in an "Equation view" that allows for the coupled PDEs to be modified and used as input into a solver. The PDEs may be provided to the solver either independently as one PDE or as a system of PDEs, describing a single phenomenon or process, or as one or several systems of PDEs describing several phenomena or processes.

In certain aspects of the present disclosure, a multiphysics modeling system can provide an ability to combine physics interfaces that model physical properties through one or more GUIs that allow a user to select one or more physics interfaces from a list. In addition to displaying physics interfaces names, variable names for physical quantities may be selected through a GUI. The physics interfaces may have different formulations that depend on a "Study" settings feature, which is described in more detail elsewhere herein.

In at least some aspects of the present concepts, a multiphysics modeling system provides the ability to access predefined combinations of several physics phenomena for defining multiphysics model(s). The predefined combinations may be referred to as multiphysics interfaces, which similar to the physics interfaces, may also have different formulations that depend on a study settings feature.

In certain aspects of the present concepts, physical properties can be used to model physical quantities for component(s) and/or process(es) being examined using the modeling system, and the physical properties can be defined using a GUI that allow the physical properties to be described as numerical values. Physical properties can also be defined as mathematical expressions that include one or more numerical values, space coordinates, time coordinates, and/or the actual physical quantities. In certain aspects, the physical properties may apply to some parts of a geometrical domain, and the physical quantity itself may be undefined in the other parts of the geometrical domain. A geometrical domain or "domain" may be partitioned into disjoint subdomains. The mathematical union of these subdomains forms the geometrical domain or "domain". The complete boundary of a domain may also be divided into sections referred to as "boundaries". Adjacent subdomains may have common boundaries referred to as "borders". The complete boundary is the mathematical union of all the boundaries including, for example, subdomain borders. For example, in certain aspects, a geometrical domain may be one-dimensional, two-dimensional, or three-dimensional in a GUI. However, as described in more detail elsewhere herein, the solvers may be able to handle any space dimension. Through the use of GUIs, physical properties on a boundary of a domain may be advantageously specified and used to derive the boundary conditions of the PDEs in accord with at least some aspects of the present concepts.

Additional features of a modeling system, such as features that may be found in the Modeling and Simulation module 222, may provide for automatically deriving a system of PDE's and boundary conditions for a multiphysics model. This technique can include merging the PDEs of the plurality of phenomena or processes, and may produce a single system of coupled PDEs, also using coupling variables or operators to couple processes in different coordinate systems, and may perform symbolic differentiation of the system of PDEs with respect to all the dependent variables for later use by the solver.

In certain aspects of the present concepts, a coupled system of PDEs is modified before being differentiated and sent to the solver. The modification may be performed using a settings window included in a GUI displaying the combined PDEs in an "Equation view". When the system of PDEs is modified in this way, the settings for the corresponding physical properties can become "locked". The properties may subsequently be unlocked by a user taking certain action(s).

In at least some aspects of the present concepts features for modeling one or more of a plurality of engineering and scientific disciplines, include, for example, acoustics, chemical reactions, diffusion, electromagnetism, fluid dynamics, geophysics, heat transfer, porous media flow, quantum mechanics, semiconductor devices, structural mechanics, wave propagation, and the like. Certain aspects of a modeling system may involve more than one of the foregoing disciplines and can also include representing or modeling a combination of the foregoing disciplines. Furthermore, the techniques that are described herein may be used in connection with one or more systems of PDEs.

In certain aspects of the present concepts, system(s) of PDEs are represented in general, coefficient, and/or weak form. The coefficient form may be more suitable in connection with linear or almost linear problems, while the general and weak forms may be better suited for use in connection with non-linear problems. The system(s) being modeled may have one or more associated studies, for example, such as stationary, time dependent, eigenvalue, or eigenfrequency. In the aspects described herein, a finite element method (FEM) may be used to solve for the PDEs together with, for example, adaptive meshing, adaptive time stepping, and/or a choice of one or more different numerical solvers.

In some aspects of the present concepts, a finite element mesh may include simplices forming a representation of a geometrical domain. Each simplex can belong to a unique subdomain, and a union of the simplices can form an approximation of the geometrical domain. The boundary of the domain may also be represented by simplices of the dimensions 0, 1, and 2, for geometrical dimensions 1, 2, and 3, respectively.

A mesh representing a geometry may also be created by an outside or external application and may subsequently be imported for use into the modeling system(s) described in the present disclosure.

The initial value of the solution process may be given as numerical values, or expressions that may include numerical values, space coordinates, time coordinates and the actual physical quantities. The initial value(s) may also include physical quantities previously determined.

The solution of the PDEs may be determined for any subset of the physical properties and their related quantities. Further, any subset not solved for may be treated as initial values to the system of PDEs.

It may be desirable for a user to select a space dimension, combinations of physics, and a type of study in a multiphysics modeling system using a model wizard. The model wizard may take the user through these selection steps and it may also allow for the combination of several space dimensions, several physics, and several studies or study steps in a multiphysics model.

Figure 3:
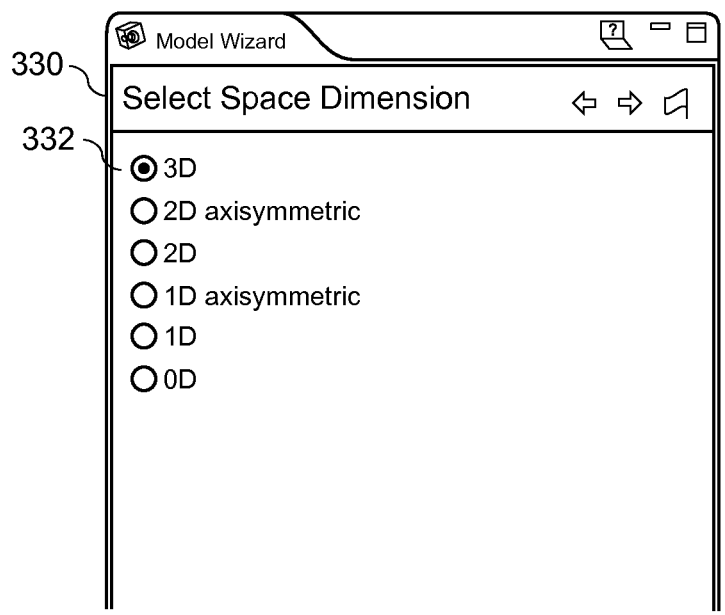
FIG. 3 illustrates an exemplary aspect of a graphical user interface for specifying space dimensions.

Referring now to FIG. 3, an exemplary aspect of a user interface or GUI 330 is illustrated that may be used to specify a space dimension 332 of a multiphysics model. The model may be specified in coordinate systems of the space dimensions including 0 dimensional (space independent, only time dependent), 1-dimensional, 1-dimensional axisymmetric, 2-dimensional, 2-dimensional axisymmetric, and 3-dimensional. A user may also be permitted combine models involving several of the above mentioned coordinate systems in order to describe phenomena or processes comprising multiple parts or scales.

Figure 4:
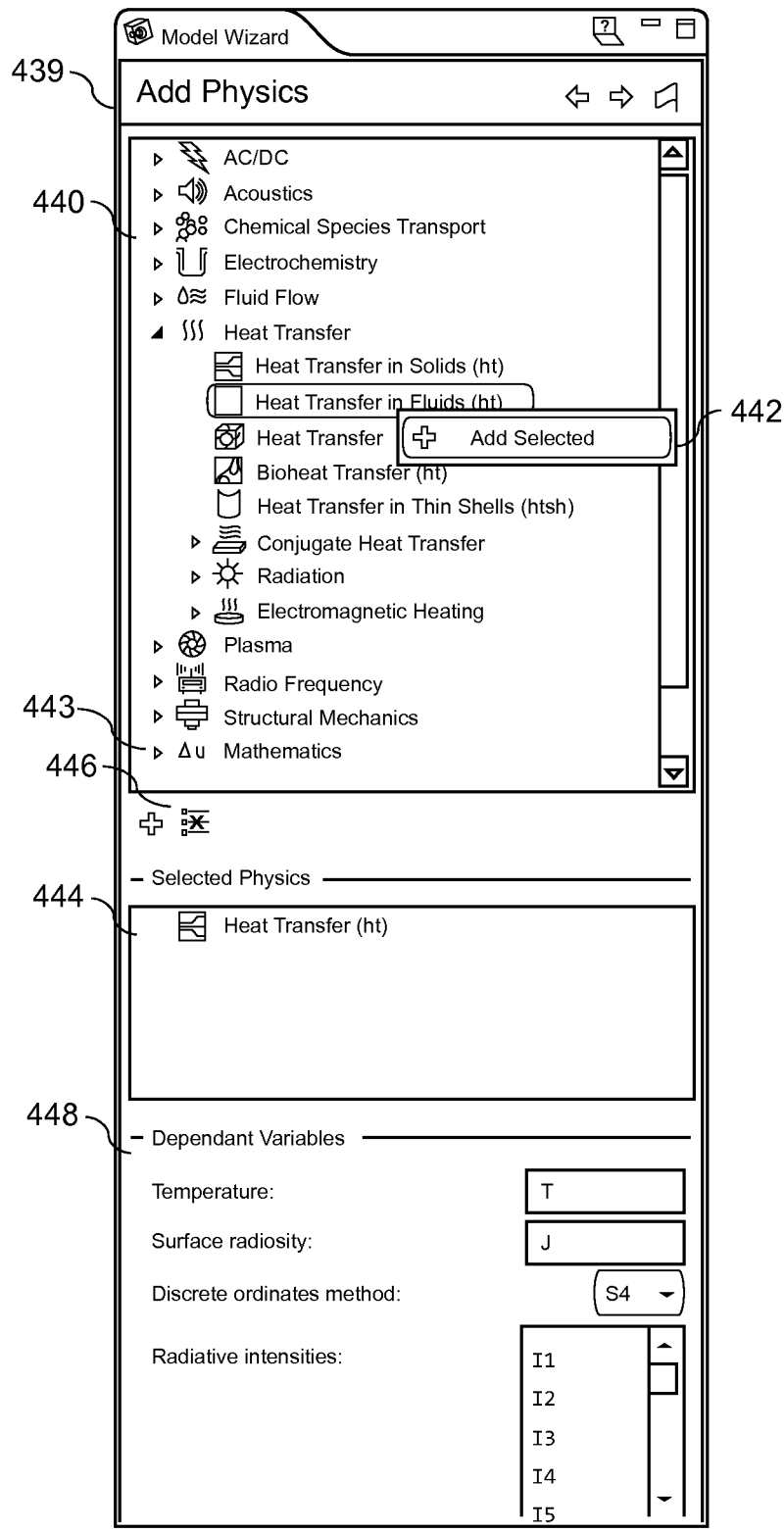
FIG. 4 illustrates an exemplary aspect of a graphical user interface for specifying physics interface(s).

Referring now to FIG. 4, an exemplary aspect of a user interface or GUI 439 is illustrated that may be used to specify a multiphysics model having a combination of more than one phenomena or process(es) (e.g., acoustics, heat transfer, and structural mechanics). It is contemplated that each phenomenon or process to be combined may correspond to a physics interface. Through the use of the GUI 439, the physics interfaces that are to be used in this combined multiphysics model may be specified. Each physics interface can be configured to model physical quantities in terms of PDEs. The physical quantities may be represented either directly as dependent variable(s) in the PDE, or by a relation between the dependent variable and a variable representing the physical quantity. The PDEs in this exemplary aspect may be generally "hidden" (e.g., not made directly visible) from the user through the use of GUIs. As discussed previously, once several physics interfaces are combined into one single model or a system of models, the model or models may be referred to as a multiphysics model.

The GUI 439 also includes an exemplary list of physics interfaces 440 (e.g., AC/DC, Electrochemistry, Radio Frequency, Structural Mechanics) from which a user may select in accordance with a user's choice of space dimensions. To add physics interfaces to a multiphysics model, the user selects physics interfaces from the list and may specify that these physics interfaces are to be included in a multiphysics model. For example, the user may right-click and then select context menu item "Add selected" 442 to add a physics interface (e.g., Heat Transfer in Fluids) to a multiphysics model. After selection, this physics interface is added to the list of "Selected physics" 444 below the physics list in the GUI 439. Physics interfaces may also be removed from the list by selecting a "Remove selected" button 446.

Each physics interface in a multiphysics model is given a unique name that may be used to identify the origin of the variables in the multiphysics model. After adding a physics interface to the "Selected physics" list 444, a user may edit the names of the dependent variables representing the physical quantities being solved for. For example, edits by a user may result in a new name for a variable, such as, for "Temperature" in the "Dependent variables" section 448 of GUI 439.

It is contemplated that the selectable interfaces can also include a mathematics interface 443 that is configured to directly correspond to PDEs. In the mathematics interface(s), quantities can be represented by the dependent variables for the multiphysics model. In some aspects of the present concepts, each mathematics interface may have more than one dependent variable. The number of dependent variables and the dimension of the system of PDEs may be entered in the "Dependent variables" section 448 in the GUI 439.

Figure 5:
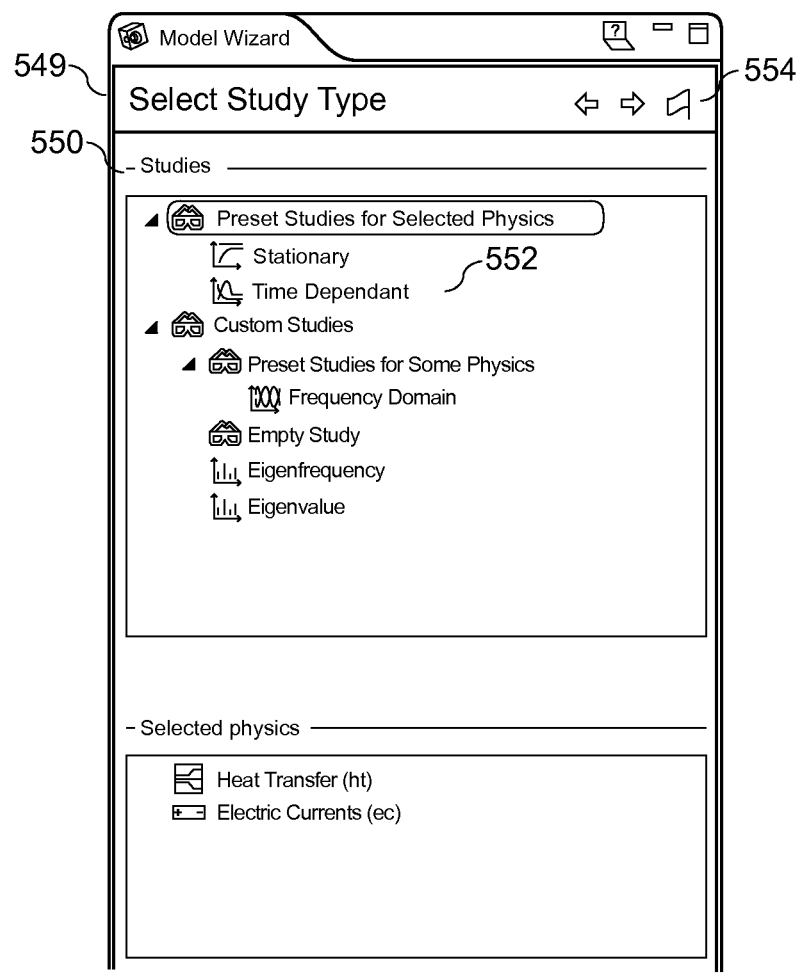
FIG. 5 illustrates an exemplary aspect of a graphical user interface for specifying study type(s).

Referring now to FIG. 5, an exemplary aspect of a user interface or GUI 549 is illustrated for specifying one or more study types for a multiphysics model. In certain aspects of the modeling system, an interface may include preset studies that are associated with selected physics interfaces. The interface may allow for customization of study steps where, for example, the studies for each of the physics interfaces are customized or some of the studies are preset (e.g., stationary, time dependent) and others are customized (e.g., eigenfrequency). A study may combine several study steps relevant for a simulation study of a multiphysics model.

In certain aspects of the present concepts, a study can determine the type of analysis that may be done on a multiphysics model, such as stationary, time-dependent, eigenvalue, and eigenfrequency. The study may control the type of equation formulation used in a multiphysics model, the type of mesh (e.g., selected from a list of possible meshes), and/or the type of solvers that may be used to solve the different studies or study steps in a multiphysics model. In one exemplary aspect, a study may comprise a stationary study step followed by a transient study step. The study then formulates the equations, meshes, and solvers for the stationary and time-dependent study steps. A user may select a study from the studies list 550 and then finish the model wizard steps by clicking the "Finish" button 554.

In certain aspects of the present concepts, multiphysics model data (e.g., selections made in GUIs 330, 439, 549) are communicated from the GUI (e.g., 220) to the Data Storage and Retrieval Module (e.g., 224) for storage in the User Data Files (e.g., 228). For example, a multiphysics model, such as one generated via model wizard steps previously described in FIGS. 3-5, including geometry, materials, physics interfaces, mesh, studies, and results, may be represented as a model tree in a GUI. Selecting (e.g., left clicking on, touching on screen, etc.) a node in a model tree may give a user access to the settings for the corresponding operation represented by the node. Further selection (e.g., right-clicking, touching on screen) of a node may also give a user access to a menu where a user may add properties and operations to the corresponding node. These added properties and operations may be represented as child nodes to the selected node.

In certain aspects of the present concepts, the foregoing screen display(s) (e.g., GUI 330) are displayed by and/or included as part of the software component for the GUI module (e.g., 220) of a modeling system (e.g., 219). A modeling system in accord with at least some aspects of the present concepts is configured to include different types of physics interfaces, including some that may be predefined and/or some that may be user-defined. A predefined physics interface (defined systems of PDEs, analysis types, GUIs and the like for a particular type of system, such as heat transfer) may be one for which the interface properties are included in Libraries (e.g., 226). A user-defined physics interface is configured to allow for user-defined models or physics interfaces for which a user may specify the PDEs, the quantities being modeled, and the like. The user-defined model may be saved in a user-defined library, such as a library included in the User Data files (e.g., 228). Definitions and other data files associated with a user-defined model may be stored in any one of a variety of data formats, for example, similar to those of the Libraries (e.g., 226). The format and operation may optionally vary for the stored models and model parameters.

Figure 6:
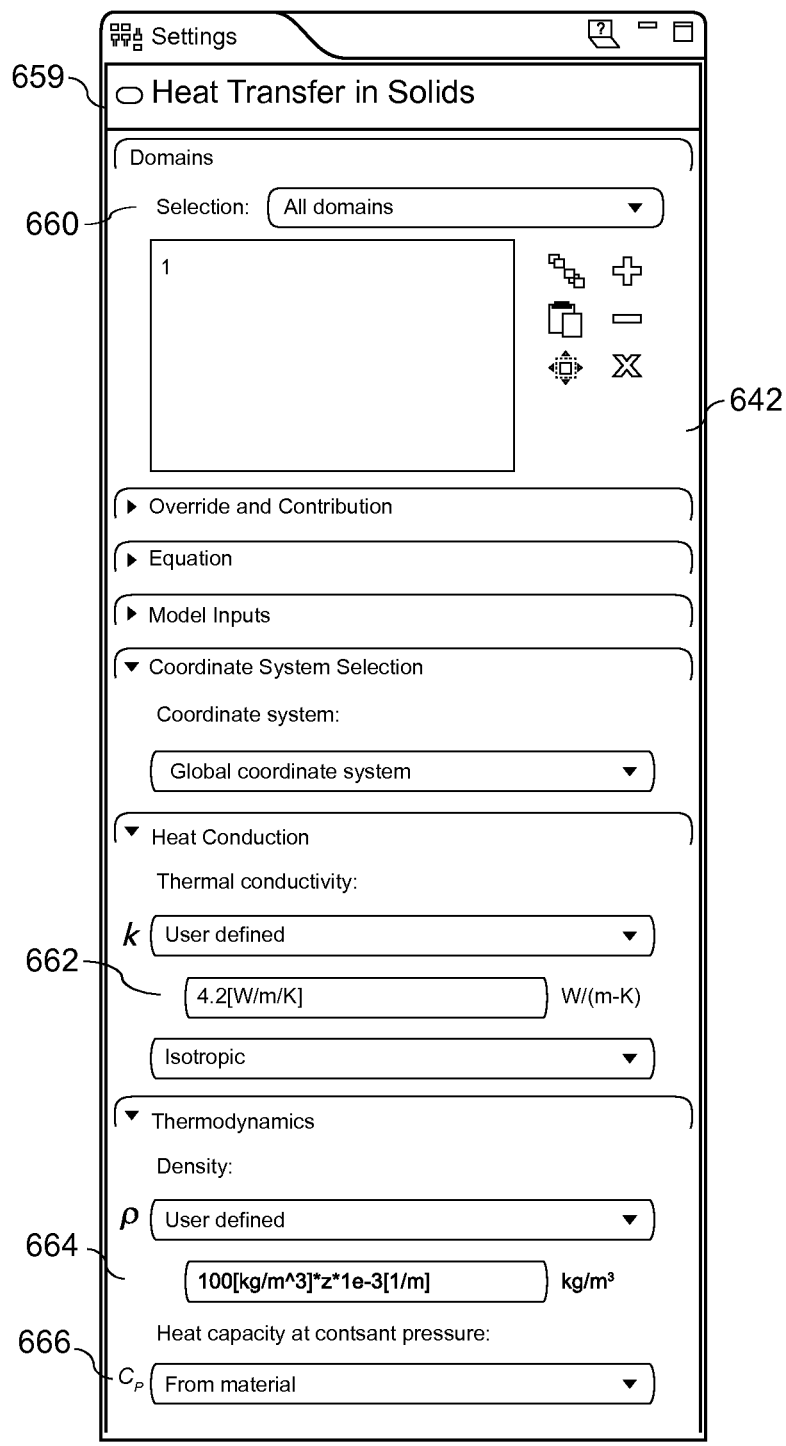
FIG. 6 illustrates an exemplary aspect of a graphical user interface for specifying physical propert(ies) for an exemplary physics interface.

Referring now to FIG. 6, an exemplary aspect of a settings window 659 is illustrated for physical property specification of an exemplary physics interface (e.g., heat transfer in solids). Each physics interface may have one or several GUI settings windows customized to the physics phenomena or process for which the physical properties associated with that physics interface may be specified. The physics interface and the settings for a physics interface may be represented, for example, as nodes in a model tree. Selecting (e.g., right-clicking on) a physics interface node in one example may open a form where a user can do one or more tasks, such as adding domain properties to a physics interface or a setting, renaming the node, or displaying properties about the selected node.

Settings window 659 includes a domain list 660 having one or more geometrical domains to which the physical properties may apply. The domains may also include subdomains. A user may select (e.g., via a mouse, touch-screen, keyboard, or other selection feature) one or several domains and/or subdomains by selecting directly from a graphical representation of the geometrical domain(s) in a graphics window. In certain aspects, the user may select one or more domains and/or subdomains from a predefined selection of domains (and/or subdomains) that represent a specific part of a component being modeled in a multiphysics model.

The physical properties of the domains (or subdomains) are specified in the settings window. As previously described, the physical properties may be expressed in different forms including being specified as numerical values 662, as symbolic expressions in terms of space coordinate(s) 664, physical quantities and their space derivatives, and/or time. Physical quantities may also be obtained from a materials setting 666 that may be defined elsewhere in the model. A physical property may be specified via a procedure or routine that computes a value of the property. The name or the procedure or routine may be entered in the settings window 659 along with parameters, if any, to be included. In one exemplary aspect, the procedure or routine may be written using C, MATLAB®, or Microsoft Excel®. The particular programming language for an implementation may vary in accordance with each particular aspect and the calling standards and conventions included therein.

Figure 7:
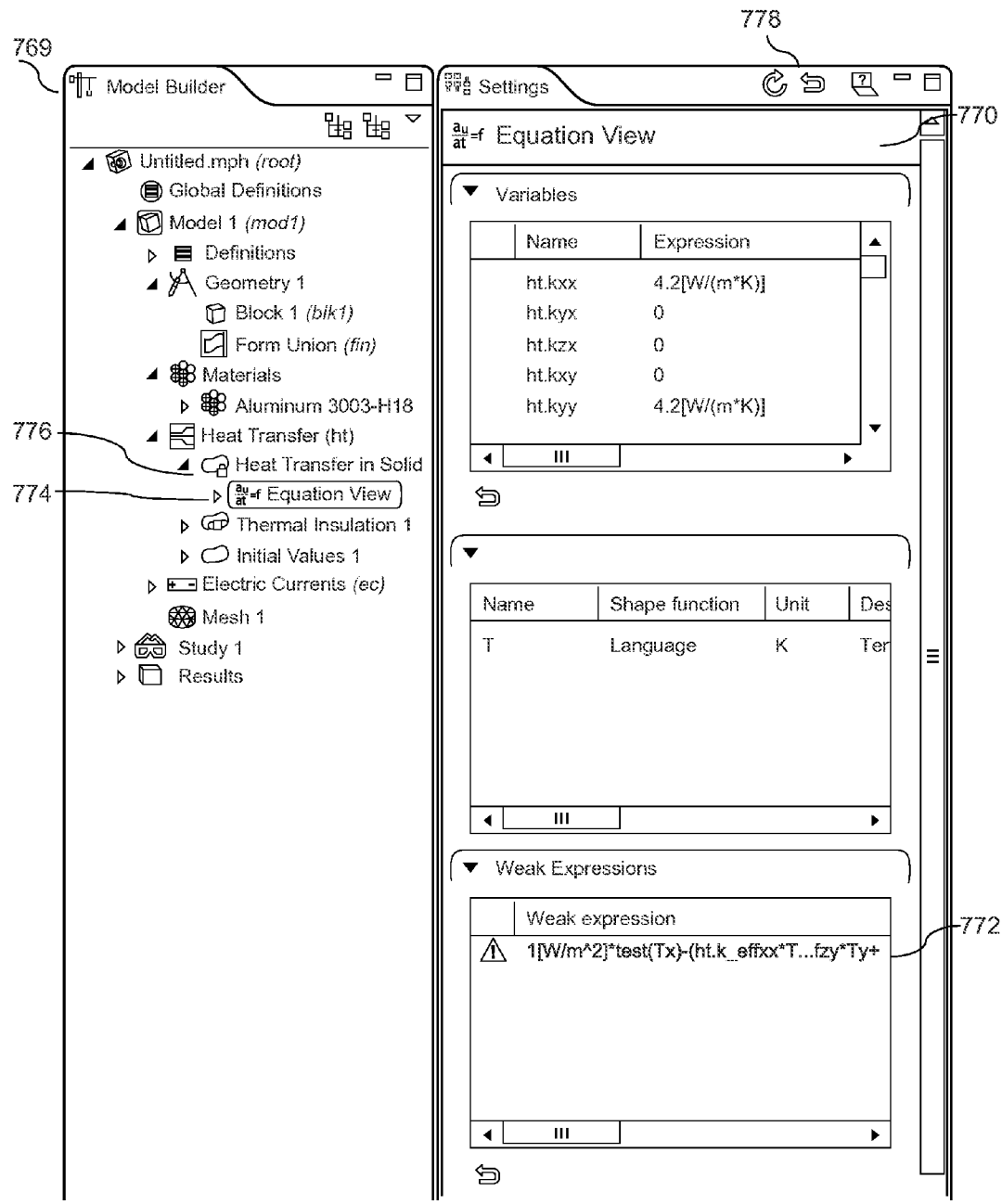
FIG. 7 illustrates an exemplary aspect of a graphical user interface for modifying partial differential equation(s).

Referring now to FIG. 7, an exemplary aspect of a GUI 769 is illustrated that may be used to modify the PDEs via an "Equation view" settings window 770. For example, PDEs, such as the exemplary equation 772, may be defined by a physics interface and further displayed and modified by a user in order to introduce description(s) that may not be defined in the settings windows for the corresponding property. In one exemplary aspect, the PDEs may be displayed in response to a user selecting a "Show equation view" element from a menu. In some aspects, each property of the model then displays a corresponding "Equation view" with a corresponding settings window 770 where changes to the equations may be made by a user. The "Equation view" may be represented as a child node (e.g., element 774) to a physics interface property node (e.g., element 776). It is contemplated that in certain aspects following a change to the settings window 770 for an "Equation view" node (e.g., element 774), the corresponding settings for the physics interface property may be locked. In one aspect, a lock indicia may be placed on the physics interface icon (e.g., element 776) to indicate that one or more properties for that interface of the model tree are locked. The property may also be unlocked by the user by, for example, selecting a "Reset all" feature 778, or other unlocking element, in the settings window for the corresponding a corresponding "Equation view" node 774.

Figure 8:
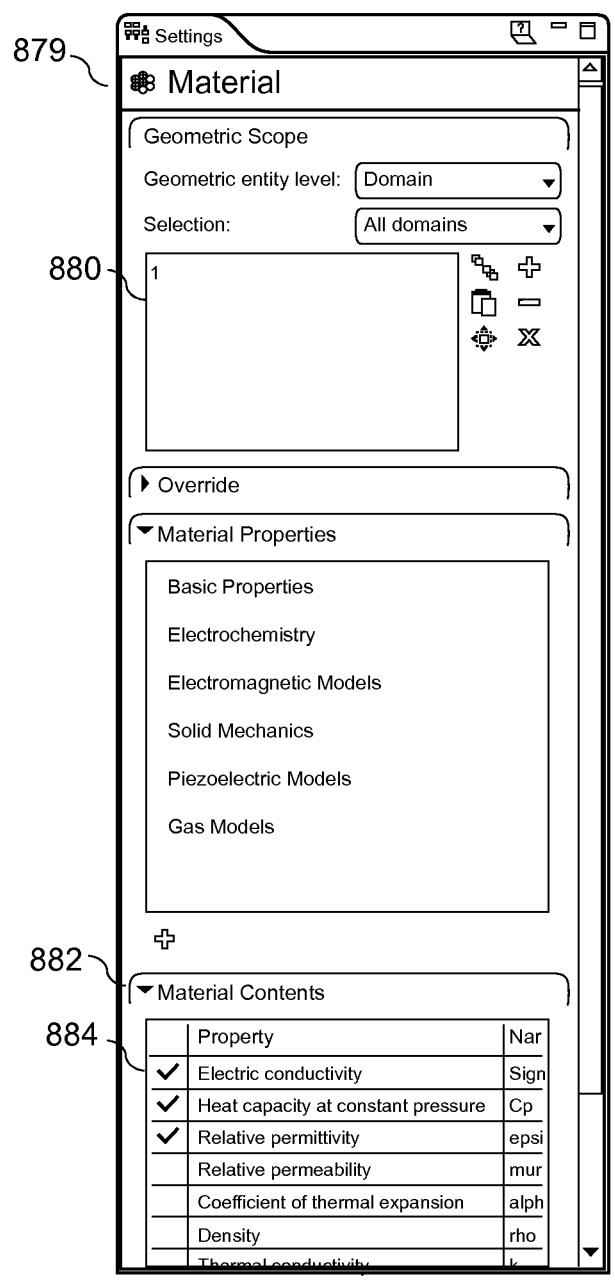
FIG. 8 illustrates an exemplary aspect of a graphical user interface for setting material propert(ies) for a domain in a multiphysics model.

Referring now to FIG. 8, an exemplary aspect a material settings window 879 is illustrated for setting material properties of a domain. Material settings can include material properties for some or all of the physics interfaces included in a multiphysics model. It is contemplated that a model can include different materials that are selected for the different domains identified in the domain list 880. The material properties may be defined by a user or they may be obtained from a predefined materials library. In one aspect of a material settings window, a material contents 882 list may display a status of the material properties for a selected material, in a selected domain, considering the physics interfaces in the multiphysics model. For example, in the context of an exemplary Joule heating process, the material contents list may label, using an icon, the properties associated with a multiphysics process involving Joule heating and the properties described in a multiphysics interface. The exemplary material properties may include, for example, heat capacity, thermal conductivity, electric conductivity, relative permittivity, and density. The material properties for describing Joule heating may be defined via the material settings window 879. Any required material properties may be labeled or otherwise identified with an icon 884 or other indicia (e.g., check mark). If a required material property is not defined, the material contents 882 list can identify the condition by highlighting the corresponding material property row (e.g., using a red stop sign icon).

It is contemplated that materials and material properties defined by a user can be saved and later accessed from user-defined material libraries for use in separate or different models. This aspect provides versatility by allowing users to create material libraries for specific applications and/or by allowing the creation of material libraries for use with a multiphysics modeling system.

In some aspects, materials and materials properties in a modeling system are represented via nodes in a model tree. This allows the materials and material properties to be displayed, renamed, and/or added to a node in a form accessible by a user (e.g., by right-clicking, touching, or otherwise selecting the corresponding node in the model tree).

Figure 9:
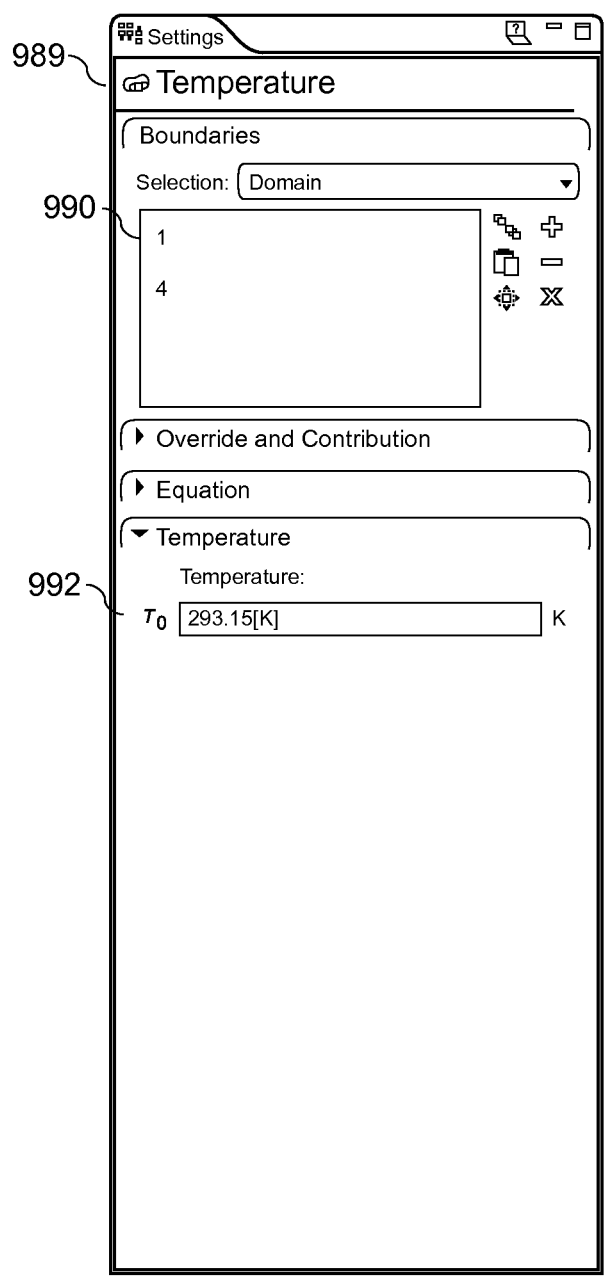
FIG. 9 illustrates an exemplary aspect of a graphical user interface for setting physical boundary condition(s) for an exemplary physics interface.

Referring now to FIG. 9, an exemplary aspect of a boundary condition settings window 989 is illustrated for a physical property boundary condition (e.g., temperature) for a physics interface (e.g. heat transfer interface). The settings window 989 may include a boundary list 990 to identify the geometric boundaries on which physical propert(ies) may apply. A user is able to include one or more boundaries in the boundary list by selecting one or more boundaries from graphical representations of the geometrical domain in one or more graphics windows. Selection of the boundary can occur via a selection-type device typically used for a computing system (e.g., mouse, keyboard, other selection device). A user may also select boundaries from a predefined selection of boundaries representing a specific portion of the boundary of a component being modeled in a multiphysics model. The specific portion may include the entire, or something less than the entire, boundary of the component.

The physical properties of geometrical boundaries can be specified in the boundary condition settings window 989 for a corresponding boundary. The properties can be expressed as values 992 specified in terms of numerical values, as symbolic expressions in terms of the space coordinates, or based on time. The properties can be expressed as the physical quantities and the corresponding space derivatives from a physics interface added using systems described elsewhere herein. A procedure or routine to determine the value of a property may also be specified and/or named in a manner similar to as described elsewhere herein.

Boundary condition settings in a modeling system may be represented via nodes in a model tree allowing a user to add boundary properties to a physics interface boundary condition, to rename a node, or to display properties about a node (e.g., by right-clicking or otherwise selecting the corresponding node in the model tree).

Figure 10:
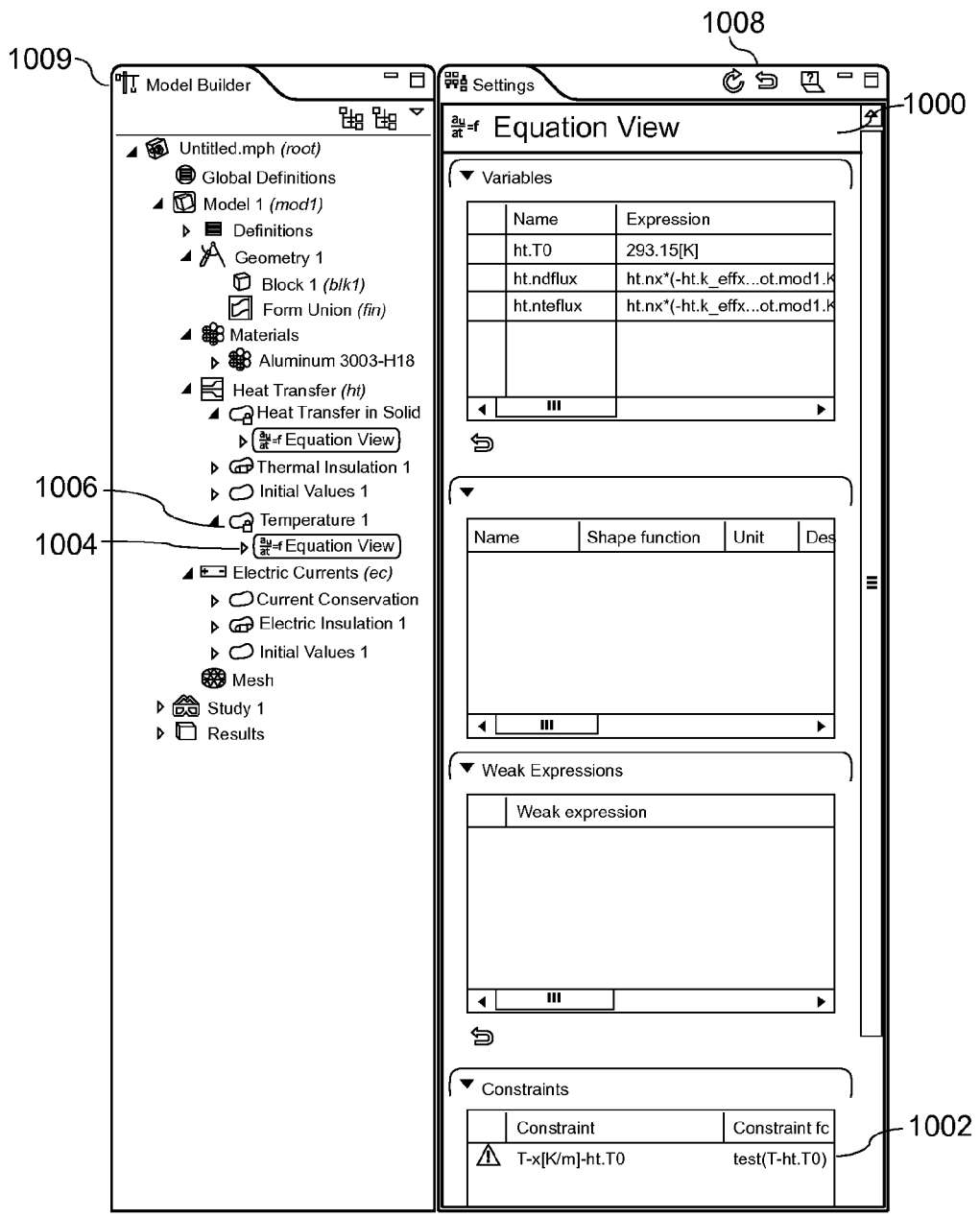
FIG. 10 illustrates an exemplary aspect of a graphical user interface for modifying partial differential equation boundary condition(s).

Referring now to FIG. 10, an exemplary aspect of a GUI 1009 is illustrated for modifying PDE boundary conditions via another "Equation view" feature 1000. Boundary conditions defined by a physics interface may be displayed 1002 and modified by a user in order to introduce description(s) that may not have been defined in the settings window(s) for the corresponding physics interface. In one embodiment, the boundary equations may be displayed by a user selecting, for example, a "Show equation view" item from a Preferences menu (not shown). Following a change to the PDE boundary equations using the "Equation view" feature (e.g., equation view node 1004), the corresponding settings for that boundary condition may optionally be locked. To identify the locked nature of the boundary condition, the boundary condition node 1006 for the boundary condition property in a model tree may include an indicia that looks like a lock. The boundary condition may be unlocked by the user selecting "Reset all" 1008 in the settings window, or some other unlocking feature, for the corresponding property.

Figure 11:
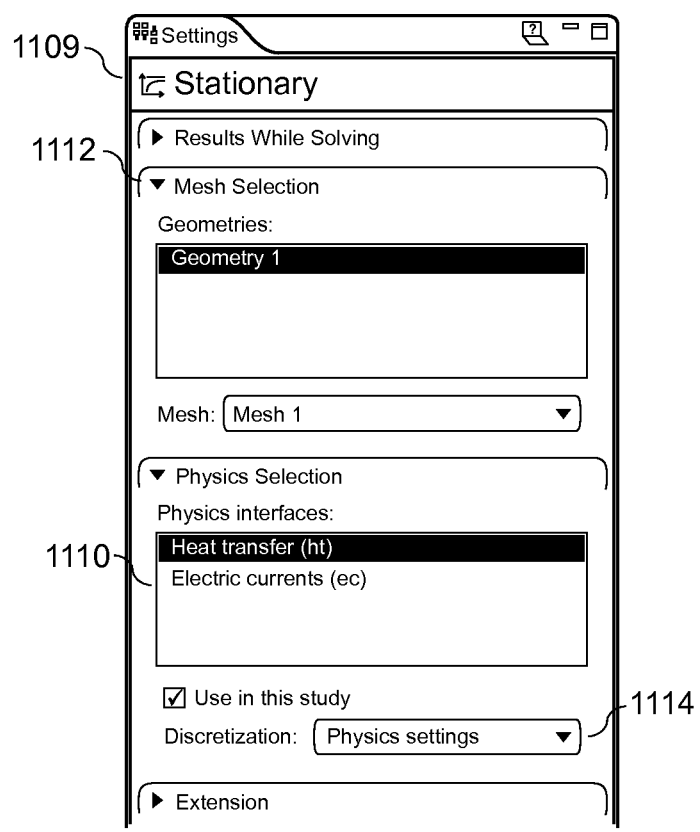
FIG. 11 illustrates an exemplary aspect of a graphical user interface for a settings window associated with a study step used to solve a study including partial differential equations.

Referring now to FIG. 11, an exemplary aspect of another type of settings window 1109 is illustrated for a study step (e.g., stationary, time dependent, frequency) that may be used in connection with solving for a study having one or more study steps. The settings window 1109 may be associated with solving PDEs for any subset of physical quantities from any one or more physics interfaces, or from a coupled PDE system. The GUI for the settings window 1109 includes a physics interfaces display area 1110 that lists the one or more physics interfaces selected for a multiphysics model. The settings window 1109 may also be configured to allow a selection of different meshes 1112 along with different discretization 1114 and tolerances for different study step. The particular physics interfaces for a model may be selected along with corresponding study step settings. Then, the corresponding PDEs may be solved one at the time in different study steps or the corresponding PDEs may be solved for several physics interfaces as a coupled system of PDEs in each study step.

Figure 12:
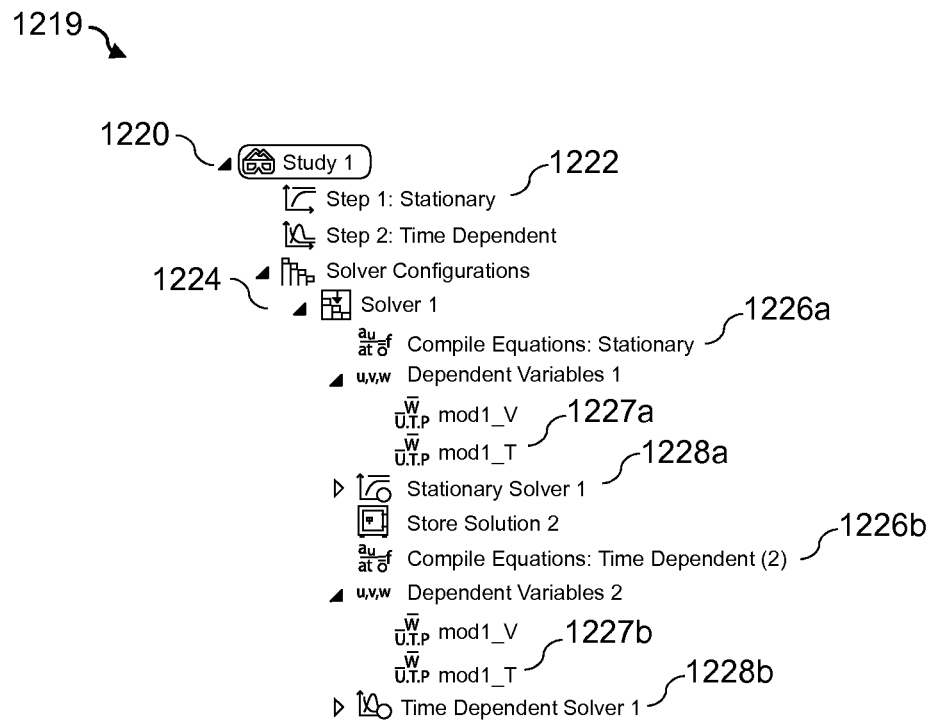
FIG. 12 illustrates an exemplary model tree including a primary node with secondary nodes.

Referring now to FIG. 12, an exemplary aspect of a model tree or a portion of a model tree 1219 is illustrated that includes a study node (e.g., "Study 1" 1220) along with several child nodes (e.g., "Step 1: Stationary" 1222, "Solver Configurations"). The child nodes in this exemplary aspect include study steps (e.g., "Step 1: Stationary" 1222, "Step 2: Time Dependent") and solver node(s) (e.g., "Solver 1" 1224). A parent node (e.g., primary node) and its child nodes (e.g., secondary nodes, subnodes) may be referred to as branches (e.g., the study branch) within an overall model tree. The study branch may include, for example, PDE formulations (e.g., "Compile Equations: Stationary" 1226a, "Compile Equations: Time Dependent 2" 1226b) and solver settings (e.g., "Stationary Solver 1" 1228a, "Time-Dependent Solver 1" 1228b) for the different studies (e.g., a stationary and a time-dependent analysis, respectively) under a Solver Configurations node. It is contemplated that a user may select a subset of the models physics interfaces to be solved in each of the study steps or select to solve for all physics interfaces in every study step. It is further contemplated that a user may also include several model nodes with corresponding physics interfaces, representing models described in different spatial dimensions, and solving a subset of the physics interfaces in each of the study steps or all physics interfaces in every study step. The selection of physics interfaces in each study step and the settings for a study step can also be included in a model object.

The solver branch (e.g., Solver Configurations) of exemplary model tree 1219 is a child node to the study branch (e.g., Study 1) and can also include its own child nodes, such as a solver (e.g., "Solver 1") and/or a dependent variable node (e.g., "Dependent Variables 1"). These child nodes may further have additional or their own child nodes, such as "mod1_V" 1227a and "mod1_T" 1227b. The dependent variable node may be configured to allow a user to make a finer selection of the solution in every study step, so that the solver may be set to solve or not solve for individual variables within a physics interface. It is contemplated that a selection of dependent variables in the solver step and the settings for a solver step are also reflected in the model object.

The exemplary aspects of the modeling system presented in FIGS. 3-12 are merely examples and are understood to apply to broader physics processes and physic phenomena, not just the processes or phenomena described herein or illustrated in FIGS. 3-12. For example, it would be understood that many different physics interfaces may be evaluated beyond the selected physics for heat transfer that is illustrated in FIG. 4. As another example, it is also understood that multiple equation views can be viewed in FIG. 7 or that many different material properties may be selected in FIG. 8. The illustrated aspects are merely examples of the broader operations that may be performed by the multiphysics modeling system. Furthermore, the illustrated interfaces are representative of one type of interface that may be used in a multiphysics modeling system. Other types of graphical, user, or alternative input-type interfaces are contemplated.

Figure 13:
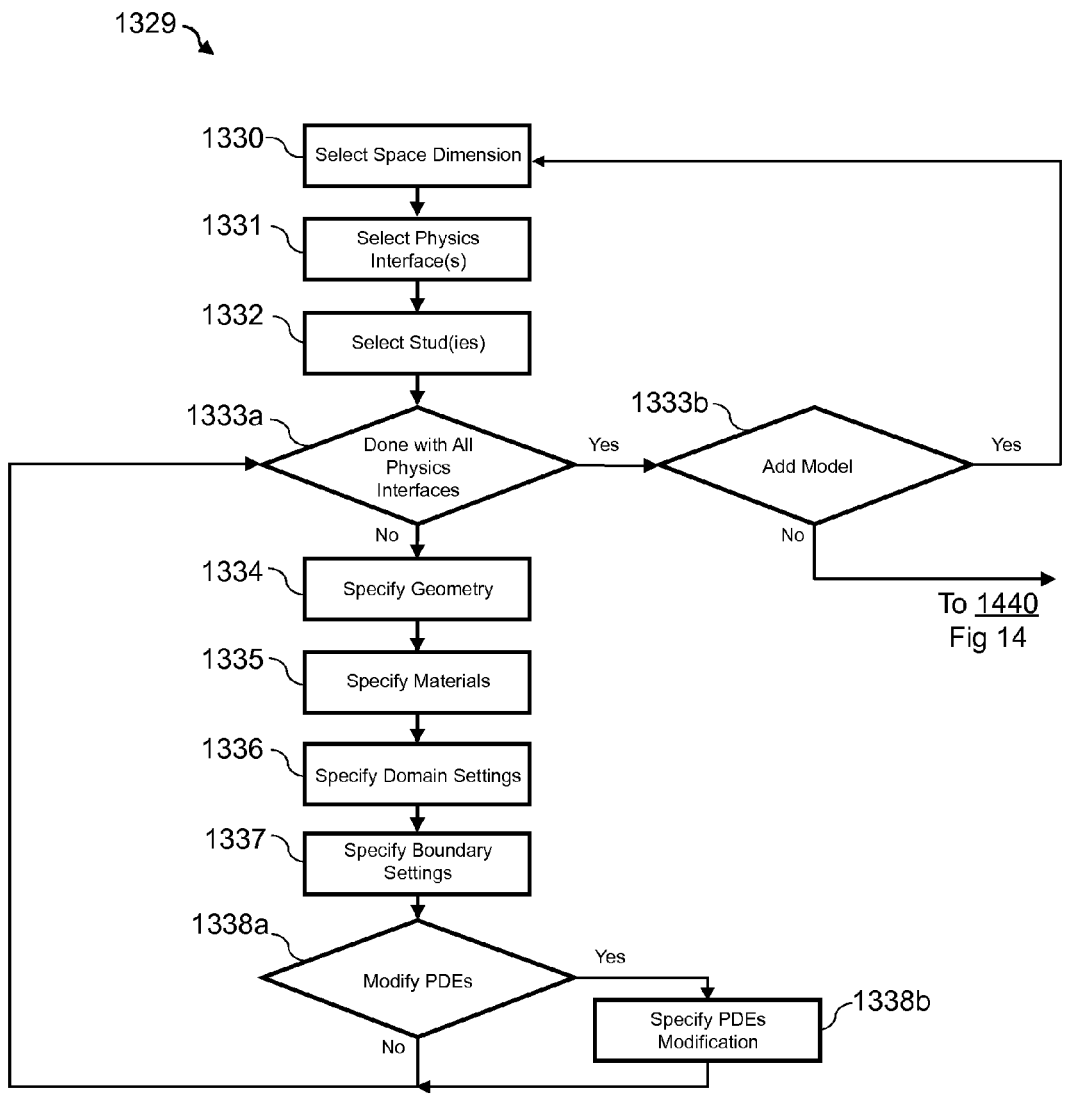
FIGS. 13-15 are flowcharts of steps for an exemplary aspect for specifying and solving systems of partial differential equations in a multiphysics modeling system.
Figure 14:
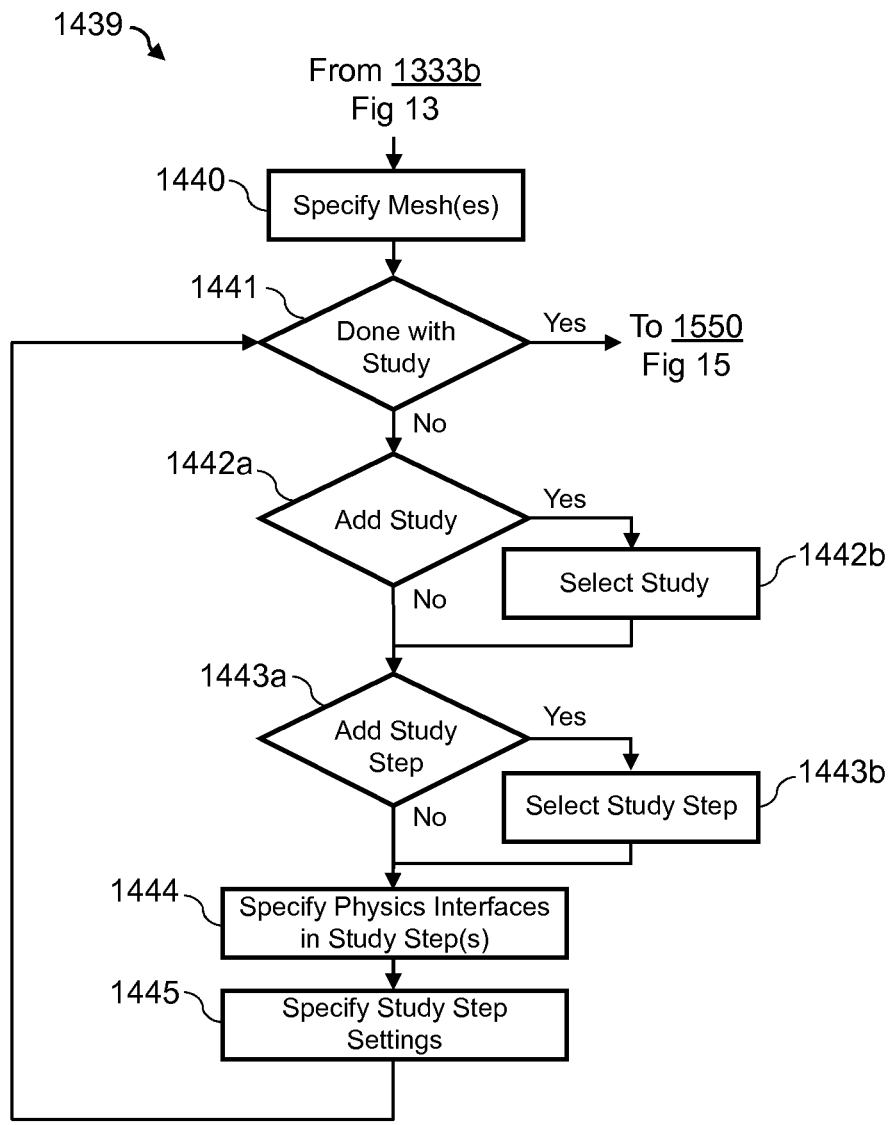
Figure 15:
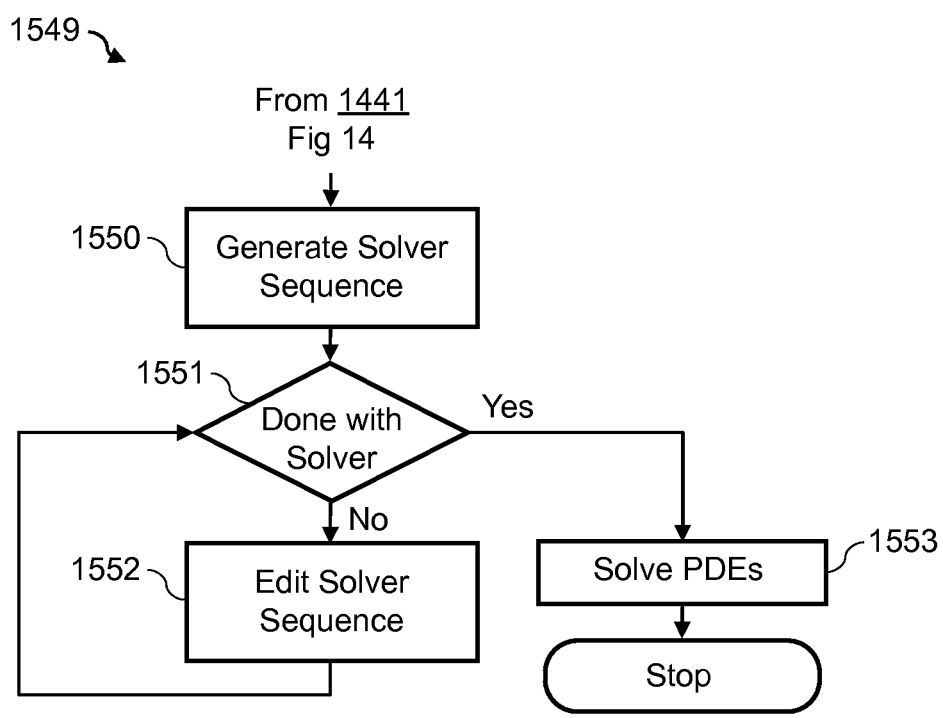

It is contemplated that in certain aspects of a modeling system it may be desirable for the PDEs and boundary conditions for the various selected physics interfaces associated with a coupled system of PDEs to be stored in a model object, which is described in more detail in the descriptions for FIGS. 13-15. A model object may be desirable because if the PDEs and boundary conditions are modified, for example, using the GUI 769 in FIG. 7, the corresponding model object may be updated accordingly. For example, through the use of the settings windows for domains and boundaries, respectively, the physical properties for the domains and boundaries along with possible modifications specified in "Equation view", the Modeling and Simulation Module 222 (see, e.g., FIG. 2) in one exemplary aspect may create, initialize, and modify a model object that includes data associated with a multiphysics model. It is furthermore contemplated that the coupled system of PDEs and associated boundary condition fields may be updated, as well.

Referring now to FIGS. 13-15, non-limiting exemplary flowcharts 1329, 1439, 1549 are illustrated for method(s) including acts for automatically specifying one or more systems of PDEs, representing the system of PDEs in a single coupled form, and solving for the system of PDEs. The various aspects described for the present disclosure can be implemented using object-oriented programming languages (e.g., Java®, C++, C#) where an object is a type of data structure that includes data fields and methods along with their interactions. For example, objects in a model can be created, modified, and accessed by method calls for a model object. A model object may include the algorithms and data structures for the model and may be further used to represent the model. The model object can further include methods for setting up and executing sequences of operations to create geometry, meshes, and solutions for the model.

The methods of the model object can be structured in a tree-like manner, such that methods calls can be associated with the operations represented by the nodes in a model tree. By operating with such a tree-like or model-tree type structure, top-level methods (e.g., represented as parent nodes) may return references that support further methods (e.g., represented by child nodes or otherwise). At certain levels within the model object, the method will perform certain acts, such as adding data to the model object, performing computations, or returning data. In the exemplary aspect of a geometry node, a model object may have different operations associated with the geometry of a model that are represented by secondary nodes (e.g., child nodes) to a geometry node.

Referring now to FIG. 13, at step 1330, a space dimension is selected either directly (e.g., actual selection) or indirectly (e.g., through a step associated with a predefined feature) by a modeling system user. It may be desirable for the selection of a space dimension to occur using the wizard window, previously described in FIG. 3, or through another type of interface. Selection of a space dimension can include an automatic update of a model object with a model item having a method call syntax, such as, model.modelNode( ).create (<model tag>), and/or a geometry item that specifies the space dimension using a method call syntax, such as, model.geomQ.create(<geometry tag>,<space dimension>), using concepts of string tag(s) to uniquely identify, for example, a geometry.

Next, at step 1331, the selection of physics interface(s) may be performed. The selection(s) can occur using, for example, the wizard window described for FIG. 4. Selection of the physics interface(s) can include updating the model object and adding corresponding physics item(s) in the model object, such as, model.physics( ).create(<physics tag>, <physics type>, and others). Next, at step 1332, the type(s) of stud(ies) may be selected. For example, the selection of a study may be made using the wizard windows previously described in FIG. 5. It is contemplated that the selected stud(ies) can be later used to automatically generate equation formulations and solver settings. It is further contemplated that the model object can be updated with a corresponding study item, such as, model.studyQ.create(<study tag>). In certain aspects, some or all of the created model object items may be equipped with child items that may be represented by nodes in the model tree. The nodes may describe the operations specified in the model wizard and/or in the settings windows described above.

At step 1333a, a determination is made if the settings for the physics interfaces have been selected. If the logical determination is true, the method then proceeds to step 1333b, where another determination is made if a model is to be added. If another model is to be added (i.e., true) to the component(s) and/or process(es) already received by the modeling system, the method then returns to step 1330 to receive input associated with the additional model. A new model item, such as, model.modelNodeQ.create(<model tag>), may then be added including a model item with different or the same space dimensions than the already available model. This allows for the simulation of multiple processes in a multiphysics model. If no additional models are to be added (i.e., false), the method can proceed to step 1440. If the logical determination in step 1333a is false, the method then proceeds to step 1334, where for each physics interface a geometry is specified, except for zero-dimensional physics interfaces where the assigned geometry is a point. In at least some aspects geometric representation(s) may be created or otherwise imported from a geometry file (e.g., a file created using a CAD system) and the model object for the geometry can be updated to include a geometric representation.

At step 1335, a specification of materials and corresponding material properties is made. It is contemplated that selection of materials and material properties may be performed, for example, using the settings windows previously described in FIG. 8. The model object may be updated with a corresponding material item, such as, model.materialQ.create (<material tag>). Next, at step 1336, the specification of physical properties in the different domains and for the different physics interfaces may be performed. It is contemplated that the specification of domain settings may be performed, for example, using the settings windows previously described in FIG. 6 or a similar feature. At step 1337, the physical properties and interactions at the boundaries may be specified for the different physics interfaces. It is contemplated that the specification of boundary conditions may be performed, for example, using the settings windows previously described in FIG. 9 or a similar feature. It is further contemplated that the model object can be updated for both domain settings and boundary conditions using model object items of the type, such as, model.physics(<physics tag>) .feature(<feature tag>).

At step 1338a, a determination is made if any of the PDEs for the physics interfaces are to be modified. If the logical determination is true, the method proceeds to step 1338b, where predefined PDEs for some or all of the physics interface(s) can be changed, including domain equations and/or boundary conditions. Specification of the predefined physics interface equations in the PDEs modification step may be performed, for example, using the settings windows previously described in FIGS. 7 and/or 10. Step 1338b may also include updating the model object. If the logical determination is false, or after the PDE modification step is performed, the method may then proceed back to step 1333a.

Upon completion of the specification of all physics interfaces and upon no more models being added for the component(s) and/or process(es) being modeled, the method then proceeds to FIG. 14 and step 1440 where the mesh(es) may be specified (see, e.g., FIG. 11). The specification of the mesh can include updating the model object with a mesh item, such as, model.mesh( ).create(<mesh tag>, <geometry tag>).

Next, at step 1441, a determination is made if all the desired study parameters have been included for the model. If the logical determination is true, then the method proceeds to step 1550. If the logical determination is false, the method proceeds to steps for adding a study and/or adding a study step. For example, at step 1442a, a determination is made if a new study is to be added. If the logical determination is true, then the method proceeds to step 1442b, which allows for the selection of the additional study. The additional study may be added according to study item, such as, model.studyQ.create (<study tag>). Following the selection of the additional study or if the logical determination in step 1442a is false, the method can proceed to step 1443a, where a determination is made if study step(s) are to be added. If the logical determination is true, the method proceeds to allow study step(s) to be added for the model at step 1443b. Once the study step(s) are selected or if the logical determination at step 1443a is false, the method proceeds to steps 1444 and 1445 where the physics interfaces in the study steps are specified along with the study step settings. The study settings may be specified, for example, using the settings window described for FIG. 11. The study settings may update the model object according to one or several items of the type, such as, model.study(<study tag>).feature(<feature tag>).set(<property>,<value>). Following completion of the study settings, the method proceeds to step 1550.

Referring now to FIG. 15, at step 1550, a solver sequence is generated, and at step 1552, the solver sequence can be edited based on a decision at step 1551 depending on whether the solver is determined to be complete. The solver sequence can update the model object by creating an item, such as, model.sol( ).create(<solver tag>, and others), based on the stud(ies) associated with the model object. The solver sequence can be edited with items being added according to the model object item, such as, model.sol(<solver tag>).feature( ).create(<feature tag>). Then, at step 1553, the method solves the PDEs and can generate a solution for the model. It is contemplated that the solution step can be updated by the model item, such as, model.sol(<solver tag>).runAll( ).

FIGS. 13-15 describe non-limiting exemplary aspects of method(s) for automatically forming one or more sets of PDEs associated with one or more physics interfaces and one or more geometric representations (e.g., models that represent components or processes) in different space dimensions. In certain aspects of the method(s), the PDEs may be combined into a single, combined system of PDEs. A numerical solver, such as a finite element solver may be included, for example, in Modeling and Simulation Module (e.g., 222) and may be used to solve a system of PDEs. The finite element solver, for example, may solve a single system of PDE corresponding to a single physics interface or may solve for a coupled system of PDEs corresponding to several physics interfaces and several geometric representations (e.g., represented by model nodes).

Turning now to FIGS. 16-29, a flowchart for a method for creating a physics interface data structure and several exemplary features associated therewith are illustrated.

Figure 16:
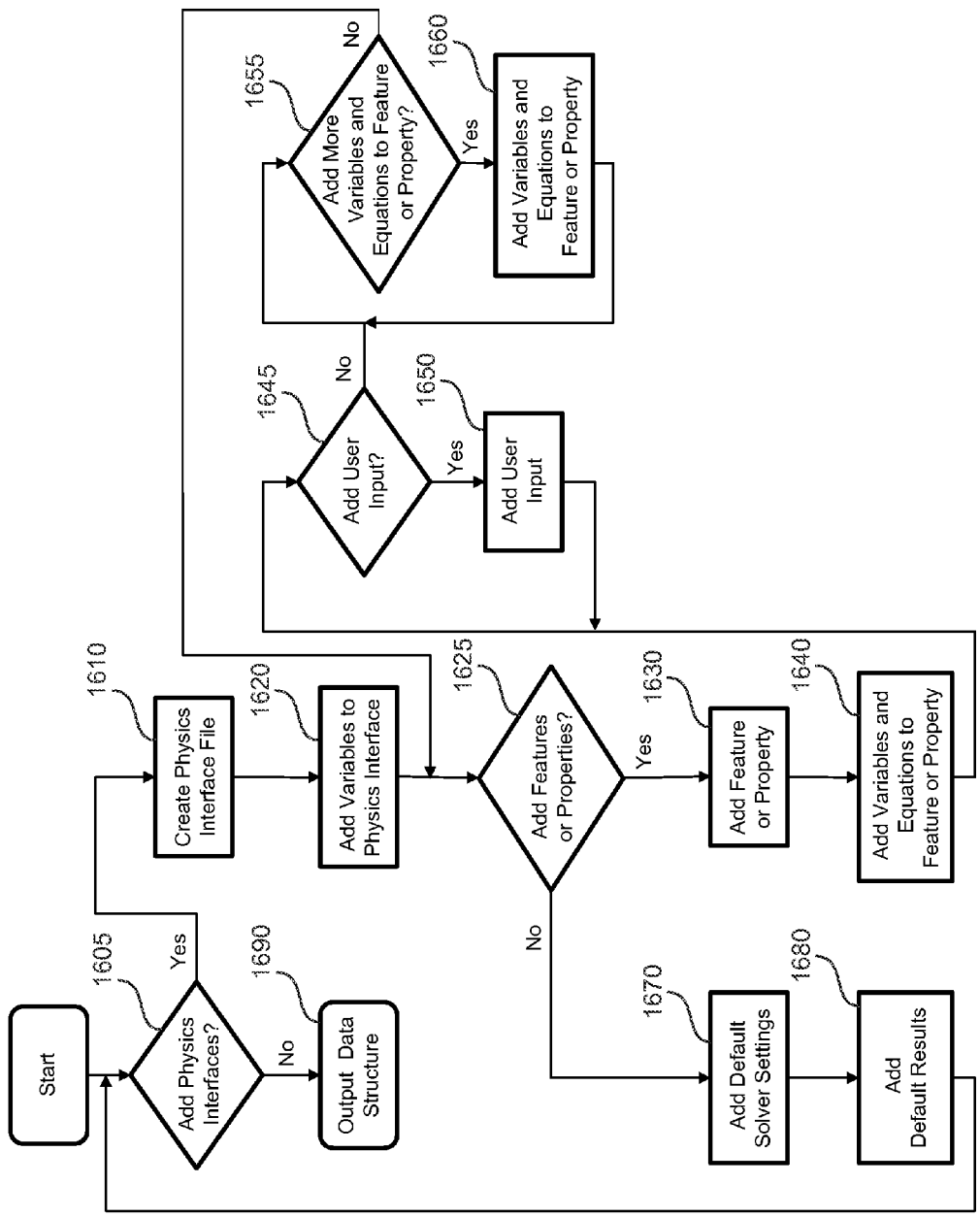
FIG. 16 is a flowchart for an exemplary method for creating a physics interface data structure.

FIG. 16 is a flowchart for an exemplary method for creating a physics interface data structure. The method may be executed as part of a physics interface builder module that may be a standalone system that interfaces or connects with an engineering analysis system, such as a multiphysics modeling system. The physics interface builder module may be a one of a plurality of modules or routines that comprise an engineering analysis system. The physics interface builder module can include or be connected with a user interface, such as a graphical user interface, that seeks inputs and displays instructions to a user of the physics interface builder.

The method for creating the physics interface data structure can begin with step 1605, where a user may be prompted or input may be requested of whether a physics interface is to be added. If the logical inquiry is a positive or the user indicates to add a physics interface, the method then proceeds to step 1610. At step 1610, a physics interface file or record is created within the physics interface builder module or that is accessible by the physics interface builder module. The physics interface file contains a physics interface data structure. In addition, step 1610 may also include adding a physics interface class along with specifying names, identifiers, relevant space dimensions, relevant study types, and possible geometric scopes for the physics interface. The adding of the physics interface class and specifications may occur by user prompts via a user interface, menu selections, or through inputs received via an alternate interface.

The physics interface is advantageously available in, or accessible to, an engineering analysis system, such as a multiphysics modeling system, to generate a model described in a model object (e.g., a model data structure including data fields and methods along with their interactions) in accordance with an object-oriented programming language (e.g., C++, C#, Java®).

It is contemplated that a physics interface may be represented as a physics branch containing physics nodes describing a multiphysics model's setting, such as described elsewhere herein for aspect of a multiphysics modeling system using model tree features. The physics branch and nodes may be included in a graphical user interface and the described settings may include, for example domain settings and boundary conditions.

The physics interface builder may allow a user, either in step 1610, or at another juncture, to name the physics interface. For example, the name of a physics interface may be descriptive of the physics it defines and it may also be displayed in the user interface (e.g., the model tree) in the engineering analysis system, such as a system implementing multiphysics software. The name may be changed by a user of the system or by the multiphysics software itself in the situation where several physics interfaces of the same type are added to a multiphysics model. For example, the name of a physics interface may be "Joule Heating" and this may be changed by a user, for example to "Heating in Amplifier" to denote Joule heating in an amplifier. It is also contemplated that if, prior to name change, two physics interfaces of the same type are added to a model, the multiphysics software may rename these interfaces automatically to "Joule Heating 1" and "Joule Heating 2" to minimize confusion.

The type of a physics interface may be used by the model object to construct a model using a physics interface. In the example above, the type may be "Joule_Heating". The type may be non-editable in an engineering analysis system, such as a multiphysics software, as it is used as a reference by the method that constructs the physics in a model. The type may also be non-unique in the example of a multiphysics software, which implies that if two Joule heating interfaces are added to a multiphysics model, both interfaces may get the same type, for example "Joule_Heating", since they both access the same methods. As discussed previously, the name and study type for an added physics interface may be defined in method step 1610 in the physics interface builder for use, as described above for example, in the context of a multiphysics modeling system.

In certain aspects, in a similar manner as for the physics interface name and type, a physics interface may also have a default identifier and a tag. These default identifiers and tags may be used to create expressions in the user interface in a multiphysics software and for the model object to generate expressions in an object-oriented programming code. It may be desirable for a default identifier to be used in variable scoping and for the identifier to be editable by a user of a multiphysics software. For example, using a default identifier "jh" for a Joule heating physics interface may result in a variable scoping syntax that denotes heat flux by "jh.q". A user of a multiphysics software may change the default identifier to, for example, "ha" to identify the exemplary "Heating in Amplifier" physics interface described above. The reference to the heat flux may then be changed to "ha.q".

A tag can provide a short reference to a physics interface that may be used by the model object in a model in, for example, a multiphysics modeling system. In certain aspects, the tag may be non-editable in the multiphysics modeling system, but editable in the physics interface builder module. A tag may be used as reference, together with the study type, by the methods that construct the physics in a model in, for example, a multiphysics modeling system. It is further contemplated that a tag may be unique to a physics interface in a multiphysics modeling system, which means two physics interfaces of the same type in a model may get different names, for example "jh1" and "jh2" in the exemplary Joule heating descriptions above. The tag may also be used to define a default identifier for a physics interface. It is contemplated that step 1610 may include operations for defining a default identifier and tag, as described above for example, in the context of a multiphysics modeling system.

It is contemplated that the physics interface builder module can be applied to a create physics interface data structure that applies to several space dimensions (e.g., zero dimensional, one dimensional, one-dimensional axisymmetric, two dimensional, two-dimensional axisymmetric, three dimensional). In certain aspects of the present disclosure, the physics interface builder module is configured to build a single physics interface data structure that can accommodate multiple dimensions such that building separate physics interface data structures for every space dimension could be overcome or at least minimized. Some physics phenomena may not, for example, be relevant in a zero dimension or a one dimensional scenario, and thus, these space dimensions can therefore be omitted from a list of allowed space dimensions for a physics interface. In certain aspects of the present disclosure, it can be beneficial to determine the allowable (e.g., depending on the physics) or desired space dimensions in step 1610 of the method illustrated in FIG. 16, particularly since the space dimension can affect subsequent steps for creating the physics interface data structure.

In certain aspects of the physics interface builder module, a physics interface may be configured for different study types, such as stationary and time-dependent studies. It is contemplated, therefore, that it may be desirable for step 1610 to be configured for determining the study types for a physics interface. It may be further desirable to determine study type(s) in step 1610 to the extent such study type(s) may influence the remaining steps for creating a physics interface data structure.

In certain aspects of a physics interface builder module for creating a physics interface data structure, step 1610 may include determining a top geometric entity level that is valid for a physics interface being formulated by the builder. In certain aspects of certain engineering analysis or modeling scenarios, the top geometric entity level is the domain level, which is where the domain equations are formulated. The lower geometric entity levels may then be the boundary, edge, and point levels, in no particular order. In certain aspects, such as formulations for shells, the boundary level is the top geometric entity level. Where the boundary level is the top geometric level, the lower levels in the example of a three-dimensional shell may be the edge and point levels. In two-dimensional shell formulations, the lower level is the point level. The application of geometric entity levels can be beneficial because it allows for the formulation of one interface for several space dimensions.

Many of the features defined in later steps for the exemplary method of creating a physics interface can be automatically defined for different space dimensions using generic notations for the feature equations and the equation contributions. It may therefore be desirable in certain aspects of the method to determine the top geometric entity level in step 1610 as the top geometric level may influence later steps in the method.

In certain aspects of the method for creating a physics interface data structure, the method can also include determining the default frame for the formulation of the physics interface in step 1610. The default frame may be the mesh, material, or spatial frames. Physics may be formulated in a spatial or material frame, which may depend on whether it is more convenient to interpret the physics equations as Eulerian or Lagrangian formulations, respectively. The Eulerian formulation describes the physics from a reference point in space while in the Lagrangian formulation, the coordinate system may follow the movement of the material where the physics is defined. The mesh frame can be used both for the Eulerian and Lagrangian formulations.

Figure 17:
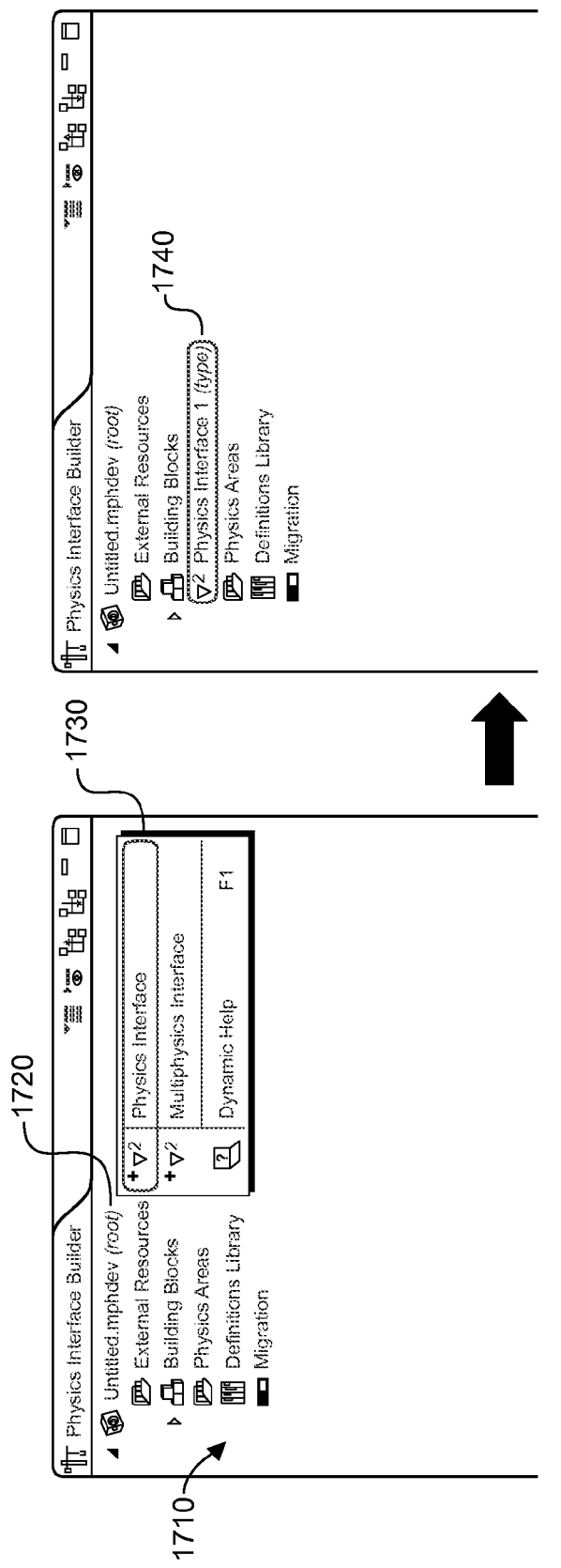
FIG. 17 illustrates an exemplary physics interface builder tree that may be included in a method for creating a physics interface data structure, according to one aspect of the present disclosure.

Referring now to FIG. 17, an exemplary physics interface builder tree 1710 is illustrated that may be included in a method for creating a physics interface data structure. More specifically, FIG. 17 illustrates a non-limiting embodiment of a graphical user interface for an aspect of step 1610 from FIG. 16. Selection (e.g., touching, right-clicking via a mouse) of a root node 1720 in the physics interface builder tree may open and/or display a context menu 1730 where a physics interface class may be selected and added to a physics interface builder data structure. This physics interface class may be represented as a physics interface node 1740 (e.g., Physics Interface 1) in the physics interface builder tree. The name of a physics interface may be changed by, for example, selecting the physics interface node 1740 and selecting "Rename" in the context menu. For example, the physics interface may be renamed to "Joule Heating", or some other name that may be desired by the system user, including names representative of the physics phenomenon associated with the physics interface.

Figure 18:
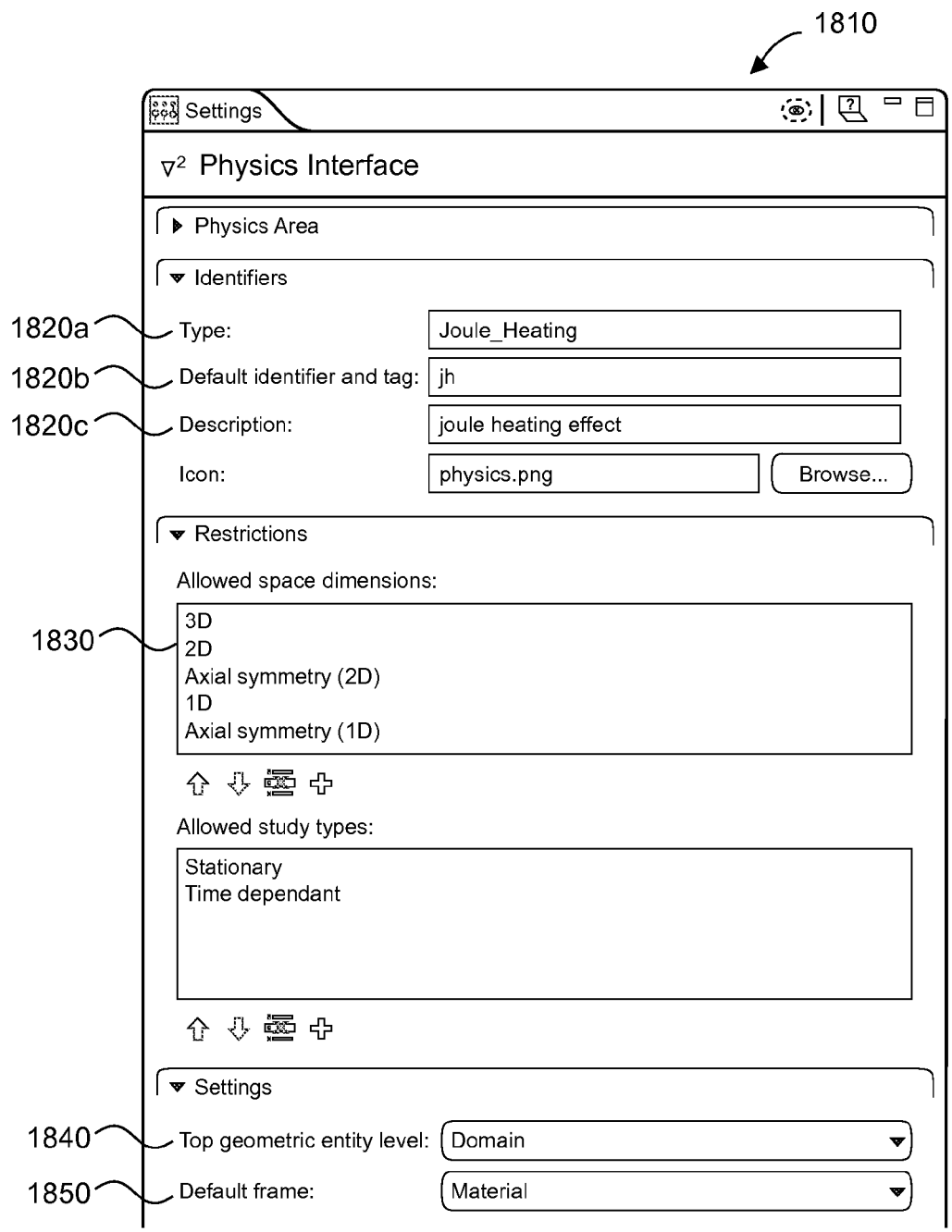
FIG. 18 illustrates an exemplary physics interface builder settings window that may be included in a method for creating a physics interface data structure, according to one aspect of the present disclosure.

Referring now to FIG. 18, an exemplary physics interface builder settings window 1810 is illustrated that may be included in a method for creating a physics interface data structure. More specifically, FIG. 18 illustrates another non-limiting embodiment of a graphical user interface including fields (e.g., editable) and menus for aspects of method step 1610 from FIG. 16. As discussed above in step 1610, it is contemplated that the step may include certain tasks for which non-limiting exemplary graphical selections and input and/or display fields are illustrated in FIG. 18, such as, defining types 1820a, default identifiers and tags 1820b, description 1820c, restrictions in allowed space dimensions and study types 1830, and top geometric entity levels 1840 and default frame 1850 for a physics interface.

Referring back to FIG. 16, following step 1610, the method for creating a physics interface data structure proceeds to step 1620, in which variable classes may be added to or received for the physics interface. Step 1620 can include declaring the dependent variables for a physics interface. In the non-limiting exemplary aspect of Joule heating, the dependent variables may be temperature, T, and electric potential, V. However, it would be understood that the physics interface builder can be using to create physics interface data structures for a variety of physics phenomena, and thus, the determination of dependent variables will be at least partially based on the chosen physics. The dependent variable declarations can then be used or applied in later steps for creating the physics interface data structure to define dependent variables and to formulate equations and equation contributions describing different physics interface features.

It can be desirable for a dependent variable declaration to have a unique dependent variable reference for be use in later steps of the method for creating a physics interface data structure. The dependent variable reference may be a reference to, for example, a physical quantity including its default unit (e.g., "Temperature (K)"). In certain non-limiting exemplary aspects, there may be a desire for using the same physical quantity in several dependent variable references—for example, to define several temperatures. In such situations, it may be beneficial to define an additional suffix to obtain unique dependent variable references.

Step 1620 may also include defining the physical quantity that the declared dependent variable represents along with the unit of the physical quantity (e.g., "Temperature (K)"). The dependent variable may also be given a default variable name, for example "T", and a LaTeX encoded symbol to be used later in pretty-print formulas that may be displayed in the user interface in a multiphysics software.

In certain aspects of the present disclosure, the default variable name can be edited, such as for aspects where the physics interface is used in a multiphysics modeling system. For example, the default variable name may be changed by a system user, but it may also be changed automatically by the multiphysics modeling system to avoid variable name conflicts.

Step 1620 may also include defining the size of a variable, including whether the dependent variable is a scalar or a vector. The declaration of dependent variable in step 1620 may be repeated for several dependent variables, as desired for particular physics and modeling scenarios. For the non-limiting exemplary Joule heating aspect, a second dependent variable may be added to represent the physical quantity of electric potential.

Figure 19:
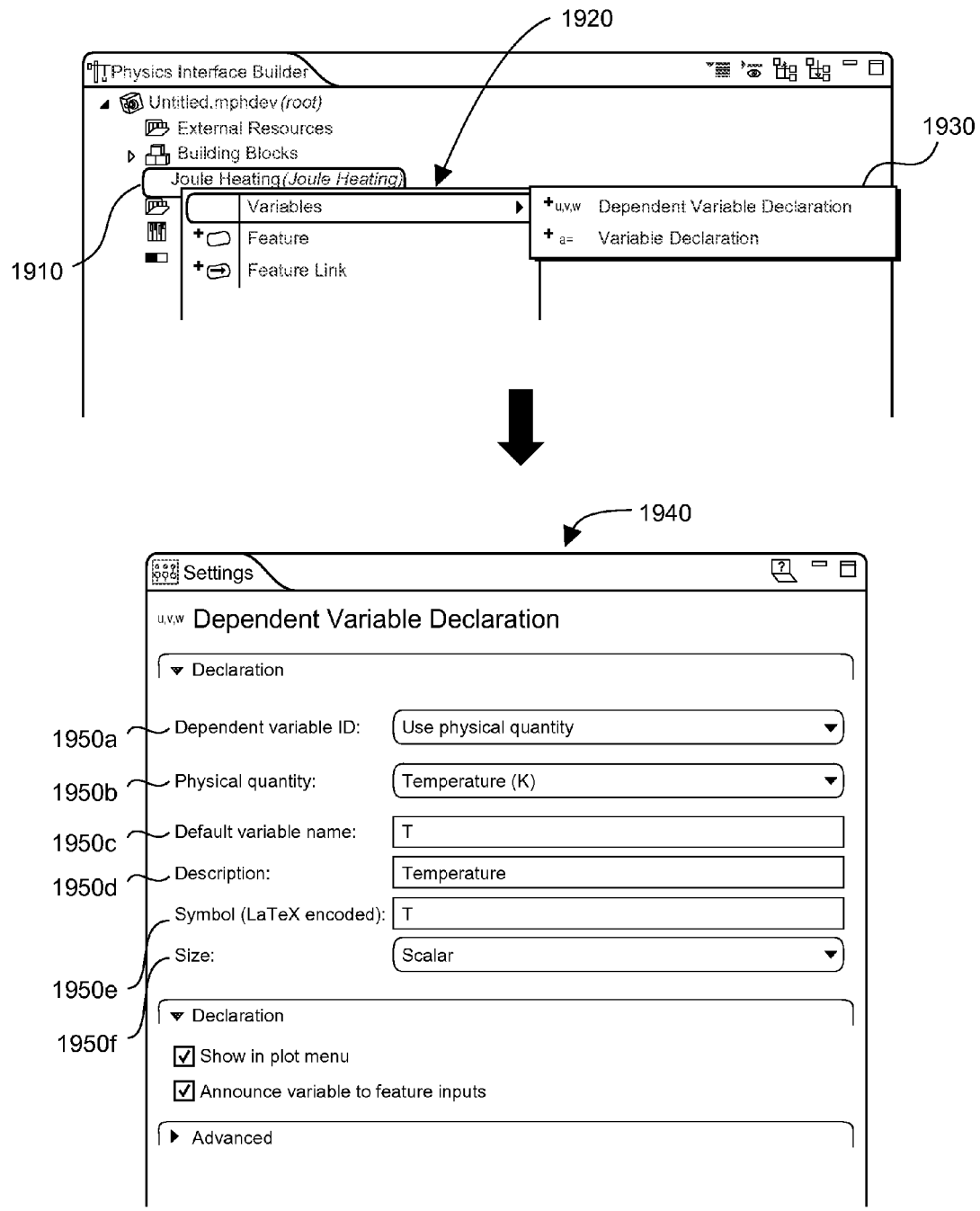
FIG. 19 illustrates an exemplary context menu and exemplary settings window, for dependent variable declaration, that may be included in a method for creating a physics interface data structure, according to one aspect of the present disclosure.

Referring now to FIG. 19, an exemplary context menu 1930 and exemplary settings window 1940 is illustrated for dependent variable declaration that may be included in a method for creating a physics interface data structure. More specifically, FIG. 19 illustrates another non-limiting embodiment of a graphical user interface for aspects of step 1620 from FIG. 16 described above. Selection of a physics interface node 1910 may reveal or display a first context menu 1920 providing a selection for variable, which may provide a second context menu 1930 which includes a selection for adding a dependent variable declaration. As illustrated, in certain aspects the dependent variable declaration may be represented by a child node to the physics interface node in the physics interface builder tree. Clicking or selecting the dependent variable declaration node may display a corresponding settings window 1940. The dependent variable settings window 1940 includes exemplary fields (e.g., editable) and menus for defining dependent variable references 1950a, physical quantity 1950b, default variable name 1950c, description 1950d, LaTeX encoded symbol 1950e, and size (scalar or vector) 1950f.

Referring back to FIG. 16, following step 1620, the method for creating a physics interface data structure can proceed to step 1625 where a system user may be prompted on, or the method may automatically evaluate, whether to add features and/or properties for the physics interface data structure. If it is determined that features and/or properties are to be added for the data structure, it is contemplated that in certain aspect the method proceeds to step 1630. Adding or inputting a property may include defining user inputs and variables that are relevant for an entire physics interface. Adding or inputting a physics feature may include defining the equations, equation contributions, boundary conditions, initial conditions, and/or variables that may be formulated by a physics interface when used in an engineering analysis system, such as a multiphysics modeling system.

In certain aspects of step 1630, a feature or property may be identified by a type in a similar manner as described above for adding physics interface(s). In one example, the type for a feature or property may be a non-editable (e.g., in the multiphysics software) descriptive name of a feature that is used in the model object for constructing a physics feature in a model. The type does not have to be unique in the exemplary multiphysics software. For example, in the non-limiting Joule heating aspect previously described, a feature that describes the balance of heat flux may have the type "Heat_Transfer_Model". The default identifier for a feature may work analogously to the identifier for a physics interface. The default identifier may be a short name for the feature that may be used in denoting the scope for variables defined in a feature—for example, in the heat transfer model feature above this may be "htm". Default identifiers may thus be edited by the user of a multiphysics software or changed automatically by the multiphysics software to avoid variable conflicts.

Feature tag(s) are also contemplated in certain aspects, such as non-editable unique short name(s) for a feature in a multiphysics software. The feature tag may be used as reference, together with the type, by the methods of step 1630 for constructing a feature in a model in, for example, a multiphysics modeling system. Feature tags are also contemplated in certain aspect for use in defining a default identifier for a feature.

In some aspects, features may be defined in the same allowed space dimensions as their parent feature. However, it may also be desirable to for a feature to be defined as a subset of the allowed space dimensions in the parent feature. For example, in certain aspects a feature describing rotational symmetry may be only allowed for the one-dimensional or two-dimensional axisymmetric formulations, while its parent, the physics interface, may be allowed for all space dimensions. The same or similar functionalities are contemplated to be available for study types. For example, a dynamic equation contribution term may desirably be limited to a time-dependent study type, while its parent, the physics interface, may be allowed for time-dependent and stationary studies. Features may be advantageously limited to certain allowed space dimensions and certain allowed study types.

In step 1630, the method of creating a feature may also include defining supported geometric entity levels for a feature. The supported geometric entity levels for a domain feature are generally equal to the top level for a physics interface (e.g., the domain level). A boundary condition feature may be defined for a geometric entity level that is one level below (e.g., boundary level) the top geometric entity level for the physics interface (e.g., domain level). In three-dimensional aspects, the top level may be the domain level. The boundary level may be one level below, the edge level may be two levels below, while the point level may represent the third level below the top geometric entity level. The concept of geometric entity levels may allow for generic definitions of domain and boundary settings for different space dimensions. For example, in three-dimensional aspect, the domain level features may be defined in a three-dimensional space while the boundary features are defined on three-dimensional surfaces. In two-dimensional aspects, the domain feature may be defined on a two-dimensional surface while the boundary feature may be defined on a two-dimensional edge. Despite the difference in dimensions, domain and boundary features may be generically formulated and automatically adapted for the relevant space dimensions using, for example, the geometric entity level aspects described herein.

In some aspects, a feature may be exclusive or it may be contributing. An exclusive feature can override other features of the defined geometric entities when the feature is added to a model in, for example, a multiphysics modeling system. A contributing feature may coexist with other features when the feature is defined on a geometric entity together with other features in a model. To support this operation, method step 1630 may include a category for overriding selections as a reference to the generic method for defining exclusive and contributing features.

In at least some aspects, physics description(s) may depend on whether a geometric entity the physics has been defined for is a solid or a fluid. In order to refer to a generic method of defining solids and fluids, method step 1630 may include a reference to the material type. For example, fluid models are often defined in an Eulerian formulation, which often benefits from using a spatial frame while solid models are often defined on a material frame. There may also be a third option that does not define a material as a solid or a fluid, which implies that the user of a multiphysics modeling system may define this when using this feature.

In at least some aspects of step 1630, a feature may require inputs from a system user, for example, for material properties. In a non-limiting exemplary aspect of a heat transfer model, the input may be the thermal conductivity. These feature inputs (e.g., material property inputs) may be related to different coordinate systems, for example, to define anisotropic properties (e.g., properties that depend on the orientation of a material in space) defined in a spatial or material frame.

In at least some aspects of step 1630, it may be desirable to define all user inputs for a feature in the same base vector system. Therefore, an aspect of step 1630 may include defining an input base vector system for use in later steps for creating the physics interface data structure. In order to automatically adapt the input given in the input base vector system to the base vector system that may be used in equation formulations for a feature, it may also be desirable to define the base vector system for the equation features for use in later steps of the method. In certain aspects, a user of a multiphysics modeling system may be allowed to define the input base vector system when the feature is used in a model.

In certain aspects, features added via step 1630 may be defined as singleton features, which imply that the physics interface may allow only one instance of such a feature when the physics interface is used in a model. An exemplary aspect of a singleton feature is an axial symmetry feature in a two-dimensional axisymmetric space dimension. A feature may also be defined as a default feature, which may be automatically added when the physics interface is added to a model. A default feature may in certain aspects be added or selected for a model whenever the physics interface is used. An example of such a feature may be the heat transfer model feature in the illustrative Joule heating example. The feature may be present as a domain feature to describe the exemplary Joule heating effect.

In certain aspects of step 1630, a model input may also be desirable for an added feature. A model input may receive a dependent variable formulated in another physics interface to be used by a feature to define physical properties. For example, an electric potential feature may include material parameters, such as the electric conductivity, that depend on the dependent variable for heat transfer and temperature, defined by a heat transfer physics interface. Step 1630 may include preparing the feature for receiving model inputs that may be used in later steps for formulating the physical properties used in the equations defined by the feature.

Step 1630 may be repeated to define several features for a physics interface data structure. For example, before proceeding to step 1640, step 1630 may be repeated or step 1630 may be repeated if it is later determined that features are to be added. A physics interface builder module may also include one or more partially predefined features that may be very specific for certain modeling operations. One illustrative example of such a feature is the periodic feature. This feature may require the selection of source and destination boundaries to map a dependent variable from one boundary to another. The principle may be in common for many physics interfaces and may therefore be available as a specific periodic feature in method step 1630. Another illustrative example of such a predefined feature is the pair feature, which maps the solution from one face to another on adjacent geometric objects in an assembly of disconnected objects in a model.

Figure 20:
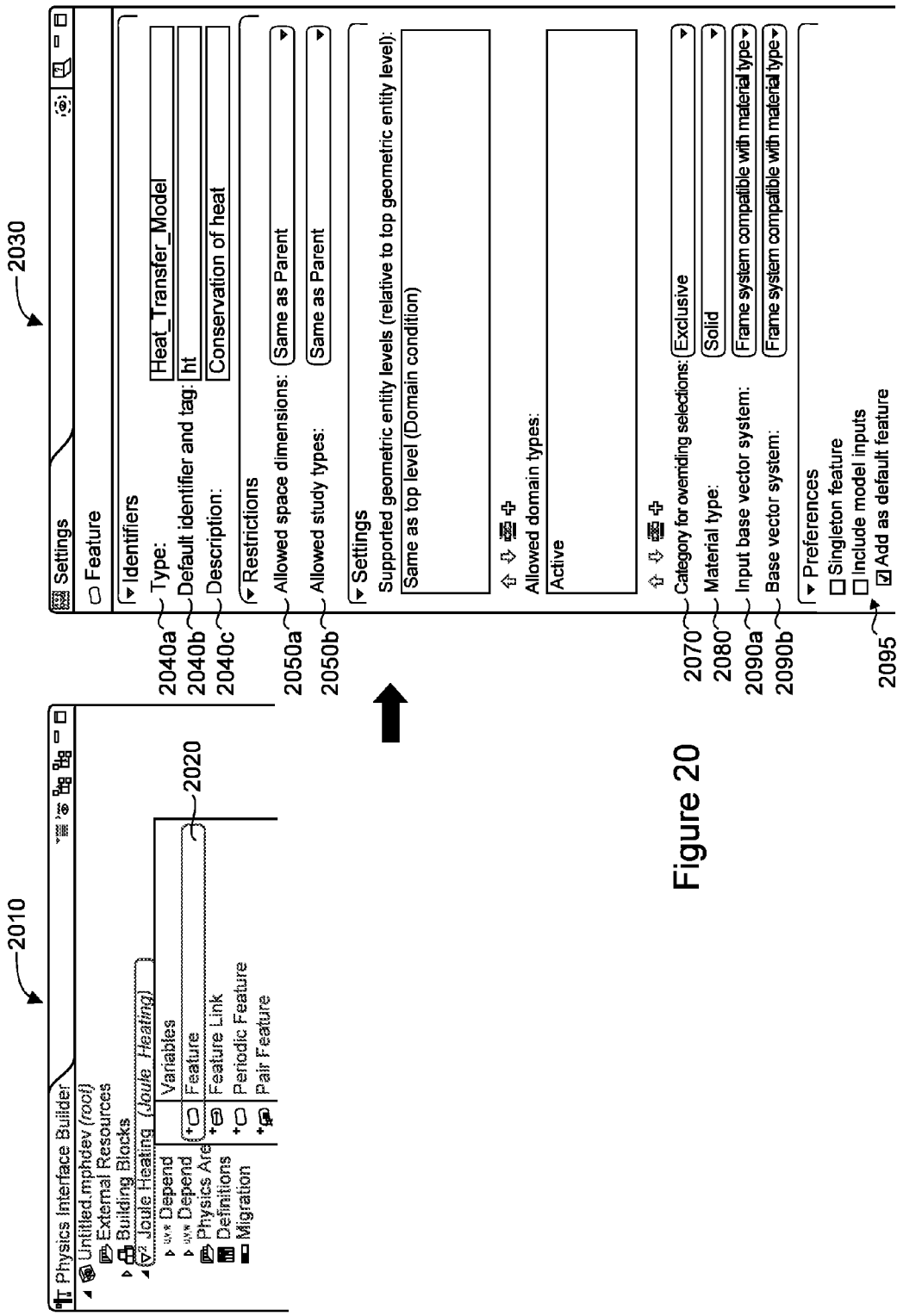
FIG. 20 illustrates an exemplary context menu and exemplary settings window, for a feature definition, that may be included in a method for creating a physics interface data structure, according to one aspect of the present disclosure.

Referring now to FIG. 20, an exemplary context menu 2010 and exemplary settings window 2030 are illustrated for a feature definition that may be included in a method for creating a physics interface data structure. More specifically, FIG. 20 illustrates a non-limiting embodiment of a graphical user interface for aspects of step 1630 from FIG. 16 described above. It is contemplated that a feature class 2020 added to a physics interface from the context menu may be represented in the physics interface builder tree as a child node to the physics interface node (e.g., the Joule Heating node in menu 2010). Selection of the feature class 2020 may result in the display of a feature settings window 2030 that includes menus and fields (e.g., editable) for defining type 2040a, default identifier and tag 2040b, description 2040c, allowed space dimensions 2050a and study types 2050b, supported geometric entity levels 2060, category for overriding selections 2070, and material type 2080 for a feature. Furthermore, the settings window 2030 may include input base vector system and base vector system menus 2090a, 2090b, and check boxes 2095 for defining preferences for a feature as a singleton feature, adding model inputs to a feature, and/or defining a feature as a default feature.

Referring back to FIG. 16, following step 1630, the method for creating a physics interface data structure can proceed to step 1640 to add variable and equation classes that may be defined by feature(s) or propert(ies) added in step 1630. Dependent variables used by a feature may be defined in this step. In the non-limiting, illustrative example of a heat transfer model, the dependent variable may represent temperature. The dependent variable reference declared in step 1620 and the physical quantity may be used in step 1640. The shape function for a finite element formulation may be defined. In the heat transfer model illustration, Lagrange shape functions are a non-limiting example of the shape function that may be defined.

A feature may be defined on a geometric entity selection, such as a domain, boundary, edge, or point. In certain aspects a feature may receive a domain selection and define the feature on all boundaries adjacent to the selected domain. It is contemplated that in such situations that the output entities of the domain selection are the boundaries where the feature may be defined, while the input may be a domain. Similarly, it may be possible to select a domain, and obtain as output entities, all adjacent domains where the feature may be defined.

In certain aspects, feature equations may be added and defined in step 1640. Feature equations may be defined as weak form equations, general form equations, coefficient form equations, or as a constraint. In the non-limiting illustrative heat transfer example above, a weak form equation may, for example, be added to the heat transfer model feature. The weak form equation formulates the expression for the integrand in the weak formulation of an equation or a contribution to an equation. In the non-limiting illustrative heat transfer model example, this expression may be defined by entering "$-k \cdot \nabla T \cdot \text{test}(\nabla T)$", representing the conservation of heat flux with the flux given by conduction. The term "test$(\nabla T)$" represents the test function or base function for T in the weak formulation. The equation features may receive expressions using operators generic for different space dimensions such as the del operator, $\nabla$, the dot product, "$\cdot$", and the cross product, "$\times$", to automatically generate the equations in the allowed space dimensions. The expressions for the feature equations may be entered using the mathematical symbols defined in the Unicode standard. It is contemplated that use of operators that are valid for several space dimensions can be practical because such operators allow the definition of a single equation feature for expressions valid in several space dimensions. For example, in the illustrative heat transfer model above, the expression "$-k \cdot \nabla T \cdot \text{test}(\nabla T)$" is valid for one dimension, one-dimensional axisymmetric, two-dimensional, two-dimensional axisymmetric, and three-dimensional coordinate systems. One of the benefits of the present disclosure is that the expression is defined once, rather than multiple times. When used in, for example, a multiphysics modeling system, the method that interprets the expressions in the equation feature may use the space dimension and the expression to automatically create a second expression for the specific space dimensions.

Figure 21:
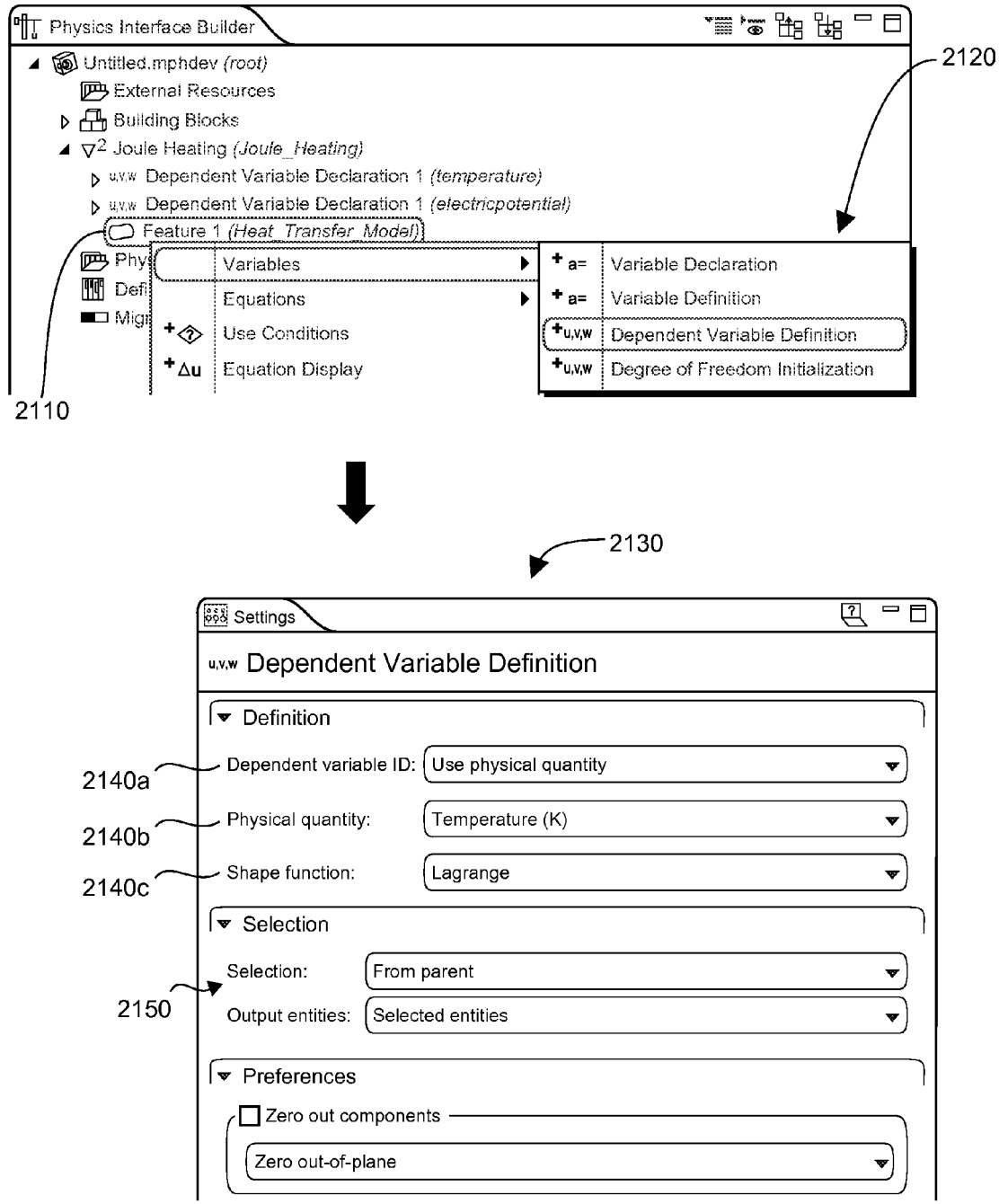
FIG. 21 illustrates an exemplary context menu and exemplary settings window, for a dependent variable definition of a feature, which may be included in a method for creating a physics interface data structure, according to one aspect of the present disclosure.

Referring now to FIG. 21, an exemplary context menu 2120 and an exemplary settings window 2130 are illustrated, for a dependent variable definition of a feature, which may be included in a method for creating a physics interface data structure. More specifically, FIG. 21 illustrates a non-limiting embodiment of a graphical user interface for aspects of step 1640 from FIG. 16 described above. A dependent variable definition added to a physics interface from the context menu 2120 may be represented in the physics interface builder tree as a child node to the feature node 2110. The dependent variable definition settings window 2130 contains menus and fields (e.g., editable) for defining a dependent variable reference 2140a, a physical quantity 2140b, a shape function 2140c, and geometric entity selection and output entities 2150 of the dependent variable.

Figure 22:
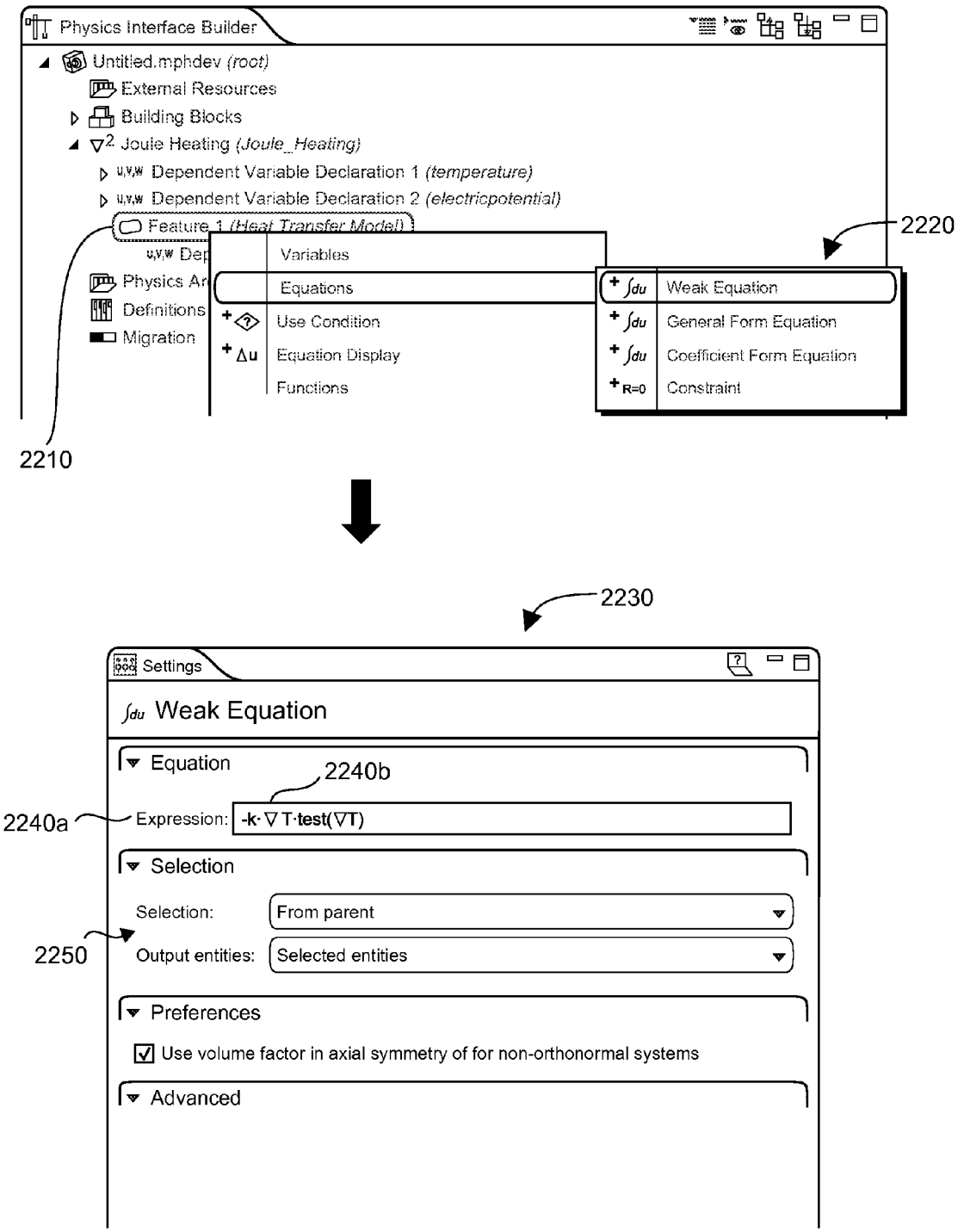
FIG. 22 illustrates an exemplary context menu and exemplary settings window, for an equation of a feature, which may be included in a method for creating a physics interface data structure, according to one aspect of the present disclosure.

Referring now to FIG. 22, an exemplary context menu 2220 and an exemplary settings window 2230 are illustrated, for an equation of a feature, which may be included in a method for creating a physics interface data structure. More specifically, FIG. 22 illustrates a non-limiting embodiment of a graphical user interface for another exemplary aspect of step 1640 from FIG. 16 described above. A weak equation, general form equation, coefficient form equation, or constraint definition may be added to a physics interface from the context menu 2220 and may be represented in the physics interface builder tree as a child node to the feature node 2210. The weak equation settings window 2230 may contain menus and fields (e.g., editable) for defining the expression 2240a and geometric entity selection 2250 for an equation. The corresponding settings window may be available for other equation forms. In this non-limiting illustrative example for a heat transfer model, the heat transfer model equation may be expressed in the weak equation as "$-k \cdot \nabla T \cdot \text{test}(\nabla T)$" 2240, which is the integrand of the weak form.

Referring back to FIG. 16, following step 1640, the method for creating a physics interface data structure can proceed to logical step 1645 where a determination is made whether to add input classes for a feature. If logical step 1645 is returned in the affirmative, the method then proceeds to step 1650 where input classes may be defined for a feature, such as user input classes. The input classes may be parameters such as materials properties that may be entered in a model by a user of a multiphysics software. In the non-limiting illustrative example of a heat transfer model, the thermal conductivity, denoted "k" in the integrand expression "$-k \cdot \nabla T \cdot \text{test}(\nabla T)$", may be such a user input. A user input may be declared and may desirably include an input name, so that it can be referenced in expressions. It may also be desirable for the input to include information such as a description, a reference to a physical quantity, a size to declare the input as a scalar or a vector, a level definition, and a default value or a table of allowed values. The level "single" is a single level for scalars, vectors, and matrixes. It is contemplated that if a vector of vectors is declared, or a matrix of vectors, then a double level is desirable for the size of a user input. It may also be desirable in certain aspects to restrict the space dimension of an input.

In certain aspects, a user input may desirably include a variable definition that is used to access a parameter and refer to it in feature equations and, for example, results evaluation features in later steps for creating the physics interface data structure. The variable definition may have an expression, using a scoping syntax, for example "par.k", which is automatically generated from the declaration. In the non-limiting illustrative example of the heat transfer model feature, the user input is a parameter. The definition of a user input variable may also obtain or take the selection from its parent feature, the user input feature.

Figure 23:
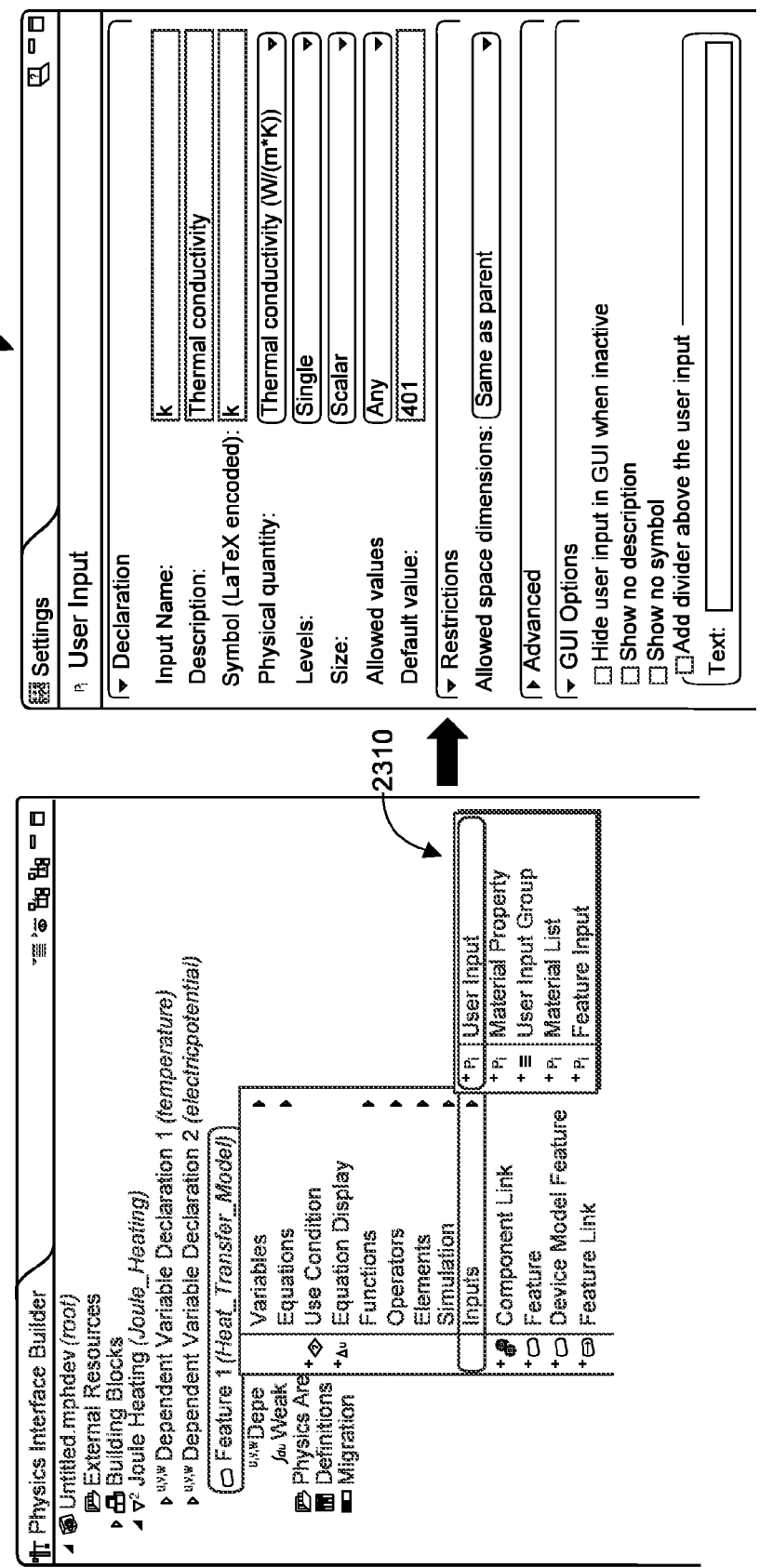
FIG. 23 illustrates an exemplary context menu and exemplary settings window, for a user input declaration, that may be included in a method for creating a physics interface data structure, according to one aspect of the present disclosure.

Referring now to FIG. 23, an exemplary context menu 2310 and exemplary settings window 2320 are illustrated for a user input declaration that may be included in a method for creating a physics interface data structure. More specifically, FIG. 23 illustrates a non-limiting embodiment of a graphical user interface for an exemplary aspect of step 1650 from FIG. 16 described above. After selecting the feature, inputs, and user inputs nodes, editable fields and menus may be available in the settings window 2320 for declaring an input name, a description, a reference to a physical quantity, a level and size, a default value, and possible restrictions for allowed space dimensions.

Figure 24:
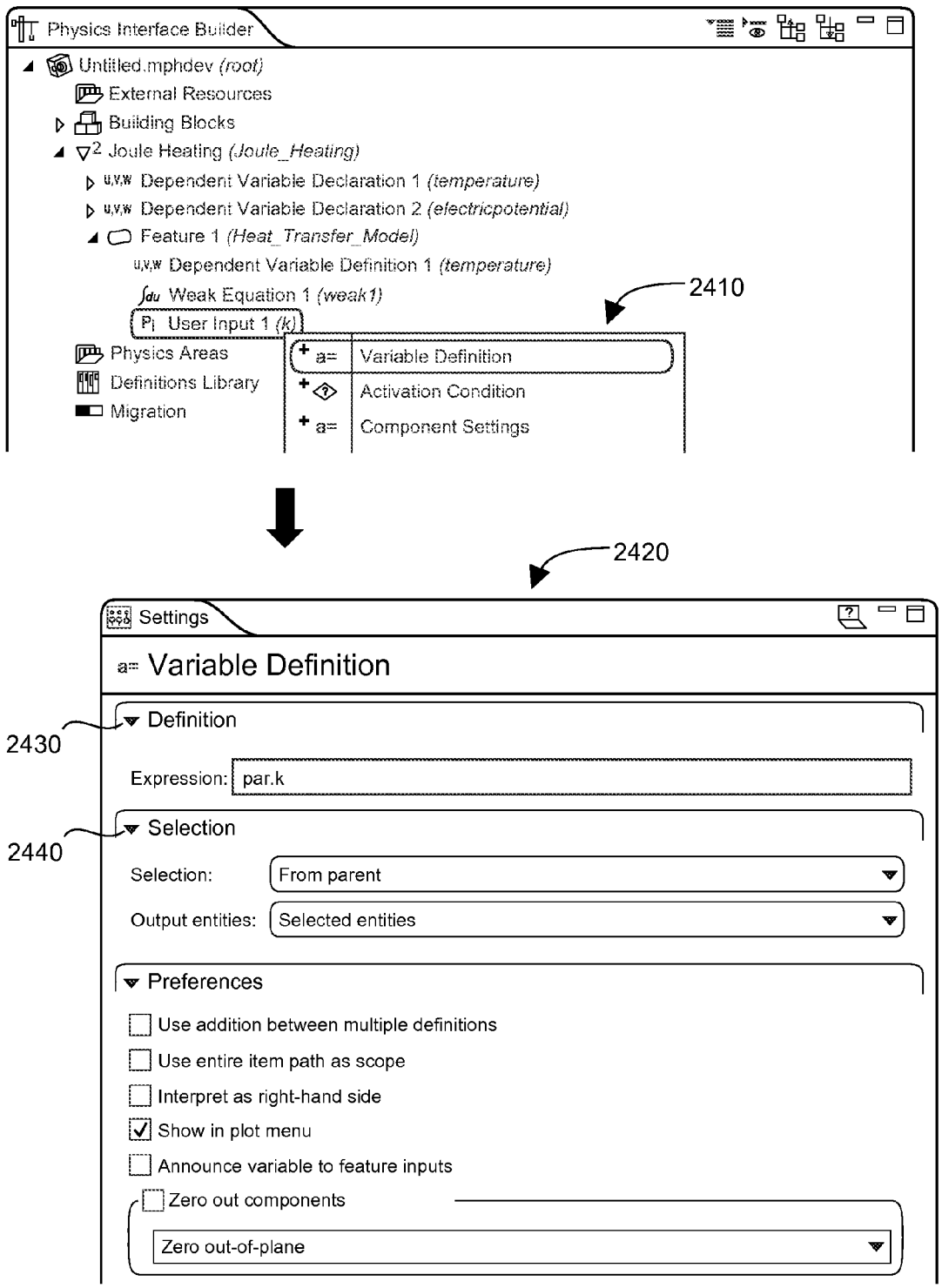
FIG. 24 illustrates an exemplary context menu and exemplary settings window, for a user input variable definition, which may be included in a method for creating a physics interface data structure, according to one aspect of the present disclosure.

Referring now to FIG. 24, an exemplary context menu 2410 and exemplary settings window 2420 are illustrated for a user input variable definition that may be included in a method for creating a physics interface data structure. More specifically, FIG. 24 illustrates a non-limiting embodiment of a graphical user interface for another exemplary aspect of step 1650 from FIG. 16 described above. Fields (e.g., editable) and menus may be available in the settings window 2420 to display an exemplary definition setting 2430 for a variable, such as "par.k", using the scoping syntax, and exemplary selection settings 2440 for the input variable.

Referring back to FIG. 16, following step 1650, the method for creating a physics interface data structure is contemplated, in certain aspects, to return to logical step 1645 where a determination is made whether to add additional input classes for a feature. If logical step 1645 returns a negative, the method proceeds to logical step 1655 where a determination is made whether to add more variable and equation classes that may be further defined by feature(s) or propert(ies). If the logical step is returned in the affirmative, the method proceeds to step 1660, which is implemented similar to step 1640. Otherwise, the logical step 1655 may proceed back to step 1625. Thus, in certain aspects of creating a physics interface data structure, step 1630, 1640, and 1650 may be repeated to add features such as other domain settings and boundary conditions along with properties, such as operations that may be globally accessible. For example, in the non-limiting illustrative Joule heating interface example, it may be adequate to add the boundary conditions for the thermal analysis and the heat sources originating from resistive heating. In addition, the domain features describing the conservation and conduction of electric current may be added and the boundary conditions for the electric potential.

Following completion of the steps associated with adding features and/or properties along with related elements, the method for creating a physics interface data structure may then proceed to step 1670 to add a default solver settings class for a physics interface. In the example of a multiphysics modeling system, step 1670 may assist a system user in obtaining an efficient solution sequence for the specific physics problem for which the physics interface is designed.

In certain aspects of step 1670 the default solver settings may be added as solver defaults. In one non-limiting aspect, a "usage condition" feature may be added to restrict the solver defaults to a specific study type, for example stationary. This feature may enable adding several solver defaults for different study types. The usage condition feature may also be activated by a user input. A usage condition feature may be added further down in the solver defaults branch, so that only the child features of the solver defaults that differ between different study types or space dimension may be separated.

Adding the usage condition feature further down the solver defaults allows for a single solver defaults feature to be valid for several study types or dimensions, and a restriction to study types can be beneficial because a time-dependent study may need different solver features than a stationary study.

A restriction to space dimensions can depend on the computational efficiencies for solving a multiphysics model when the physics interface is used. For example, a one dimensional or two dimensional model may make use of robust but computationally less efficient solver than one used for a three-dimensional model. In contrast, the sheer size of the three-dimensional models in number of degrees of freedom may in certain aspects use a more computationally efficient, but also less robust, solver.

Solver defaults may include specifying dependent variables and suggest a scaling for each of the dependent variables. This may be done by adding a dependent variable feature. In the non-limiting and illustrative Joule heating example, an exemplary dependent variable may include temperature. The scaling in the exemplary illustration may be selected to reflect the range of temperature expected for the physics interface.

Different solvers may be added to the solver defaults associated with step 1670, such as stationary and time-dependent solvers. The solvers may, for example, include child features for segregated solver algorithms, fully coupled solver algorithms, direct linear system solvers, and iterative linear system solvers. In general, it may be desirable in the exemplary aspect of a multiphysics modeling system for all available solver features available to be added to the physics interface builder modules solver defaults. The solver sequence can be set up in the physics interface builder module in the same or similar way as in a multiphysics modeling software or system. Some differences that are contemplated may be that the solver defaults in the physics interface builder module are available as a default solver sequence every time the physics interface is used in the multiphysics modeling system, while the solver sequence manually defined in a multiphysics model may be specific for that model only.

Figure 25:
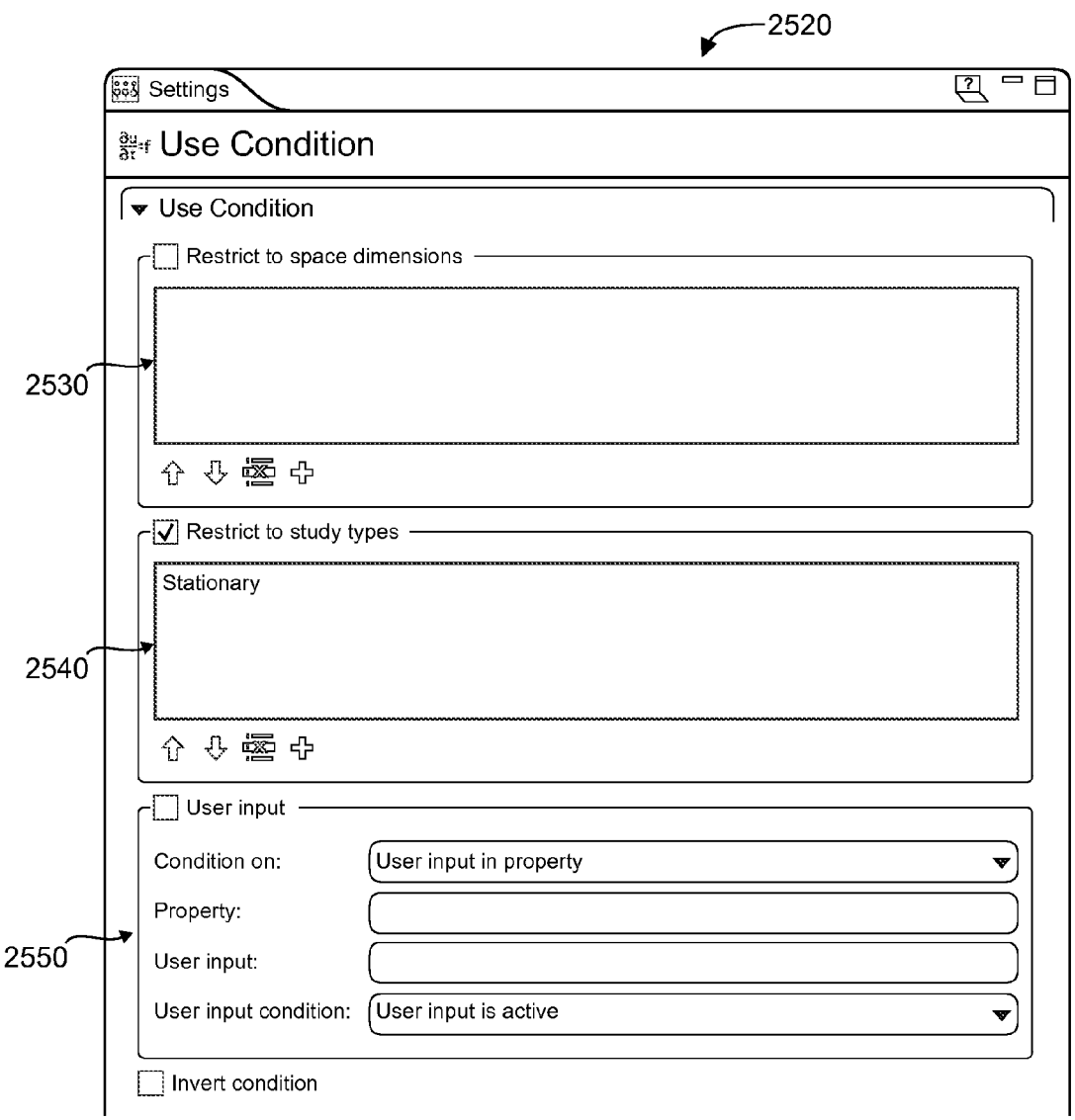
FIG. 25 illustrates an exemplary settings window, for a usage condition feature, that may be included in a method for creating a physics interface data structure, according to one aspect of the present disclosure.

Referring now to FIG. 25, an exemplary settings window 2520 is illustrated for a usage condition feature that may be included in a method for creating a physics interface data structure. More specifically, FIG. 25 illustrates a non-limiting embodiment of a graphical user interface for an exemplary aspect of step 1670 from FIG. 16 described above. The usage condition feature can be a child feature to the solver defaults feature. FIG. 25 includes editable fields and menus that may be available in the settings window 2520 for restricting solver defaults or a part of the solver defaults to a specific space dimension 2530 or to a specific study type 2540. In certain aspects, the condition feature may receive a user input 2550 so that the solver defaults or parts of the solver defaults may be conditioned by a user input.

Figure 26:
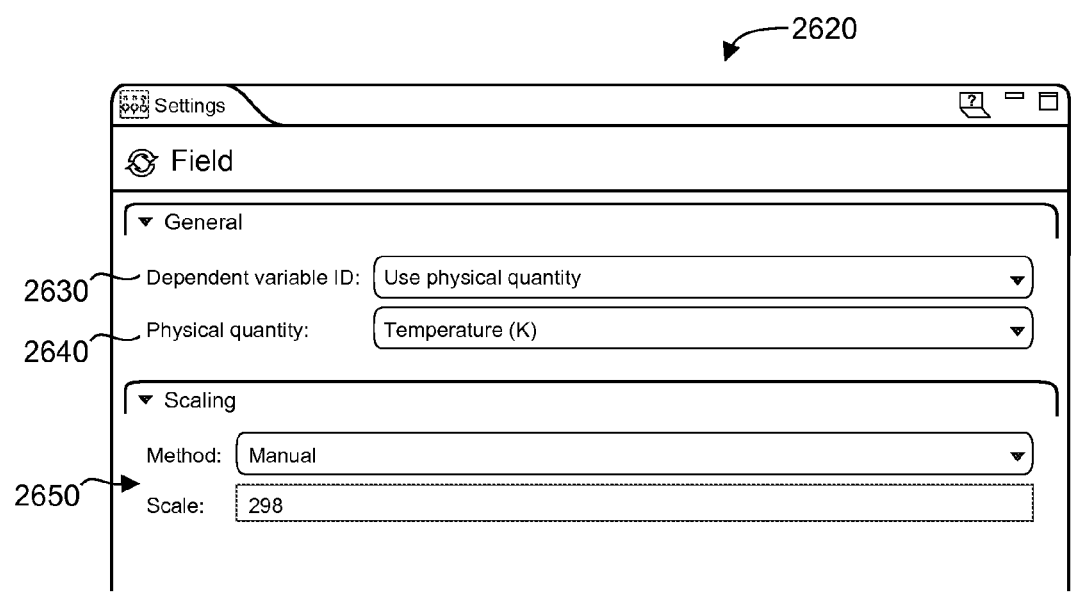
FIG. 26 illustrates an exemplary settings window, for a dependent variable feature, that may be included in a method for creating a physics interface data structure, according to one aspect of the present disclosure.

Referring now to FIG. 26, an exemplary settings window 2620 is illustrated for a dependent variable feature that may be included in a method for creating a physics interface data structure, according to one aspect of the present disclosure. More specifically, FIG. 26 illustrates a non-limiting embodiment of a graphical user interface for an exemplary aspect of step 1670 from FIG. 16 described above. The dependent variable feature can be a child feature to the solver defaults feature. FIG. 26 includes editable fields and menus that can be selected in the settings window 2620 for selecting dependent variable reference 2630 and physical quantity 2640, and for suggesting a scaling method 2650, including a value for the scale of a dependent variable in the case of manual scaling.

Figure 27:
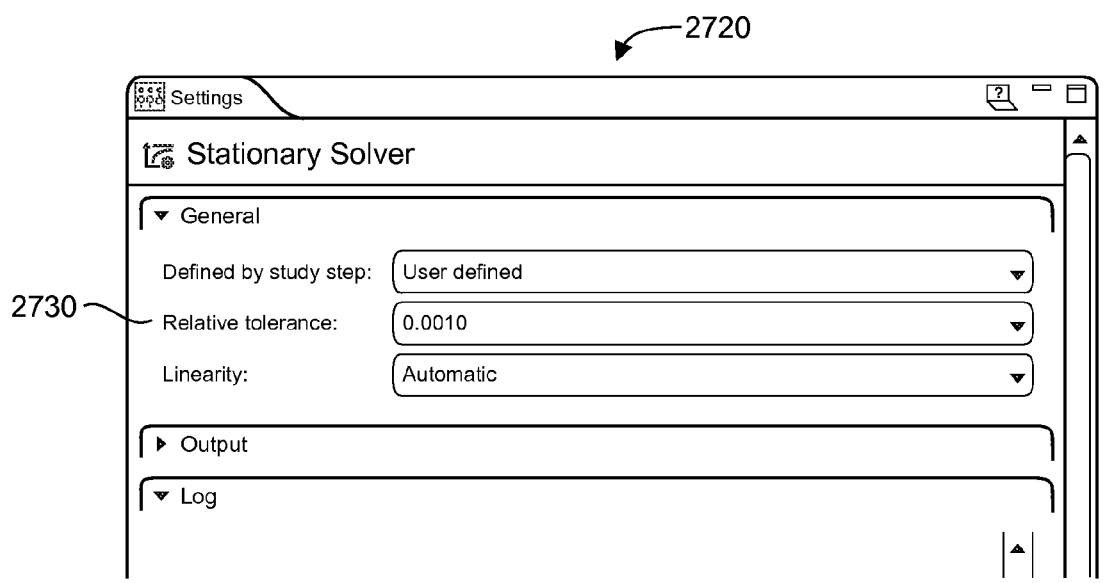
FIG. 27 illustrates an exemplary settings window, for a stationary solver feature, that may be included in a method for creating a physics interface data structure, according to one aspect of the present disclosure.

Referring now to FIG. 27, an exemplary settings window 2720 is illustrated for a stationary solver feature that may be included in a method for creating a physics interface data structure, according to one aspect of the present disclosure. More specifically, FIG. 27 illustrates a non-limiting embodiment of a graphical user interface for an exemplary aspect of step 1670 from FIG. 16 described above. The stationary solver feature can be a child feature to the solver defaults feature. FIG. 27 includes editable fields that may be available in the settings window 2720 for defining a relative tolerance 2730 for the solver. The settings windows for the different solver features may include all or some of the editable fields and menus being available in a solver feature in, for example, a multiphysics modeling system or other engineering analysis system.

Figure 28:
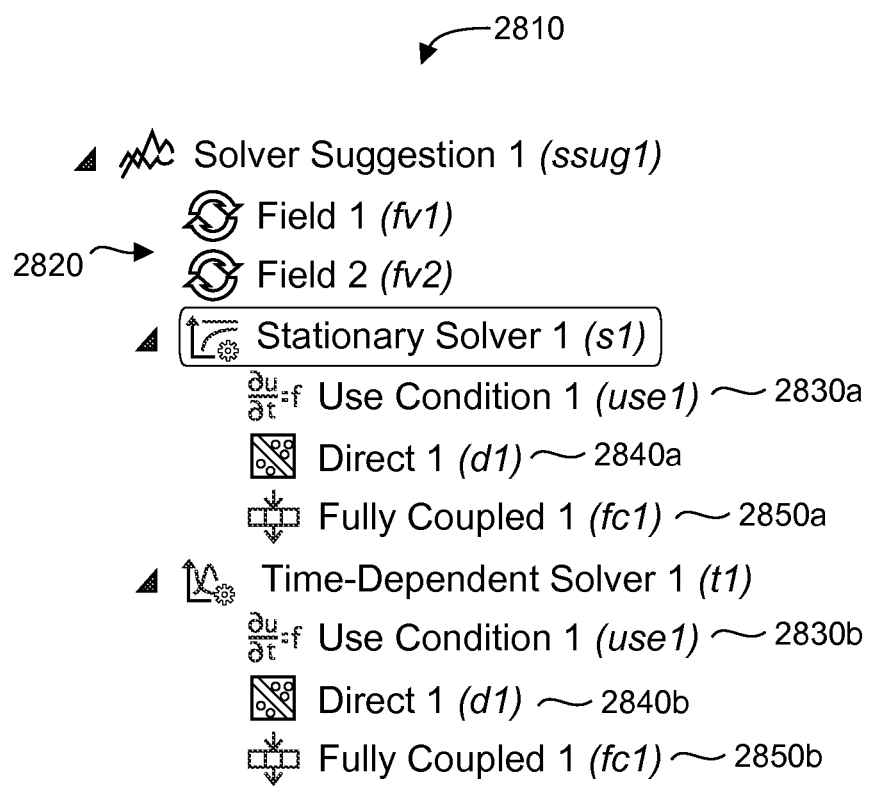
FIG. 28 illustrates an exemplary solver default branch for a physics interface builder tree that may be included in a method for creating a physics interface data structure, according to one aspect of the present disclosure.

Referring now to FIG. 28, an exemplary solver default branch 2810 is illustrated for a physics interface builder tree that may be included in a method for creating a physics interface data structure, according to one aspect of the present disclosure. More specifically, FIG. 28 illustrates a non-limiting embodiment of a graphical user interface for an exemplary aspect of step 1670 from FIG. 16, described above. FIG. 28 illustrates field nodes 2820 that in certain aspects may define scaling, for example, for variables such as temperature and electric potential in the context of the illustrative non-limiting Joule heating example. The solver defaults branch 2810 may be used for both stationary and time-dependent study types. The condition nodes 2830a, 2830b determine which of the branches of the solver defaults that may be available, the stationary or time-dependent solver, depending on the study type selected by a user of the system. Each of the solver nodes may contain child nodes that may determine the type of linear system solver, such as direct 2840a, 2840b or iterative (not shown), or solver algorithm, such as fully coupled 2850a, 2850b or segregated (not shown). It is contemplated that in certain aspects the solver branch 2810 may contain any solver feature available in, for example, a multiphysics modeling system.

Referring back to FIG. 16, following step 1670, the method for creating a physics interface data structure can proceed to step 1680 to add a result defaults class to a physics interface. In certain aspects of step 1680, child features to the results defaults may define the graphs, plots, and evaluations relevant to a physics simulation targeted by a physics interface. In certain aspects, the defaults may define the most common graphs, plots, and evaluations.

Similar to the solver defaults described for step 1670, the result defaults feature in step 1680 may include a usage condition child feature that determines when a plot should be defined. One usage condition may be to define different default plots depending on the space dimension used in the model set up in, for example, a multiphysics modeling system. A second usage condition may be to define a default plot for specific study types. For example, a frequency response study may benefit from having a Nyquist plot as a default feature. Analogous to the solver defaults, the usage condition feature may be used for the whole result defaults feature, so that separate results defaults are created for different conditions, or it can be used for specific child features in the results branch, so that only specific parts of the results defaults differ for the different conditions.

In certain aspects of step 1680, a result defaults branch may include a plot defaults feature. Such a feature may define which expression may be used as the default expression for different types of plots, such as scalar plots, vector plots, and/or deformation plots. In certain aspects, the plot defaults features may include definitions of one or more expressions and a description of the default expressions.

In certain aspects of step 1680, a result defaults branch may also include default datasets features for different result operations. For example, a result default feature for two-dimensional axisymmetric space dimensions may be to create a revolution dataset that plots an axisymmetric solution in three dimensions by revolving the two-dimensional solution. Other features that may be included in a result defaults branch may be plot groups in different space dimensions containing child features for volume plots, surface plots, edge plots, arrow plots, or any type of plot feature that may be available in, for example, a multiphysics modeling system. It is contemplated that one difference between a results default feature and a multiphysics model setup is that a feature added to the results default feature may be available by default when the physics interface is used while a plot feature manually added to a model is specific to that model only.

A result defaults feature may also include child features defining default derived values, such as integrals; maximum, average, and minimum values; and general point evaluation. In addition, in certain aspects of step 1680, evaluations of derived values available in a multiphysics modeling system may be added as a default feature for a physics interface.

After step 1680, certain aspects of the method include returning to logical decision step 1605 where a system user may be prompted to add another physics interface. If the logical decision returns a negative, the method proceed to step

1690 where the physics interface data structure is output for use by, for example, a multiphysics or other type of modeling system.

Referring now to FIG. 29, an exemplary result defaults branch 2910 is illustrated for a physics interface builder tree that may be included in a method for creating a physics interface data structure. More specifically, FIG. 29 illustrates a non-limiting embodiment of a graphical user interface for an exemplary aspect of step 1680 described above in the context of FIG. 16 described above. The exemplary result defaults branch 2910 includes a plot defaults node 2920a that can include child nodes, such as default scalar plot node 2920b, defining the default physical properties or default derived properties that may be used as defaults for scalar plots, vector plots, and/or deformation plots. In certain aspects, it is further contemplated that the plot groups (e.g., plot group 3D nodes 2930a, 2930b) may refer to a space dimension, such as three dimensional, two dimensional, or one dimensional. Each plot group may also include a usage condition child node 2940a, 2940b that may determine when the plot group should be available by default, for example for a specific space dimension or a specific study type. A plot group may also include plots such as volume plots, surface plots (e.g., temperature node 2950, electric potential nodes 2960), edge plots, arrow plots, particle plots, and/or contour plots. It is further contemplated that plot types available in, for example, a multiphysics or other modeling system may be added as default plots for the specified plot group in a physics interface.

Referring back to FIG. 16, steps 1630, 1640, 1650, and 1670 have been described in the above non-limiting exemplary aspects as child features for a physics interface. In certain aspects, the features of steps 1630, 1640, 1650, and 1670 can also be defined as child nodes of a building block parent feature for a physics interface builder. For example, a physics interface builder feature may use the features of steps 1630, 1640, 1650, and 1670 as child features for generating a physics interface data structure by linking to a building block feature within the physics interface builder. The building block feature may be reused in several physics interface branches so that a feature may appear in several physics interface branches without having to be rewritten every time it is used in the physics interface builder tree. A non-limiting exemplary aspect of this feature is provided below in the context of FIG. 30.

Figure 30:
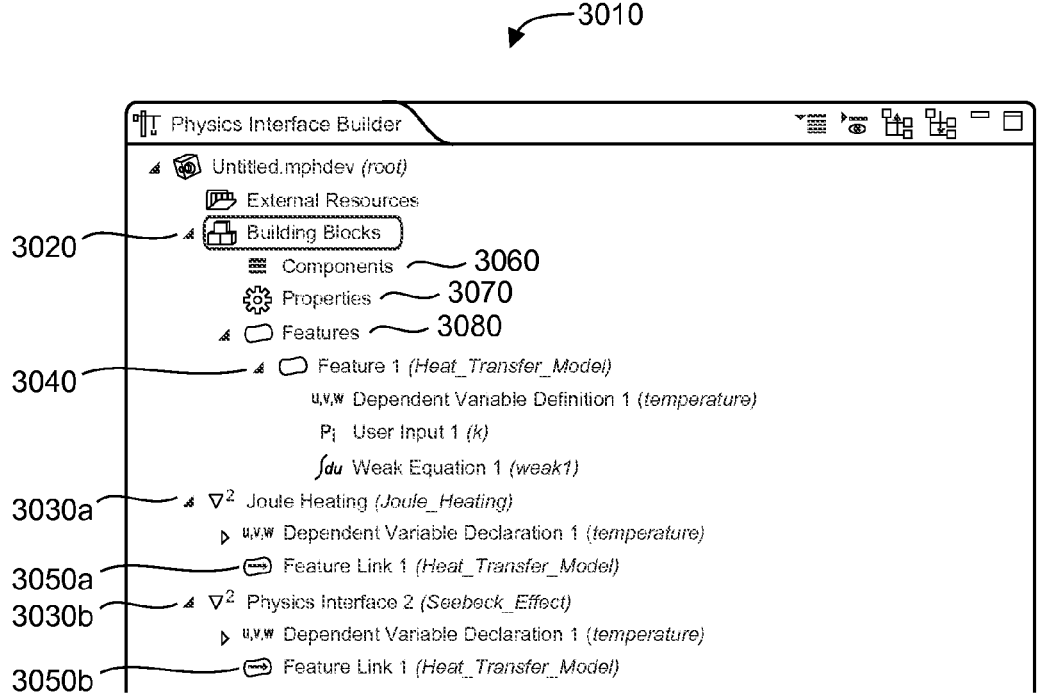
FIG. 30 illustrates a physic interface builder tree with exemplary nodes that may be included in methods for generating a physics interface data structures, according to one aspect of the present disclosure.

Referring now to FIG. 30, a physic interface builder tree 3010 is illustrated with exemplary nodes that may be included in methods for generating a physics interface data structures, such as a building block node 3020, physics interface nodes (e.g., 3030a, 3030b) with child link nodes (e.g., 3050a, 3050b). FIG. 30 is illustrative of a non-limiting embodiment of a graphical user interface for an exemplary aspect of the building block feature described above. Similar to other aspects described for creating the physics interface data structure, a non-limiting illustrative heat transfer model feature 3040 is also used to illustrate aspects of physics interface builder tree 3010. For example, the non-limiting selectable physics interface branches illustrated for model feature 3040 are a Joule heating interface 3030a and a Seebeck effect interface 3030b. The model (e.g., 3040) may be defined once and then linked to or from the feature links (e.g., 3050a, 3050b) in the two physics interface branches.

It is contemplated that a building block feature may also include child features for components 3060, properties 3070, and/or feature 3080. The components node 3060 may include child nodes for variable definitions and/or user inputs. The properties node 3070 may be a parent node for some or all of the properties. The feature node 3080 may be the parent node for some or all of the physics features. The use of building blocks and links in a user interface can be beneficial because it allows for several physics interfaces in a physics interface builder module 3010 to share the same components, properties, and features. This may increase the efficiency in the process of generating physics interface data structures for a whole range of physics interfaces, for example in a product suite, such as application specific modules for use in a multiphysics modeling system (e.g., the Heat Transfer Module or the Structural Mechanics Module for the COMSOL Multiphysics® modeling system available from COMSOL, Inc., Burlington, Mass., USA).

Figure 31:
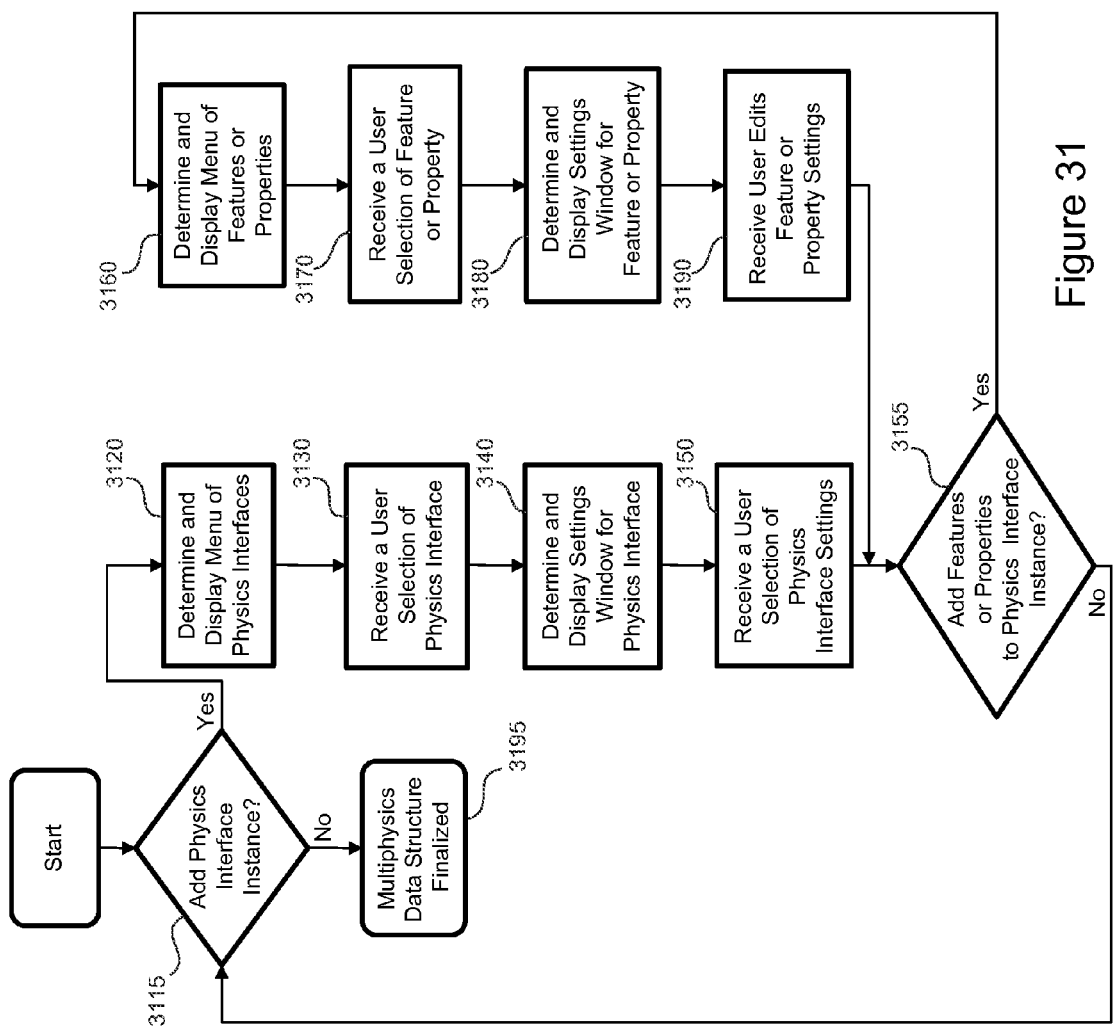
FIG. 31 is a flowchart of an exemplary method for interpreting a physics interface data structure to generate and to maintain a model tree, context menu, and settings window for a multiphysics modeling system, according to one aspect of the present disclosure.
Figure 32:
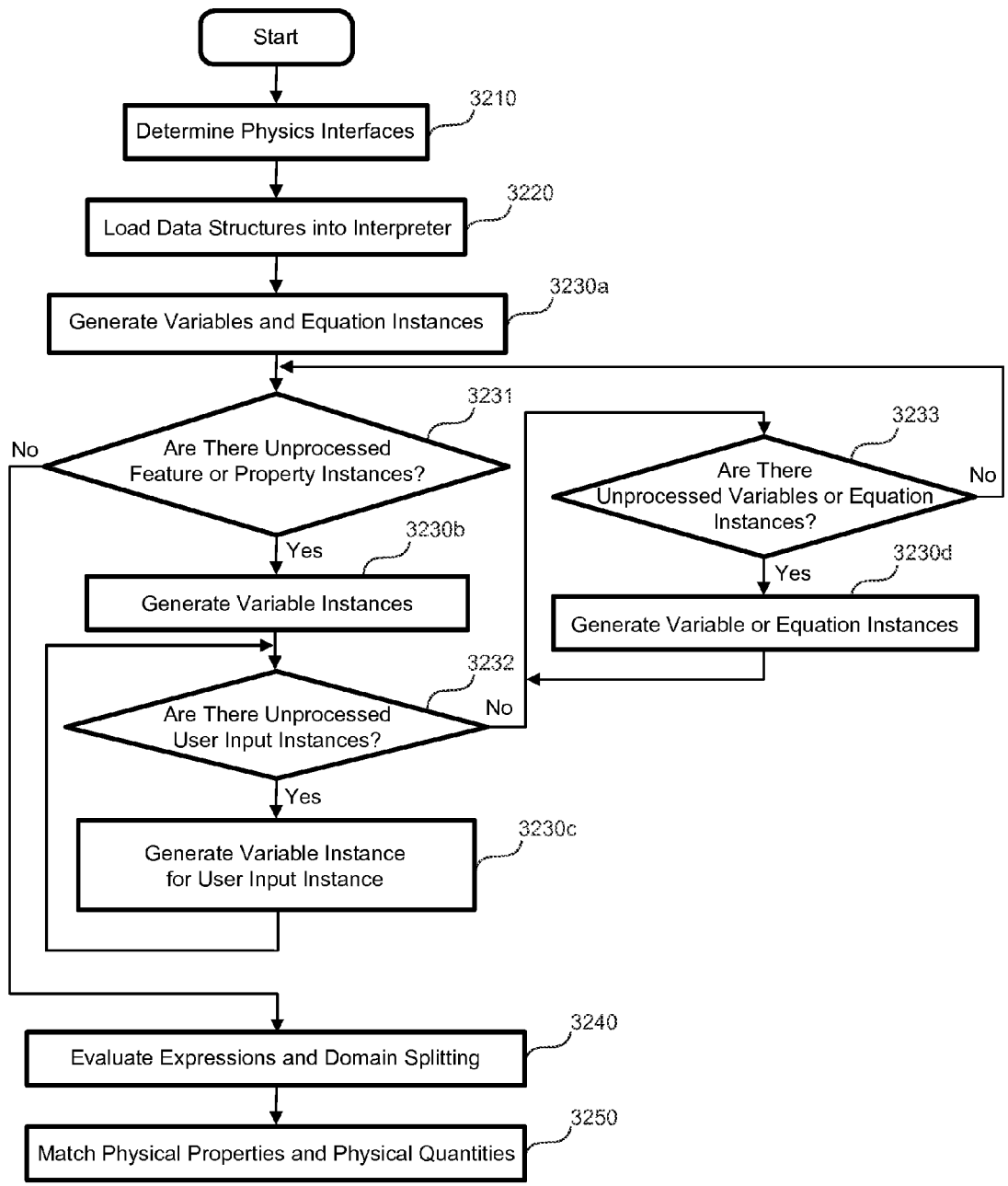
FIG. 32 is a flowchart of an exemplary method for interpreting a physics interface data structure and a multiphysics data structure to generate variable and equation instances and to determine multiphysics couplings in a multiphysics model, according to one aspect of the present disclosure.

Turning now to FIGS. 31-32, exemplary methods for interpreting a physics interface data structure are illustrated that may be implemented on one or more processing units as part of a computer-implemented modeling system, such as a multiphysics modeling system. Referring to FIG. 31, a flowchart illustrates an exemplary method for interpreting a physics interface data structure to generate and to maintain a model tree, context menu, and settings window in, for example, a multiphysics modeling system. As described in more detail below, the method may further include generating a multiphysics data structure expressed in a model object based on settings specified by a user of the multiphysics modeling system.

In step 3115 of the exemplary method, a logical determination is made if a physics interface instance should be added. If the decision that is returned is positive, the method proceeds to step 3120 to determine and display a list of physics interface(s) from a set of available physics interface data structure(s). Next, in step 3130, a system user may select a physics interface from the displayed list or menu of physics interface(s). The selection determines a physics interface data structure to be used in later method steps and can also include adding the physics interface instance to a multiphysics data structure. Then, at step 3140, a settings window for a selected physics interface is displayed. It is contemplated that in certain aspects of step 3140 the settings window is displayed using the definition of user inputs for the physics interface available from or received from a physics interface data structure. In step 3150, a user may then edit the settings in the settings window for a physics interface instance. The default settings and the changed settings are then stored in the multiphysics data structure.

Next, in step 3155, a logical decision is made if features and/or properties are to be added to the physics interface instance. If the decision returned is positive, the method proceeds to step 3160 where a list of features and properties may be determined and displayed based, for example, on the definition of features and properties available in the physics interface data structure. Next, at step 3170, a feature or a property can be selected by a user for use in later steps of the method. The selected feature or property instance can also be added to the multiphysics data structure. Then, at step 3180, a settings window for a feature or property may be determined and displayed using the definition of user inputs for the feature or property available in or received from the physics interface data structure. Next, at step 3190 a system user may select and/or edit the settings in the settings window for a feature or property instance. The default settings and the changed settings are then stored in the multiphysics data structure. The method then proceeds back to step 3155 so that additional features or properties can be added to the physics interface instance. If a logical decision is returned that is negative, then the method proceeds to step 3115 to determine if more physics interface instances are to be added. If that determination, too, is negative, the process proceeds to step 3195 where the result of the multiphysics data structure is finalized.

Referring now to FIG. 32, a flowchart illustrates an exemplary method for interpreting a physics interface data structure and a multiphysics data structure to generate variable and equation instances and to determine multiphysics couplings in a multiphysics model. The method may be executed for each geometric entity of a multiphysics model as a step prior to discretizing and solving the discretized equations via the multiphysics modeling system.

In step 3210, a set of physics interface instances may be determined or selected from a multiphysics data structure. Next, at step 3220, physics interface data structures corresponding to the selected physics interface instances in the multiphysics data structure may be loaded into an interpreter. At step 3230a, variables and equation instances may be generated for each physics interface and for each feature and property in a physics interface. Next, at steps 3230b, 3230c, and 3230d along with decision boxes 3231, 3232, and 3233, the features and properties of the physics interface(s) are processed including the user input instances in these feature and property instances. Decision boxes 3231, 3232, and 3233 respectively determine if there are any unprocessed feature or property instances, user input instances, and/or variable or equation instances. If a positive determination is made at decision step 3231, the process of generating variables and equation instances proceeds to one or more of steps 3230b, 3230c, and/or 3230d to generate variable instances, generate a variable instance for a user input instance, and/or to generate variable or equation instances, respectively.

Next, at step 3240, expressions generated in step 3230a, 3230b, 3030c, and 3230d can be evaluated and domain splitting can optionally be performed. Variables and equations generated by features, properties, and user inputs may then be associated with a geometric entity selection. The geometric entity selection may determine that a feature is defined on a group of domains, boundaries, points, or edges. In step 3240, equations and variables from all features and properties are compiled accounting for status of exclusive and contributing features (depending, for example if they or overridden or overriding) in all geometric entities in a model. Geometric entities may also be grouped into the largest possible sets (domain splitting) with common variables and equations for all features and properties. In each of these sets, the status of exclusive and contributing features and properties is assessed to determine variables and equations in each set. For example, an exclusive overriding feature (last in the sequence of features or properties) may result in equations and variables from overridden features being omitted in each set. In contrast, variables and equations from contributing features and properties that are not overridden are added in each set. Then, in step 3250, physical properties and physical quantities from several physics interfaces are matched so that the multiphysics couplings in a model can be determined. The resulting output from the matching can then be used to generate a system of discretized equations that may be solved using or as part of a multiphysics modeling system.

In certain aspects of the present concepts, instructions associated with a physics interface builder module are executed on one or more processing units. The module is for accessing settings for forming a physics interface data structure using a graphical user interface. The instructions can include steps for adding a physics interface class to the data structure, feature classes for different settings in a physics interface, property classes, and user input classes. Each of the classes may also include variable classes describing equations, physical properties, and physical quantities. The output from the physics interface builder routine includes a physics interface data structure containing a complete description of a physics interface.

In another aspect of the present concepts, a method is contemplated for interpreting a physics interface data structure and making the settings for the physics interface accessible to a multiphysics modeling system's user interface. This method may receive the physics interface data structure and generate a multiphysics data structure based on the selections and settings received from or input by a user of the multiphysics modeling system.

Physics interface data and multiphysics data structures in accord with at least some of the present concepts can be loaded into a second interpreter that generates variables and equation instances. The method may further evaluate expressions, perform domain splitting, and match physical properties with physical quantities to allow arbitrary multiphysics couplings.

According to one aspect of the present concepts, a method for generating a physics interface data structure is described. The method is executable on one or more processing units associated with a modeling system. The method comprises the acts of creating, in one or more memory devices, a physics interface file including a plurality of data fields. A plurality of selection menus and user editable fields associated with the physics interface file are output to a display device. Variable declarations associated with a physics interface are received via one or more input devices. The variable declarations are received via at least one of the selection menus and user editable fields. Physics features and properties associated with the physics interface are received via the input device. The physics features and properties are received via at least one of the selection menus and user editable fields. At least one dependent variable and at least one feature equation for each of the received physics features and properties are defined via at least one of the plurality of selection menus. One or more user inputs for the physics feature and property are received via the input device. The user inputs are received via at least one of the selection menus and user editable fields. At least one of the variable declarations, physics features and properties, dependent variable definition, feature equation, user inputs for the physics feature and property, and default solver setting definition are stored in the plurality of data fields.

According to another aspect of the present concepts, a method for generating a multiphysics data structure is described. The method is executable on one or more processing units associated with a multiphysics modeling system. The method includes the acts of determining a set of physics interfaces from a plurality of physics interface data structures. The set of physics interfaces are displayed on a graphical user interface. Each of the physics interfaces are selectable. One or more input devices are used to select, at least one of the displayed physics interfaces. First settings for the selected physics interface are determined and displayed. The first settings are defined in the physics interface data structure. The first settings for the selected physics interface are edited via the one or more input devices. Features and properties defined in the physics interface data structure are determined and displayed. At least one of the displayed features and properties are selected via the one or more input devices. Second settings for the selected features and properties defined in the physics interface data structure are determined and displayed. The second settings for the selected features and properties are edited via the one or more input devices.

According to yet another aspect of the present concepts, a method for generating equations and variables representing a multiphysics model in a multiphysics modeling system is described. The method is executable on one or more processing units and includes the acts of determining, via the one or more processing units, a set of physics interfaces defined in a multiphysics data structure. Each physics interface includes physical properties and physical quantities. A physics interface data structure corresponding to the multiphysics data structure is received into a memory. Variable and equation instances are generated for each of the plurality of physics interfaces. The variable and equation instances are generated from the received physics interface data structure. At least a portion of the variable and equation instances are common to the plurality of physics interfaces. Expressions based on the generated variable and equation instances are evaluated. Domain splitting for variable and equation instances that are common is performed. The physical properties and the physical quantities from at least two of the plurality of physics interfaces that have common variable and equation instances are matched matching via the one or more processors. A system of equations based on the variables and equation instances are optionally generated. The generated system of equations are optionally transmitted to a PDE solver. The PDE solver is configured to output a multiphysics model result.

According to further aspects of the present concepts, one or more non-transitory computer readable media are encoded with instructions, which when executed by at least one processor associated with a design system or a multiphysics modeling system, causes the at least one processor to perform the above methods.

Each of these embodiments and obvious variations thereof is contemplated as falling within the spirit and scope of the claimed invention, which is set forth in the following claims.

What is claimed is:

1. A method for generating a customized physics interface data structure, the customized physics interface data structure including representations of one or more physics interfaces for a modeling system, the method being executable on one or more processing units associated with the modeling system, the method comprising the acts of:
creating, in one or more memory devices, a physics interface file including a plurality of data fields for storing representations of graphical user interface components, equations, variables, variable declarations, physics features and defining properties, and user input classes for one or more physics interfaces;
outputting to one or more graphical user interfaces a plurality of selection menus and user editable fields associated with the physics interface file, the one or more graphical user interfaces displayed on a display device;
receiving, via one or more input devices, user inputs indicative of physics interface settings and restrictions;
receiving, via at least one of the one or more user input devices, user inputs indicative of variable declarations associated with a physics interface, the variable declarations determined from the user inputs that correspond to selections from the selection menus or inputs to the user editable fields;
creating, based on user inputs received via at least one of the one or more user input devices, at least one physics feature and defining properties, the at least one physics feature and defining properties being associated with the physics interface and being determined from user inputs that correspond to at least one of the selection menus or user editable fields;
defining at least one dependent variable and creating at least one feature equation for the at least one physics feature and defined properties;
defining, based on user inputs received from at least one of the one or more user input devices, one or more user input classes for the at least one physics feature and defined properties, the defined one or more user input classes corresponding to at least one of the selection menus or user editable fields;
updating the physics interface file to include data representing the physics interface settings and restrictions, the variable declarations, the at least one physics feature and defining properties, the defined at least one dependent variable, the created at least one feature equation, and the defined user input classes.

2. The method of claim 1, wherein the defining at least one dependent variable and at least one feature equation occurs in response to received user inputs corresponding to a selection from at least one of the of selection menus.

3. The method of claim 1, further comprising defining, in response to user inputs received via at least one of the one or more user input devices, one or more default solver settings, the defined default solver settings being stored in one or more of the plurality of data fields.

4. The method of claim 3, wherein the default solver settings include a time-dependent solver setting.

5. The method of claim 1, further comprising defining, in response to received user inputs that correspond to a selection from at least one of the selection menus, default plot and result features for outputting results associated with the physics interface file for the modeling system.

6. The method of claim 1, further comprising representing the physics interface data structure in a physics interface builder model tree displayed in a graphical user interface.

7. The method of claim 1, wherein the variable declarations include a physical quantity for at least one of the one or more physics interfaces.

8. The method of claim 1, wherein the at least one physics feature and defined properties includes space dimensions, study type, and material type.

9. The method of claim 1, wherein the physics interface data structure includes a plurality of physics interfaces.

10. The method of claim 9, wherein at least one of space dimensions and study type is the same for at least two of the plurality of physics interfaces.

11. The method of claim 1, wherein the feature equation is created based on user inputs received in one of the user editable fields.

12. The method of claim 1, wherein the feature equation is a weak form partial differential equation.

13. The method of claim 1, wherein the defined user input classes include at least one of a material property, a feature input, and a material list.

14. The method of claim 1, further comprising storing, via at least one of the one or more memory devices, data representing the physics interface settings and restrictions, the variable declarations, the at least one physics feature and defining properties, the at least one dependent variable, the at least one feature equation, and the user input classes for the at least one physics features and properties, in one or more of the plurality of data fields for the physics interface file.

15. The method of claim 1, further comprising generating, via at least one of the one or more processing units, a system of equations based on at least one of the variable declarations, the physics feature and defining properties, the defined dependent variable, the feature equation, or the user input classes for the physics features and defining properties.

16. The method of claim 15, further comprising transmitting the generated system of equations to a partial differential equation solver, the partial differential equation solver being configured to output a multiphysics model result.

17. A method for generating a multiphysics data structure, the method being executable on one or more processing units associated with a multiphysics modeling system, the method comprising the acts of:
- determining, via one or more processing units, a set of physics interfaces from a physics interface data structure stored on one or more memory devices, the physics interface data structure including data fields for storing data representing user interface components, physics features, physics properties, feature equations, variables, variable declarations, and user input classes of one or more physics interfaces for a modeling system;
- displaying physics interface indications corresponding to the set of physics interfaces in one or more graphical user interfaces, at least one of the physics interface indications being user selectable;
- receiving, via one or more user input devices, a user input indicative of a selection of at least one of the physics interface indications;
- determining and displaying in at least one of the one or more graphical user interfaces first settings for the selection of the at least one of the physics interface indications, the first settings being defined in the physics interface data structure;
- receiving, via at least one of the one or more user input devices, user inputs indicative of edits to the first settings such that at least one parameter for the first settings is changed;
- determining and displaying in at least one of the one or more graphical user interfaces variable declarations, physics features, and physics properties defined in the physics interface data structure, the variable declarations, physics features, and physics properties associated with the selection of the at least one of the physics interfaces;
- receiving, via at least one of the one or more user input devices, user inputs indicative of a selection of at least one of the displayed physics features and physics properties and user inputs indicative of a selection of the displayed variable declarations;
- determining and displaying in at least one of the one or more graphical user interfaces second settings for the selection of the at least one of the physics features and physics properties and for the selection of the variable declarations defined in the physics interface data structure; and
- receiving, via at least one of the one or more user input devices, user inputs indicative of edits to the second settings such that at least one parameter for the second settings is changed.

18. The method of claim 17, wherein the selection of at least one of the displayed variable declarations, physics features, and physics properties includes a selection from a displayed menu of options.

19. The method of claim 17, wherein the selection of at least one of the displayed physics features and physics properties includes a selection from at least one of space dimensions, study type, and material type.

20. The method of claim 17, wherein at least a portion of the selection of physics features are equation features expressed at least partially in a tensor form.

21. The method of claim 17, further comprising storing, in at least one of the one or more memory devices, the first settings, the second settings, the edited first setting, and the edited second settings in the physics interface data structure.

22. The method of claim 17, further comprising generating, via at least one of the one or more processing units, a system of equations based at least in part on the edited first settings and the edited second settings.

23. The method of claim 22, further comprising transmitting the generated system of equations to a partial differential equation solver, the partial differential equation solver being configured to output a multiphysics model result.

24. An apparatus for generating a physics interface data structure for a multiphysics modeling system, the apparatus comprising:
- a physical computing system comprising one or more processors, one or more user input devices, a display device, and one or more memory devices, at least one of the one or more memory devices including executable instructions for generating a physics interface data structure corresponding to a multiphysics modeling system, the executable instructions causing at least one of the one or more processors to perform, upon execution, acts comprising
  - creating a physics interface file including a plurality of data fields for storing data representing graphical user interface components, equations, variables, variable declarations, physics features, physics properties, and user input classes for one or more physics interfaces for the modeling system;
  - outputting to one or more graphical user interfaces a plurality of selection menus and user editable fields associated with the physics interface file, the one or more graphical user interfaces displayed on a display device;
  - receiving, via one or more input devices, user inputs indicative of physics interface settings and restrictions;
  - receiving, via at least one of the one or more user input devices, user inputs indicative of variable declarations, physics features, and physics properties associated with at least one of the one or more physics interfaces, the variable declarations, physics features, and physics properties being determined from the user inputs that correspond to at least one of selections from the selection menus or inputs to the user editable fields;
  - defining at least one dependent variable and at least one feature equation for at least one of the physics features, physics properties, or variable declarations;
  - defining, based on user inputs received from at least one of the one or more user input devices, one or more user input classes for at least one of the physics features and physics properties, the user input classes associated with least one of the selection menus or the user editable fields; and
  - updating the one or more plurality of data fields of the physics interface file to store, in at least one of the one or more memory devices, data representing the physics interface settings and restrictions, determined physics features and physics properties, determined variable declarations, dependent variable definition, defined feature equation, and defined user input classes.

25. The apparatus of claim 24, wherein the defining at least one dependent variable and at least one feature equation occurs in response to a user input indicative of a selection from at least one of the selection menus.

26. The apparatus of claim 24, further comprising the physical computing system or a second physical computing system including executable instructions for generating, via at least one of the one or more processors, a system of equations based on at least one of the physics features, physics properties, variable declarations, dependent variable definition, feature equation, or user input classes for the physics features and properties.

27. The apparatus of claim 26, wherein the physical computing system or the second physical computing system further include executable instructions for transmitting the generated system of equations to a partial differential equation solver, the partial differential equation solver being configured to output a multiphysics model result.

28. An apparatus for editing settings in a physics interface data structure for a multiphysics modeling system, the apparatus comprising:
a physical computing system comprising one or more processors, one or more user input devices, a display device displaying, and one or more memory devices, at least one of the one or more memory devices including executable instructions for editing a physics interface data structure corresponding to a multiphysics modeling system, the executable instructions causing at least one of the one or more processors to perform, upon execution, acts comprising
determining a set of physics interfaces from a physics interface data structure stored on one or more memory devices, the physics interface data structure including data fields for storing data representing graphical user interface components, physics features, physics properties, feature equations, variable declarations, variables, and user input classes of one or more physics interfaces for a modeling system;
displaying the set of physics interfaces in one or more graphical user interfaces, at least one of the physics interfaces being selectable;
selecting, via one or more user input devices, at least one of the physics interfaces;
determining and displaying in at least one of the one or more graphical user interfaces first settings for the selected physics interface, the first settings being defined in the physics interface data structure;
receiving, via at least one of the one or more user input devices, user inputs indicative of edits to the first settings for the selected physics interface such that at least one parameter for the first settings is changed;
determining and displaying in at least one of the one or more graphical user interfaces variable declarations, physics features, and physics properties defined in the physics interface data structure, the variable declarations, physics features, and physics properties associated with the selected physics interface;
selecting, via at least one of the one or more user input devices, at least one of the displayed variable declarations and at least one of the displayed physics features and physics properties;
determining and displaying in at least one of the one or more graphical user interfaces second settings for the selected physics features and physics properties and for the selected variable declaration defined in the physics interface data structure; and
receiving, via at least one of the one or more user input devices, user inputs indicative of edits to the second settings for the selected physics features and physics properties and the selected variable declarations such that at least one parameter for the second settings is changed.

29. The apparatus of claim 28, further comprising the physical computing system or a second physical computing system including executable instructions for generating, via one or more processors, a system of equations based on the received edits to the first settings and the second settings.

30. The apparatus of claim 29, wherein the physical computing system or the second physical computing system further include executable instructions for transmitting the generated system of equations to a partial differential equation solver, the partial differential equation solver being configured to output a multiphysics model result.

31. The apparatus of claim 24, wherein at least one of the one or more memory devices includes executable instructions further causing at least one of the one or more processors to perform, upon execution, acts comprising defining, in response to received user inputs that correspond to a selection from at least one of the selection menus, default plot and result features for outputting results associated with the physics interface file for the modeling system.

32. The apparatus of claim 24, wherein at least one of the one or more memory devices includes executable instructions further causing at least one of the one or more processors to perform, upon execution, acts comprising representing the physics interface data structure in a physics interface builder model tree displayed in a graphical user interface.

33. The apparatus of claim 24, wherein the variable declarations include a physical quantity for at least one of the one or more physics interfaces.

34. The apparatus of claim 24, wherein the feature equation is a weak form partial differential equation.

35. The apparatus of claim 32, wherein the physics interface data structure includes a plurality of physics interfaces, and at least one of space dimensions and study type is the same for at least two of the plurality of physics interfaces.

36. The apparatus of claim 28, wherein at least one of the one or more memory devices includes executable instructions further causing at least one of the one or more processors to perform, upon execution, acts comprising storing, in at least one of the one or more memory devices, the first settings, the second settings, the edited first setting, and the edited second settings.

37. The apparatus of claim 28, wherein the physics features and physics properties include space dimensions, study type, and material type.

38. The apparatus of claim 28, wherein the physics interface data structure includes a plurality of physics interfaces, and at least one of space dimensions and study type is the same for at least two of the plurality of physics interfaces.

39. The apparatus of claim 28, wherein at least one of the one or more memory devices includes executable instructions further causing at least one of the one or more processors to perform, upon execution, acts comprising representing the physics interface data structure in a physics interface builder model tree displayed in a graphical user interface.

* * * * *